(12) United States Patent
Perkins et al.

(10) Patent No.: US 12,056,338 B2
(45) Date of Patent: Aug. 6, 2024

(54) SYSTEMS, METHODS, AND USER INTERFACES FOR EDITING DIGITAL ASSETS

(71) Applicant: Canva Pty Ltd, Surry Hills (AU)

(72) Inventors: Melanie Perkins, Surry Hills (AU); Jessica Faccin, Rockdale (AU); Andrew James Peacock, Rozelle (AU); Lucinda Phoebe Ogden-Doyle, Newcastle (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/144,196

(22) Filed: May 6, 2023

(65) Prior Publication Data

US 2023/0359335 A1    Nov. 9, 2023

(30) Foreign Application Priority Data

May 6, 2022    (AU) ................................ 2022203064

(51) Int. Cl.
 *G06F 3/04842*    (2022.01)
 *G06F 3/04847*    (2022.01)
(52) U.S. Cl.
 CPC ...... *G06F 3/04842* (2013.01); *G06F 3/04847* (2013.01)
(58) Field of Classification Search
 CPC ............. G06F 3/04842; G06F 3/04847; G06F 3/0481; G06F 3/017; G06F 3/0482; G06F 2203/04806; G09G 5/30
 See application file for complete search history.

(56) References Cited

U.S. PATENT DOCUMENTS 7,512,886 B1 *  3/2009  Herberger ............ G11B 27/034
                                                      715/723
7,788,605 B1    8/2010  Shoemaker
                        (Continued)

FOREIGN PATENT DOCUMENTS

EP      1587111 B1    7/2019
WO   2020198792 A1   10/2020

OTHER PUBLICATIONS

Examination Report No. 1 for Australian Patent Application No. 2021202306, mailed on Apr. 1, 2022, pp. 1-4.

(Continued)

*Primary Examiner* — Pei Yong Weng
(74) *Attorney, Agent, or Firm* — GrowIP Law Group LLC

(57) ABSTRACT

Described herein is a computer implemented method. The method includes accessing asset data defining a plurality of components. An overview GUI that includes a plurality of corresponding component previews is displayed, the plurality of component previews being displayed adjacent one another along an axis in an order that is based on a component order. The overview GUI further includes an audio element preview corresponding to an audio element, the audio element preview being aligned with the plurality of component previews in order to indicate the audio element's start time and end time. A first user input changing the display width of the first component preview is detected. In response, a new duration for the first component is determined and a determination that adjustment of the audio element is required is also determined.

20 Claims, 19 Drawing Sheets

(56) References Cited

U.S. PATENT DOCUMENTS

| | | | |
|---|---|---|---|
| 7,890,867 | B1 | 2/2011 | Margulis |
| 8,458,595 | B1 | 6/2013 | Margulis |
| 8,489,468 | B2 | 7/2013 | Robbin et al. |
| 8,812,969 | B2 | 8/2014 | Hart et al. |
| 8,875,025 | B2 | 10/2014 | Ubillos et al. |
| 10,506,003 | B1 | 12/2019 | Cabanero et al. |
| 2012/0185772 | A1 | 7/2012 | Kotelly et al. |
| 2013/0124992 | A1* | 5/2013 | Lyons .................. G06F 3/0481 715/716 |
| 2014/0219636 | A1 | 8/2014 | Shah |
| 2015/0019972 | A1 | 1/2015 | Matsuda et al. |
| 2016/0139871 | A1 | 5/2016 | Farshi et al. |
| 2017/0294208 | A1 | 10/2017 | Balabhadrapatruni et al. |

OTHER PUBLICATIONS

Examination Report No. 1 for Australian Patent Application No. 2022203064, mailed on Jul. 25, 2022, pp. 1-6.
Examination Report No. 1 for Australian Patent Application No. 2022203656, mailed on Jul. 25, 2022, pp. 1-6.
Examination Report No. 1 for Australian Patent Application No. 2022203658, mailed Jul. 25, 2022, pp. 1-6.
Examination Report No. 1 for Australian Patent Application No. 2022203659, mailed on Jul. 25, 2022, pp. 1-6.
Examination Report No. 2 for Australian Patent Application No. 2022203658, mailed on Mar. 9, 2023, pp. 1-5.
Examination Report No. 2 for Australian Patent Application No. 2022203659, mailed on Mar. 9, 2023, pp. 1-6.
Get Better Music Tracks for Video Editing with Adobe Remix | Premiere Pro Effects for Audio, https://www.youtube.com/watch?v=d7K0WBU5-1o, Published on Feb. 9, 2022, Transcript enclosed, pp. 1-2.
How to Adjust Song Length to Fit Video / Auto Remix | PowerDirector, https://www.youtube.com/watch?v=pgBA8WG72f4, Published on Mar. 3, 2018, Transcript enclsoed, pp. 1-13.
How to Start using WeVideo—Storyboard/Timeline, https://www.youtube.com/watch?v=ZPd_zzZREyw, Published on Sep. 4, 2020, Transcript enclosed, pp. 1-21.
How to Zoom In and Out on the DaVinci Resolve Edit Viewer, https://www.youtube.com/watch?v=1Lljt6cH8XU, Published on May 31, 2020, Transcript enclosed, pp. 1-4.
Import Photoshop Files into Premiere | Video Editing Tutorials, https://www.youtube.com/watch?v=doqk9BS48bc, Published Mar. 13, 2018, Transcript enclosed, pp. 1-9.
Import Powerpoint Slides into Camtasia 2020, https://www.youtube.com/watch?v=Z7xS-cRceho, Published on Sep. 23, 2017, Transcript enclosed, pp. 1-6.
Move Around the Timeline in Final Cut Pro with Ease, https://www.youtube.com/watch?v=hTjEeHoRU8s, Published on Nov. 20, 2016, Transcript enclosed, pp. 1-10.
PowerDirector—How to effectively use the storyboard view, https://www.youtube.com/watch?v=_fRq2yFR2GI, Published on Jul. 4, 2017, Transcript enclosed, pp. 1-8.
Premiere Pro Program Monitor Panel Zoom Tip, https://www.youtube.com/watch?v=8ou2eFq_Be0, Published on Sep. 20, 2017, Transcript enclosed, pp. 1-5.
Use AI to Retime Your Music with Remix in Premiere Pro, https://www.youtube.com/watch?v=d7K0WBU5-1o, Published on Feb. 9, 2022, Transcript enclosed, pp. 1-2.

* cited by examiner

SYSTEMS, METHODS, AND USER INTERFACES FOR EDITING DIGITAL ASSETS

CROSS-REFERENCE TO RELATED APPLICATION

This application is a U.S. Non-Provisional Application that claims priority to Australian Patent Application No. 2022203064, filed May 6, 2022, which is hereby incorporated by reference in its entirety.

FIELD

The present disclosure is directed to systems, methods, and user interfaces for editing digital assets.

BACKGROUND

Various tools for creating and editing digital assets such as videos and documents exist. Where such tools allow assets of different types to be created, the functionality provided by the tool for editing and/or previewing assets can be complex and confusing to users.

SUMMARY

Described herein is a computer implemented method comprising: accessing asset data in respect of a digital asset, the asset data defining a plurality of components in a component order, each component having a duration, the asset data further defining an audio element having a start time and an end time; displaying an overview graphical user interface (GUI), the overview GUI including a plurality of component previews that correspond to the plurality of components, the plurality of component previews being displayed adjacent one another along an axis in an order that is based on the component order, the plurality of component previews being displayed at a first zoom level, the plurality of component previews including a first component preview that corresponds to a first component, the first component preview having a first display width, the overview GUI further including an audio element preview corresponding to the audio element, the audio element preview being aligned with the plurality of component previews in order to indicate the audio element's start time and end time; detecting a first user input with respect to the first component preview, the first user input being input to change the display width of the first component preview from the first display width to a second display width; and in response to the first user input: determining a new duration for the first component, the new duration of the first component based on the second display width and the first zoom level; recording the new duration for the first component in the asset data; determining that adjustment of the audio element is required; and in response to determining that adjustment of the audio element is required, adjusting the audio element by amending the asset data.

BRIEF DESCRIPTION OF THE DRAWINGS

Preferred embodiments of the invention will be described, by way of examples only, with reference to the accompanying representations, wherein.

DETAILED DESCRIPTION OF THE EMBODIMENTS

Figure 1:
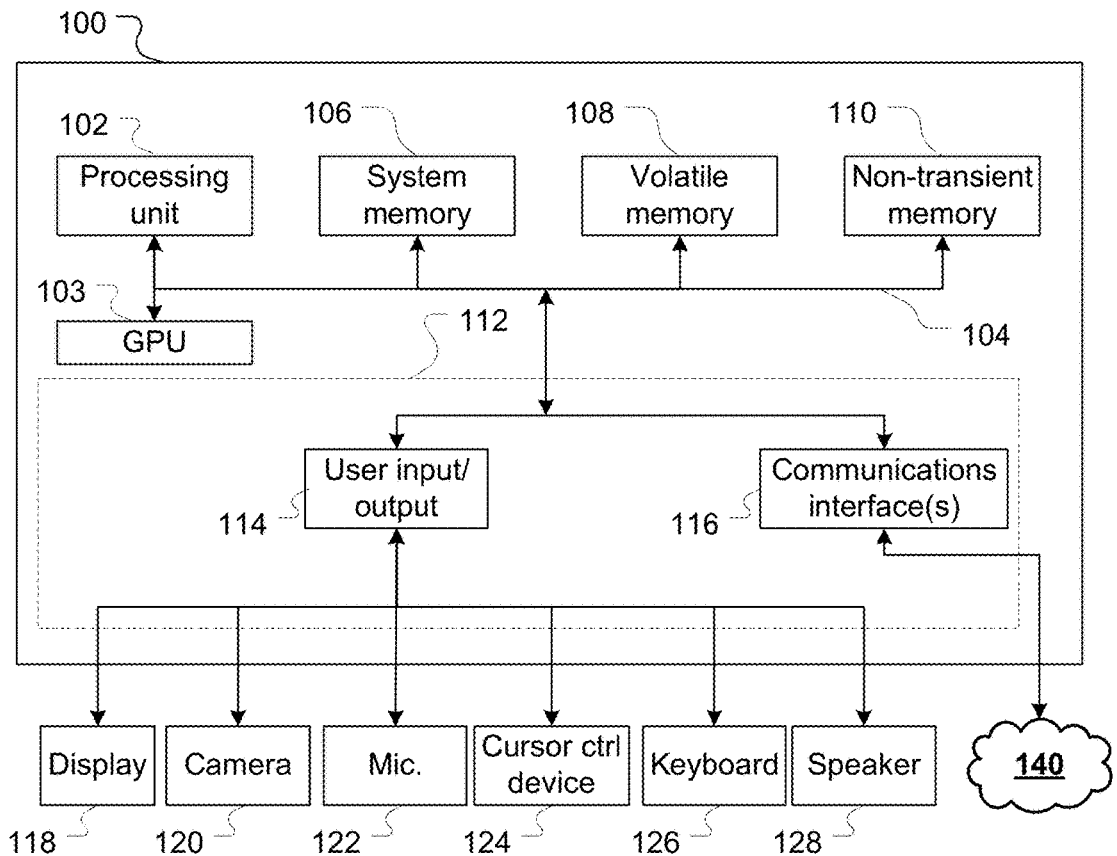
FIG. 1 is an example computer processing system configurable to perform various features described herein.

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As noted above, the present disclosure is generally concerned with systems, methods, and user interfaces for editing digital assets (also referred to herein as assets for short). In particular, the present disclosure describes various techniques that can be used to provide a preview zoom functionality that can be used to edit and view both playable digital assets (that is, assets that are normally views by being played, such as videos) and non-playable digital assets (that is, assets that are not normally viewed by being played, for example a multi-page text document or the like).

Initially, an overview of terminology used in this specification will be described.

In the context of the present disclosure, digital assets are a visual or audio-visual assets. Two general types of digital assets are described: video assets (or videos for short) and document assets (or documents for short).

In the present disclosure, an asset is made up of one or more components. An asset may be a single component asset (i.e. made up of a single component) or a multi-component asset (i.e. made up of more than one component).

The components of a video asset are scenes. Each scene may, for example, be a video (or a snipped thereof) that can be played and has a scene duration (the length the scene plays before the scene ends and, if a next scene exists) the next scene of the video asset starts playing.

The components of a document asset are pages. By way of example, documents may include things such as: posters; post cards; greeting cards; slide shows; presentations; webpages; logos; business cards; social media posts; and/or any other type of visual/audio visual document.

At a general conceptual level, the distinction between video and document assets may be considered as follows. For both document and video assets, each component (page or scene) has a background to which design elements (described further below) may be added.

For a document page, a default background is typically provided by the design editing tool in which the document is being created. The default background may depend on the type of document being created. For many document types a typical default background may be a white/blank rectangular area of particular dimensions.

In contrast, the "background" for a video scene may be considered to be defined by the primary video that the scene is associated with itself. For example, a user may associate a video scene with a particular video clip. In this case, that video clip may itself be considered the background of the video scene in the sense that the user may add additional design elements to the scene that are displayed (or played) atop/in conjunction with the "background" video.

In the present disclosure, a component (e.g. a document page or a video scene) may be associated with one or more design elements. Examples of design elements include: text elements (i.e. elements with text); shape elements (e.g. basic shapes such as lines, squares, rectangles, circles, ovals, stars, and other shapes, typically in vector graphic format); image elements (e.g. raster or vector format images such as photographs, renderings, drawings, and/or other images); video elements (which are played to display a video); charts; tables; and/or other design elements.

Another type of design element is the audio type element—for example music tracks, sound effects, recorded voice, and/or other elements that are played to generate audio output only. In the embodiments described herein, audio elements are associated with an asset as a whole rather than being directly associated with a component. An audio element may still be indirectly associated with a particular component, however, via its start time (for example if component n of a playable asset has a start time of x seconds, then setting an audio element to have a start time of x seconds will result in the audio element and component starting playback at the same time when the asset is played). In alternative embodiments, a given audio element may instead be associated with specific component.

Certain design elements will be referred to as playable design elements. Examples of such elements include audio elements and video elements. The duration of a playable element may be the native duration of that element (e.g. a video or audio track that is x seconds long has a native duration of x seconds). Alternatively, the duration of a playable element may be defined by a user or other program/process (e.g. by trimming the element so that only part of it is played and/or looping the element so that it—or a part thereof—is played multiple times).

The distinction between video and document assets is again relevant here. For example, a video type design element may be added to a page of a document. This does not make that document a video (nor the document page a video scene): the document page remains a document page, even though it has a video element added thereto. In contrast, adding a video design element to a video asset will typically create a new scene based on that video design element. Similarly, an audio element may be added The present disclosure will also refer to playable and non-playable components. A playable component is any component that can be played. All video scenes are playable components. A document page which includes one or more playable elements is also a playable component (as the page can be played by playing the playable elements). A non-playable component is a component that cannot be played. This includes any document page that does not include any playable elements (unless page timing has been defined and is active, as discussed next).

For certain document types, page timing may be defined: i.e. timing data that defines how long one or more of the document pages is to be displayed for before automatically transitioning to the next page of the document. One example of such a document type is a presentation document, where a user may define page timings so that when a presentation-enabled mode of operation is active the application automatically transitions between pages according to the defined timings. In certain embodiments, default page timing may be automatically defined for documents of certain defined types. For example, for documents that are typically exported in a digital format (as opposed to a print format), default page timing of x seconds per page may be defined. Examples of such documents include social media posts. For such documents, any appropriate default timing may be used—for example 5 seconds per page.

In certain implementations, the editing application described herein allows documents with defined page timing data to be associated with one of two operational modes: a presentation-enabled mode in which case the application automatically transitions between pages based on the defined page timings; and a presentation-disabled mode in which the application does not automatically transition pages (and only transitions between pages in response to receiving user input to do so). Where a document has defined page timing data and the presentation-enabled mode is active, that document is treated as a playable document. Where a document has defined page timing data and the presentation-disabled mode is active, that document is treated as a non-playable document. In certain implementations, the presentation-enabled mode may the default mode for any document which has defined page timing data.

In certain implementations, where page timing data is defined this will (when in the presentation-enabled mode) take precedence over the timing that would otherwise be defined by any rich media element. For example, if a presentation document page had a defined page timing of 30 seconds (indicating the page should be displayed for 30 seconds before automatically transitioning to the next page) and also included a rich media element with a duration of 45 seconds, the page would (when in the presentation-enabled mode) be displayed for 30 seconds before transitioning to the next page, despite there still being 15 seconds of the rich media element to display. In alternative implementations, however, the duration of any rich media element(s) on a page may take precedence over defined page timing for that page. Furthermore, during a presentation (and even while the presentation-enabled mode is active) a presenter may manually transition between slides (e.g. by activating a 'next page' button or the like) which serves to immediately transition the page, overriding any page timing that may be defined (and/or timing defined by any rich media element that has been added to a page).

Playable components have a play duration. The play duration of a video scene is the length of that scene. The play duration of a document page is determined based on the durations of the one or more playable elements that have been added to that page—i.e. from the start of the first playable component (as trimmed if relevant) to the end of last playable component (as trimmed and/or looped if relevant).

The present disclosure will also refer to playable and non-playable assets. A playable asset is an asset with at least one playable component (as discussed above). A non-playable asset is an asset without any playable components.

Asset Data

Digital asset data (i.e. the data defining a digital asset) can be stored in any appropriate format. In the present embodiments, and by way of example, digital asset data is stored as a set of key-value pairs (e.g. in a dictionary data type) such as:

```
{
  "asset": {
    "id": "abc123",
    "name": "My Asset",
    "audio": [{audio record 1}, { audio record 2}, ... { audio record n}],
    "components": [{comp. record 1}, {comp. record 2}, ... { comp. record n}],
  }
}
```

In this example, the asset dataset for a given asset includes an asset identifier (uniquely identifying the asset), an asset name (as set, for example, by a user), audio data (defining any audio elements that have been added to/are associated with the asset), and component data (defining the component(s) of the asset).

In this example, audio data is stored in an array of audio records. Each audio record defines an audio element that has been added to the production. Various audio element data formats are possible. As one example, audio element records may take a format such as:

```
{
  "audio element source": "<content reference>"
  "start offset": <start offset>,
  "trim": [<start trim point>, <end trim point>],
  "loop": <loop>,
  "volume": [<volume data>]
}
```

In this example, the audio element source attribute provides a reference (e.g. a link, URL, or other pointer) to the actual content of the audio element. The start offset attribute provides a number of seconds (>=0) that play of the audio element is offset from the start of the production. I.e. if the start_offset is 5.5, the audio element will start playing 5.5 seconds into the production. The trim attribute provides start and/or end trim points which define what portion of the audio element is played in the production. For example, trim data of [3.3, 10] indicates that when the audio element is played in the production it is played from 3.3 seconds into the native (i.e. untrimmed) duration of the audio time to 10 seconds into the native duration of the audio item. The loop attribute defines whether or not the audio element is to loop or not. The loop attribute may, for example, take a value: indicating no looping occurs (e.g. a value of 0); that a set number of loops occur (e.g. an integer value>0); or indicating that the audio element is to loop continuously until the end of the asset (e.g. 'c' or another defined value). The volume attribute may include a single value (e.g. a float/double) indicating a volume for the entire audio element, or more complex data—for example a series of timing/volume pairs that define how the volume changes over the duration of the audio element. The volume property may also, or alternatively, include a start fade property (which, if set, causes the audio item to fade in) and/or an end fade property (which, if set, causes the audio item to fade out).

In the example asset data structure above, data in respect of the component(s) of the asset are stored in an array of component records. In the present example, the position of a component record in the component array defines its position in the asset (e.g. a component record at index n appears before a component record at index n+1). In alternative embodiments, component position/order may be stored as an explicit value in each component record (or elsewhere).

Various component record data formats are possible. A single component record format may be provided which permits, but does not require, attributes that are relevant to any type of component (e.g. scene or document). Alternatively, different component record data formats (with different attributes) may be provided for different types of components. By way of example, a component record may have a format such as:

```
{
  "dimensions": {"width": 1920, "height": 1080},
  "duration": "<no. seconds>",
  "outro_transition": {<outro transition data>},
  "design element data": [{element record 1}, ... {element record n}]
}
```

In this example, the dimensions attribute defines the dimensions of the component—e.g. a width and height. The duration attribute defines the duration of the component—e.g. in seconds (which may not be relevant to all components). Where page timing data is defined (for page components of document assets) this may be stored in the duration attribute (or an alternative attribute). The outro transition attribute provides (or references) data defining an outro transition for the scene (which may not be relevant to all components). Such a transition may be defined, for example, by a transition style (e.g. fade, slide, or other style), an outro duration (e.g. in seconds), and (if relevant to the style) a direction. The design element data attribute of the present example provides an array of design element records, each defining an element that has been added to the component. For a scene, the first element in the element array will typically be the primary video element that defines the scene. In the present example, the position of an element record in the visual element data array defines its depth (e.g.

z-index) in the scene (e.g. an element record at index n appears behind an element record at index n+1).

In this example, a playable component's (e.g. a video scene's) start and end times are not explicitly stored (though could be if desired). A given scene's start time can be calculated by adding together the durations of all preceding scenes. A scene's end time can be calculated by adding its duration to its start time.

Various element record data formats are possible. A single element record format may be provided which permits, but does not require, attributes that are relevant to any type of design element. Alternatively, different element record data formats (with different attributes) may be provided for different types of elements.

By way of example, an element record may have a format that provides (or permits) for attributes such as the following to be stored: one or more element position attributes (e.g. top and a left coordinate); one or more element size coordinates (e.g. a height and a width); rotation; opacity; media reference (linking or pointing to the element's data—e.g. the image, graphic, text, or other data of the element); trim data (defining a trim start and/or end for playable elements such as videos); volume (defining volume data for elements that have audio); loop data (indicating, for a playable design element, whether looping has been defined); timing data (providing timing data for assets that are to be displayed for a set time—e.g. a start time and a play duration). Additional, fewer, and/or alternative attributes may be allowed (or required) depending on the type of element in question.

Once again it is noted that asset data (and/or component data and/or element data) may be stored in different formats and may include alternative attributes to the examples described above.

Digital asset data can be stored on (and retrieved from/ written to) any suitable data storage device.

Computer System and Environment

The processing described herein is performed by one or more computer processing systems that is (or are) configured especially to perform the described processing. An example computer processing system 100 will be described with reference to FIG. 1. Computer processing system 100 may be configured to perform the processing described herein (or parts of that processing) by hardware, software, or a combination of hardware and software.

System 100 is a general purpose computer processing system. It will be appreciated that FIG. 1 does not illustrate all functional or physical components of a computer processing system. For example, no power supply or power supply interface has been depicted, however system 100 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 100 includes at least one processing unit 102—e.g. a central processing unit 102. Computer processing system may also include a separate graphics processing unit (GPU) 103. In some instances, where a computer processing system 100 is described as performing an operation or function all processing required to perform that operation or function will be performed by processing unit 102. In other instances, processing required to perform that operation or function may be performed by the graphical processing unit 103. In still further instances, processing required to perform that operation or function may be performed by remote processing devices accessible to system 100.

Through a communications bus 104 the processing unit 102 (and, if present, GPU 103) is in data communication with a one or more machine readable storage (memory) devices which store computer readable instructions and/or data which are executed by the processing unit 102 (and/or 103) to control operation of the system 100. In this example system 100 includes a system memory 106 (e.g. a BIOS), volatile memory 108 (e.g. random access memory such as one or more DRAM modules), and non-transient memory 110 (e.g. one or more hard disk or solid state drives).

System 100 also includes one or more interfaces, indicated generally by 112, via which system 100 interfaces with various devices and/or networks. Generally speaking, other devices may be integral with system 100, or may be separate. Where a device is separate from system 100, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 100 may be configured for wired connection with other devices/communications networks by one or more of: USB; eSATA; Ethernet; HDMI; and/or other wired protocols.

Wireless connection with other devices/networks may similarly be by any appropriate standard or proprietary hardware and communications protocols. For example, system 100 may be configured for wireless connection with other devices/communications networks using one or more of: BlueTooth; WiFi; near field communications (NFC); Global System for Mobile Communications (GSM), and/or other wireless protocols.

Generally speaking, and depending on the particular system in question, devices to which system 100 connects—whether by wired or wireless means—include one or more input devices to allow data to be input into/received by system 100 and one or more output device to allow data to be output by system 100. Example devices are described below, however it will be appreciated that not all computer processing systems will include all mentioned devices, and that additional and alternative devices to those mentioned may well be used.

For example, system 100 may include or connect to one or more input devices by which information/data is input into (received by) system 100. Such input devices may include keyboard, mouse, trackpad, microphone, accelerometer, proximity sensor, GPS, and/or other input devices. System 100 may also include or connect to one or more output devices controlled by system 100 to output information. Such output devices may include devices such as a display (e.g. a LCD, LED, touch screen, or other display device), speaker, vibration module, LEDs/other lights, and/or other output devices. System 100 may also include or connect to devices which may act as both input and output devices, for example memory devices (hard drives, solid state drives, disk drives, and/or other memory devices) which system 100 can read data from and/or write data to, and touch screen displays which can both display (output) data and receive touch signals (input).

By way of example, where system 100 is an end user device (such as a desktop computer, laptop computer, smart phone device, tablet device, or other device) it may include a display 118 (which may be a touch screen display), a camera device 120, a microphone device 122 (which may be integrated with the camera device), a cursor control device 124 (e.g. a mouse, trackpad, or other cursor control device), a keyboard 126, and a speaker device 128.

System 100 also includes one or more communications interfaces 116 for communication with one or more networks, such as network 140 (e.g. a local area network, a wide area network, a public network). Via the communications interface(s) 116, system 100 can communicate data to and receive data from networked systems and/or devices.

System 100 may be any suitable computer processing system, for example, a server computer system, a desktop computer, a laptop computer, a netbook computer, a tablet computing device, a mobile/smart phone, a personal digital assistant, or an alternative computer processing system.

System 100 stores or has access to computer applications (also referred to as software or programs)—i.e. computer readable instructions and data which, when executed by the processing unit 102, configure system 100 to receive, process, and output data. Instructions and data can be stored on non-transient machine readable medium such as 110 accessible to system 100. Instructions and data may be transmitted to/received by system 100 via a data signal in a transmission channel enabled (for example) by a wired or wireless network connection over an interface such as communications interface 116.

Typically, one application accessible to system 100 will be an operating system application.

In addition, system 100 will store or have access to applications which, when executed by the processing unit 102, configure system 100 to perform various computer-implemented processing operations described herein. For example, in certain implementations present examples system 100 includes an application 200 (see FIG. 2 below): computer readable instructions and data which, when executed by the computer processing system 100 configure the system to perform the processing described herein.

In alternative implementations, computer processing system 100 may be configured to perform the processing described herein by hardware (or by a combination of hardware and software).

The embodiments described herein refer to the application 200 displaying user interfaces and user interface features. Unless specified otherwise, the application 200 displays such features (or causes such features to be displayed) on a display of a computer processing system—e.g. display 118 of system 100.

The embodiments described herein also refer to the application 200 receiving user input. Unless specified otherwise, the application 200 receives user input that provided by an input device of a computer processing system. Various input devices are possible, e.g. one or more of a touch screen display (e.g. 118 of system 100), a cursor control device (e.g. 124 of system 100), a keyboard (e.g. 126 of system 100), and/or other user input devices.

Figure 2:
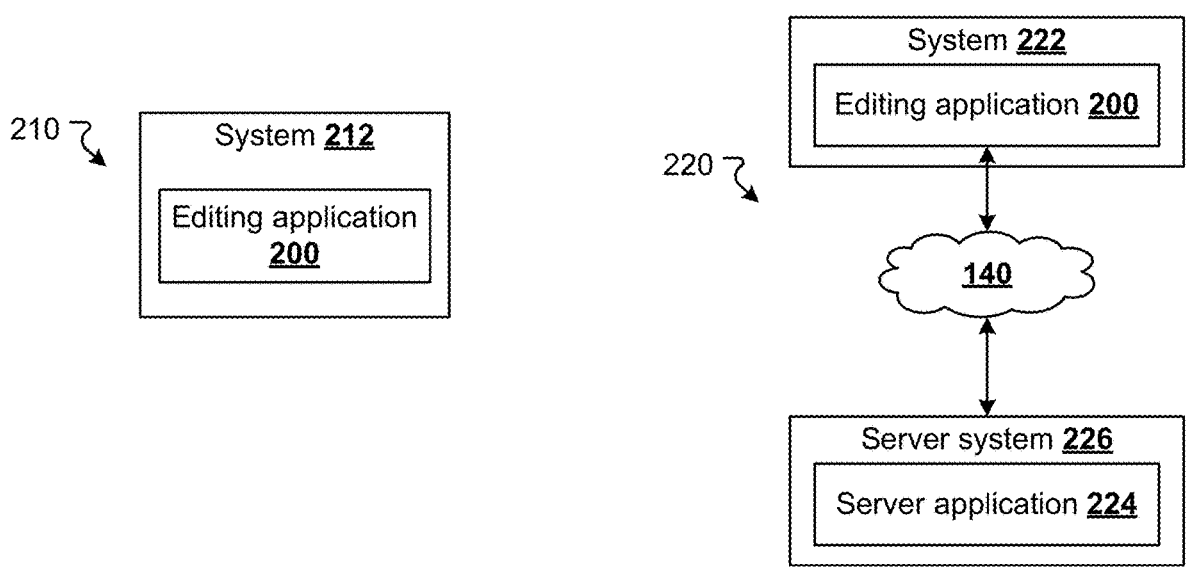
FIG. 2 provides example contexts in which the techniques described herein may be performed.

As noted, in the implementations described herein a computer processing system such as 100 is configured to perform the various operations described by execution of an application 200. For ease of reference, the application 200 will be referred to as application 200 for short. Application 200 may operate in various contexts, two examples of which are depicted in FIG. 2.

In example context 210, the application 200 is a stand-alone application running on computer processing system 212 (which may be a system that is similar to or the same as system 100 described above). In this example, asset data (i.e. data defining assets, the components of those assets, and design elements that have been added to those components or assets) are directly accessible to the application 200—e.g. due to being stored on locally accessible memory (such as non-transient memory 110) or other storage directly accessible to the application 200/system 212.

In example context 220, the application 200 operates in a client server environment. In this environment the application once again runs on a computer processing system 222. The application 200 operates in conjunction with a server application 224 (which runs on its own server computer processing system 226). In this environment, the application 200 is configured to communicate with the server application over network 224. In this environment, asset data will typically be stored by the server application 224 (on storage devices accessible thereto). Accordingly, in order to view/edit an asset the application 200 requests relevant data for that asset from the server, and in order to store any changes made to the asset the application 200 sends relevant asset data to the server application 224 to be stored.

It will be appreciated that contexts 160 and 170 are provided by way of example only, and many different contexts (or variations on contexts 160 and 170) are possible.

In certain operations described herein, the application 200 operates to access or store data in respect of digital assets. Depending on the implementation, the location(s) at which data is accessed from and stored to may differ. For example, in a stand-alone implementation (e.g. context 210 above), application 200 may access data from and store data to locally accessible memory—e.g. non-transient memory 110 or a networked storage device or service. Alternatively, in a client-server embodiment (e.g. context 220 above), application 200 may access data and store data over via a server application such as application 224.

Example Graphical User Interfaces

Figure 3:
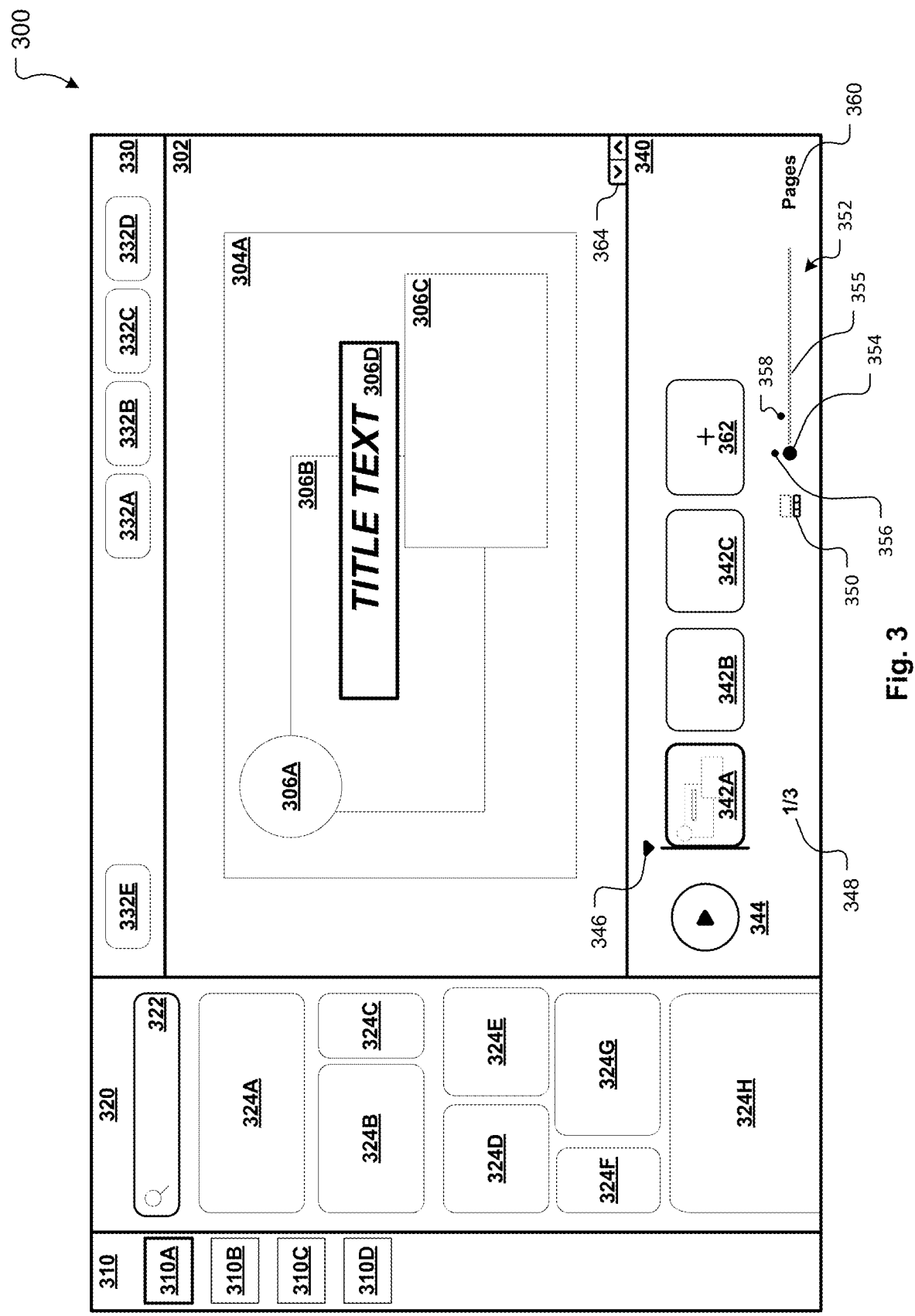
FIGS. 3 to 5 depict example graphical user interfaces.

Turning to FIG. 3, one example of a graphical user interface (GUI) 300 is provided. GUI 300 may be provided by application 200 to allow a user to edit and view digital assets. Alternative user interfaces are possible. The application 200 causes GUI 300 to be displayed on a display (e.g. 118) of a computer processing system (e.g. 100).

In this example, GUI 300 includes an editing GUI 302, an element type selection GUI 310, a search GUI 330, additional controls GUI 330, and an asset overview GUI 340 (referred to as overview GUI 340 for short).

The editing GUI 302 displays a view of a particular component 304 of a particular asset that is currently being edited (or viewed)—e.g. a document page or a video scene of the asset. The view of the particular component 304 displayed in the editing GUI 302 may be referred to as an editable view, in the sense that a user can interact with view to edit the displayed component (e.g. by adding design elements thereto, adjusting design elements that have been added to the component, and/or removing design elements from the component). For playable components, the component 304 is displayed at a particular time within the component's duration—e.g. the start, the end, or a point in between. In this case, the particular time within the component that is being displayed may be indicated by the playhead 346 in the overview GUI 340 (described below). In the embodiment illustrated by FIG. 3, component 304A is displayed which corresponds to preview 342A, and the playback position (as indicated by playhead 346) is at the start of the component.

The element type selection GUI 310 determine the type of elements that are displayed in the search GUI 330 (discussed below). In this example, the GUI 300 has four element type selection controls: video element type control 310A, image element type control 310B, text element type control 310C, and audio element type control 310D.

An element type selection control 310 may be activated via a user selecting (or activating) the element type selection control 310 (e.g. by clicking the element type selection control 310 using a mouse operatively coupled to the computer processing system 100 or by contacting the element type selection control on a touch screen operatively coupled to the computer processing system 100). In this example the activated element type selection control 310 is visually distinguished from the non-activated element type selection GUI 310 by having a heavier weight outline. As described below, alternative mechanisms for visually distinguishing the selected element type selection control are possible.

Although only four element type selection controls 310 are illustrated in FIG. 3, GUI 300 may include additional, alternative, or fewer element type selection controls.

The search GUI 330 has a search box 322 in which a user can enter text/search terms (e.g. via an input device operatively coupled to the computer processing system 100) in order to search for design elements (e.g. video, graphic, and/or audio). Based on the activated element type selection control 310, search result thumbnails 324 satisfying the user's search query are displayed in the search GUI 330. For example, if the video element type selection control 310A is selected, the search is performed across video elements accessible to the application 200 (for example video elements locally stored at system 100, video elements stored/made accessible via a server system, and/or video elements stored at a third party system accessible over network 140) and the result thumbnails 324 will be limited to video elements that satisfy the user's search. Similarly, if one of the image, text, or audio element type selection controls 310B-D are selected, the search performed across relevant sources, and result thumbnails 324 will be limited to images, text, or audio elements that satisfy the user's search, respectively.

In some embodiments, if no element type selection control 310 is selected any search is performed across all element types.

In the example illustrated in FIG. 3, seven search results 324A-G are fully displayed in the search GUI 330 and one search result 324H is partially displayed in the search GUI 330. It will be appreciated by that there may be many search results 324 that satisfy the user's search query and that not all of the search results 324 can be displayed simultaneously in the search GUI 330. Accordingly, a user can scroll, page, or otherwise navigate through the search results 324 within the search GUI 330 in order to cause additional search results to be displayed. For example, the user may scroll through the search results 324 using a mouse and/or by interacting with a touch screen.

A user may add a design element (e.g. video, text, image, or other element) to a component of the asset being edited by dragging a search result thumbnail 324 from the search GUI 330 and dropping it onto the component 304A currently displayed in the editing GUI 302. Alternatively, a user may add a design element to a component by dragging a search result thumbnail 324 onto a preview 342 of a particular component. In this case the element corresponding to the thumbnail may, for example, be added to the centre of the component 304 corresponding to the preview 342 the element is dropped on. Further, if a design element is added by being dropped onto a preview 342 the application may cause the component corresponding to that preview to be automatically displayed in the editing GUI 302. Other methods may be used to add a design element to a component.

The additional controls GUI 330 includes controls 332 which allow a user to edit and/or adjust characteristics of a selected design element (e.g. an element that is displayed on component 304A and has been selected by a user). In the example illustrated in FIG. 3, five additional controls 332A-E are provided (though additional or fewer additional controls 332 may be provided).

The additional controls 332 may be (or include) adaptive controls which change based on the type of design element selected within the component 304A. For example, if a text element on component 304A has been selected, the additional controls 332 may include a font type selection control, a font size selection control, and a font colour control. In contrast, if a shape element on component 304A has been selected (e.g. a rectangle or the like), the additional controls GUI 230 may include a line control for adjusting line options and a fill control for adjusting fill options. Other additional controls GUI 230 may be displayed depending on the type of design element selected in the component.

Further additional controls 332 may be permanently displayed. For example, control 332D may be a permanently displayed 'publish' control which a user can activate to publish, share, or save the production currently being worked on.

In the present example, a change presentation mode control 332E is provided. As described above, in certain embodiments application 200 may store user-defined or default page timing data for documents of certain types (e.g. presentation documents). In this case, and in the present example, application 200 displays the change presentation mode control 332E when the asset currently being edited is a document with page timing data defined.

In this example, control 332E is a toggle control such that user interaction therewith causes the application 200 to switch between a presentation-enabled mode of operation and a presentation-disabled mode of operation. As described above, in the presentation-enabled mode of operation, application 200 respects any page timings that have been defined and, accordingly, treats pages with defined timing as playable pages. In the presentation-disabled mode of operation, application 200 does not respect any page timings that have been defined and, accordingly, treats pages as non-playable pages (even if page timings are defined). If a document does not have any defined page timing data, application 200 may be configured to not display the change presentation mode control 332E (or, alternatively, to display control 332E but in an inoperable mode—e.g. as a greyed out or otherwise inoperable control).

The overview GUI 340 is used to display an overview (or partial overview) of the asset being edited. This includes displaying component previews 342 that correspond to the components of the asset being edited. Each component of the asset being edited has a corresponding preview 342. In the overview GUI 340, the previews 342 are displayed sequentially along an axis in the order of their corresponding components (as defined by the asset data). In the present example, the axis is a horizontal axis and the preview order is from left to right: i.e. the preview 342 corresponding to component n of the asset appears to the left of the preview 342 corresponding to component n+1 of the asset. E.g. in the example of FIG. 3, previews 342A, 342B, and 342C may correspond respectively to scenes 1, 2, and 3 of a video asset currently being edited. In this particular example, the asset components are playable components and, therefore, the sequence of previews 342 provides a timeline for the asset in question.

A user can interact with the preview 342 of a particular component (e.g. by contacting, clicking on, or otherwise interacting with the preview 342) to select the component that corresponds to that preview. This causes the selected component to be displayed in the editing GUI 302. In addition, the preview 342 of the selected component is visually distinguished from any previews of non-selected components. In FIG. 3, preview 342A is selected and the corresponding component 304A is displayed in the editing GUI 302. In this example, the selected preview 342 is visually distinguished over non-selected components via a heavier weight border (though alternative mechanisms for visually distinguishing the selected preview 342 can be used). Furthermore, where the asset includes more components than the number of previews 342 that can be simultaneously displayed, the application permits user input to scroll or otherwise navigate through the previews. For example, if the number of previews exceeds the available screen space, the application allow user input to scroll or otherwise transition the sequence of previews—e.g. in this example to move the sequence of previews to the left to show previews of components that are later in the order or to move the sequence of previews to the right to show previews of components that are earlier in the order. To enable navigation the application may display a scroll bar or other scrolling controls when the number of previews exceeds the available display space.

In the present example, a playable asset is being edited. Accordingly the overview GUI 340 also includes a play control 344, a playhead 346, a current position indicator 348, a zoom mode control 350, a zoom level control 352 (which, in this example, is a slider control that includes a slider handle 354, a slide path 355, and two zoom snap-point indicators 356 and 358—specifically a fixed zoom snap-point indicator 356 and a minimum zoom snap-point indicator 358), a zoom level indicator 360, an add component control 362, and a toggle overview GUI display mode control 364. As described further below, the displayed controls may differ where a non-playable asset is being edited.

When the play control 344 is displayed it can be activated by a user to initiate playback of the asset. In this case, the current position (time) within the asset is indicated by the playhead 346. In the present embodiment, once the play control 344 has been activated, it turns into a pause control, which when activated causes playback to be paused. While playing, a progress indicator (playhead 346 in this example) moves (in this case from left to right where playback is in a forward direction) in order to continuously display the current position (time) within the asset. A user may interact with the playhead 346 (e.g. by dragging or otherwise interacting with it) to move the playhead 346 and, therefore, playback of the asset to a particular time.

The current position indicator 348, zoom mode control 350, zoom level control 352, and zoom level indicator 360 are discussed in further detail below.

Activation of the add component control 362 by a user causes a new (blank) component to be added to the asset being edited and causes a preview 342 corresponding to the newly added component to be added to the overview GUI 340. In the present embodiments, when a component is added via the add component control 362 it is added as the last component of the asset. The asset components can, however, be reordered (e.g. by dragging and dropping the component's preview 342 to a new location (before/after an existing preview 342) in the overview GUI 340. Further, when a new component is added it is automatically selected so that the newly added component (which may initially be blank) is displayed in the editing GUI 302 and, if playhead 346 is displayed, it is moved so as to align with the start of the newly added component's preview 342.

The toggle overview GUI display mode control 364 is described further below.

In the example illustrated in FIG. 3, the component corresponding to preview 342A has been selected (e.g. by selection of preview 342A or an alternative selection means). In this example, the play control 344 and playhead 346 are displayed, and selection of preview 342A has caused the playhead 346 to be positioned at the start of component preview 342A. Selection of preview 342A has also caused the corresponding component 304A to be displayed in the editing GUI 302.

In the present embodiments, a component preview 342 has an appearance that is based on the component the preview corresponds to. This is depicted in FIG. 3. In FIG. 3, component 304A includes four design elements—306A, 306B, 306C, and 306D. As can be seen, preview 342A which corresponds to component 304A provides a preview of those design elements. In FIG. 3, previews 342B and 342C are blank, which may indicate that no design elements have yet been added to the components those previews represent. In the figures, most component previews 342 are depicted as being blank. This is simply to avoid unnecessary cluttering. Unless a component preview corresponds to a blank component (e.g. a component to which no design elements have been added), however, the component preview will be displayed with an appearance that provides a preview of that component.

The below description focuses on the overview GUI 340 of user interface 300. For clarity, therefore, further figures depict only the overview GUI 340 and/or editing GUI 302 (with other regions of GUI 300 not shown). Further, in order to avoid obscuring features not all reference numerals are repeated in all figures. It will be appreciated that the overview GUI 340 described herein (or various adaptations thereof) may be implemented as part of a broader user interface. While FIG. 3 provides one example of such a broader GUI 300, the overview GUI 340 (or various adaptations thereof) may be incorporated into alternative user interfaces with alternative features. At a general level, such alternative user interfaces will have some kind of editing GUI in which to display components (GUI 302 being one example of such a GUI).

Editor Overview Zoom Modes

In certain embodiments, application 200 is configured operate in, and switch between, what will be referred to as an editor zoom mode and an overview zoom mode. These zoom modes will be described with reference to FIGS. 4 to 6.

In the present embodiments, zoom mode control 350 is a toggle control that can be activated by a user to manually switch between the editor zoom mode and the overview zoom mode: i.e. if the zoom mode control 350 is activated while in the editor zoom mode, the application 200 will switch to the overview zoom mode. Conversely, if the zoom mode control 350 is activated while in the overview zoom mode, the application 200 will switch to the editor zoom mode.

In the editor zoom mode, changes made to the zoom level (e.g. via the zoom level control 352) only impact the component 304 currently displayed in the editing GUI 302.

Figure 4:
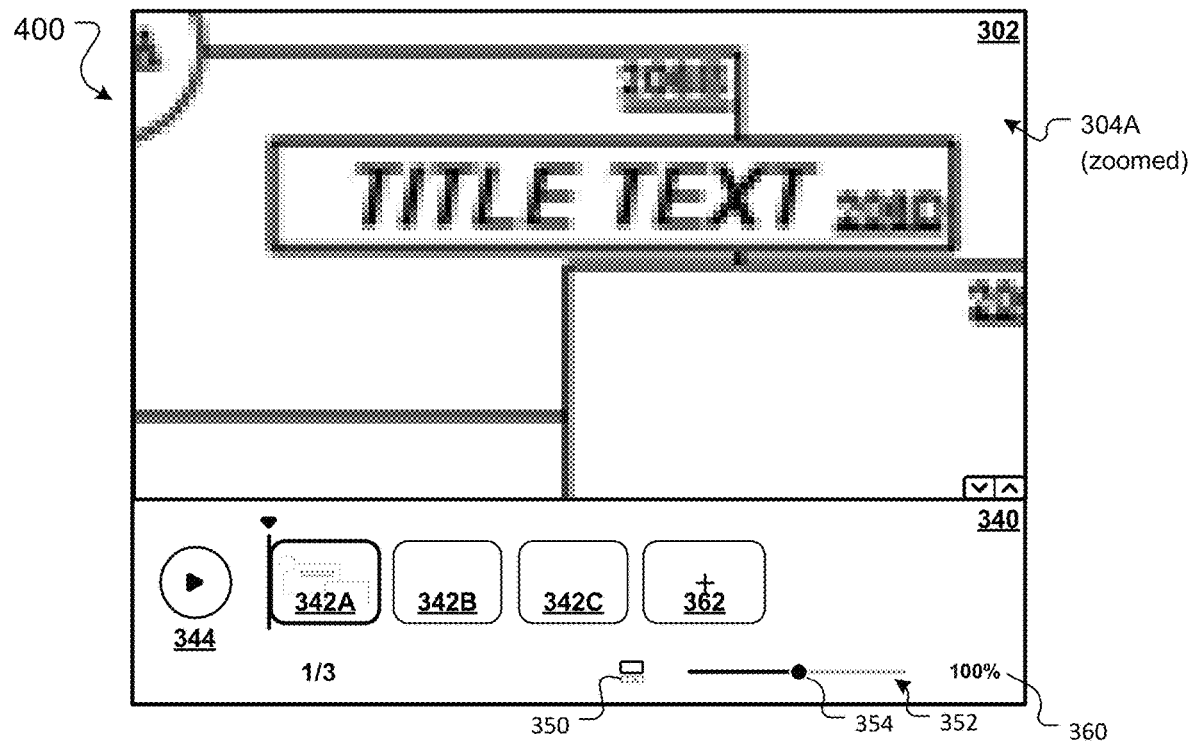

An example 400 of this is depicted in FIG. 4 in which the zoom mode control 350 is set so that the editor zoom mode is active. As can be seen, in FIG. 4 the zoom level control 352 is set to a zoom level of 100% (as indicated by the zoom level indicator 360). In the editing zoom mode, application 200 has applied this zoom level to the component 304A displayed in the editing GUI 302.

Figure 5:
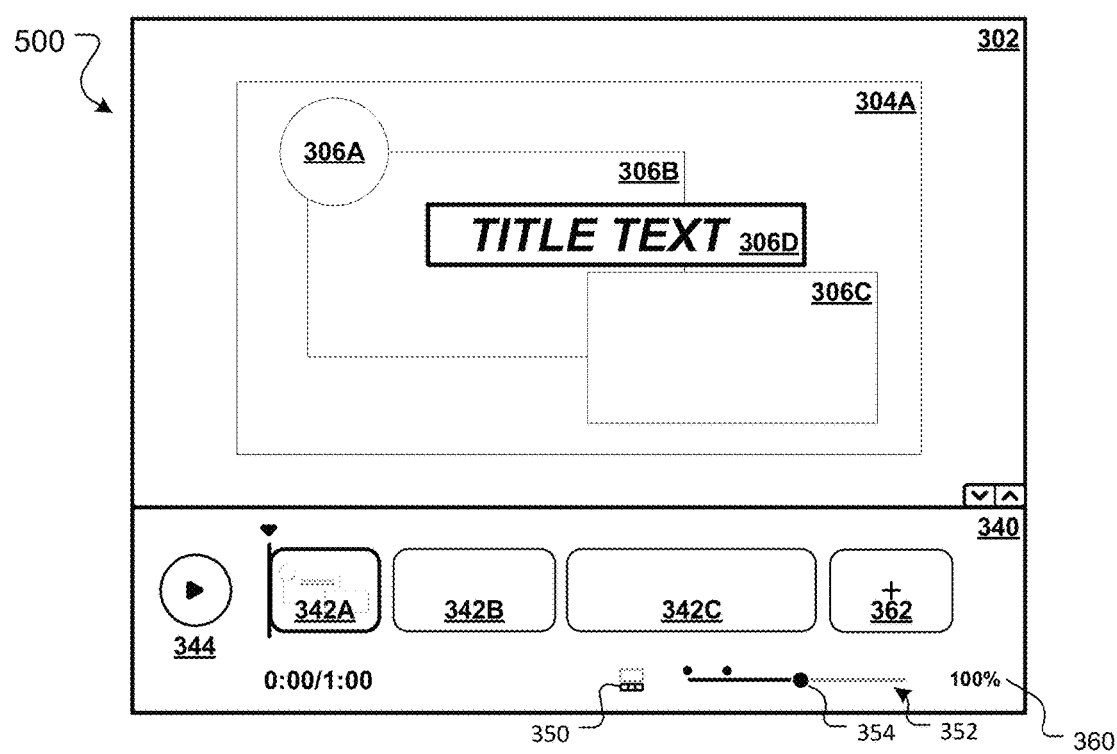

Conversely, in the overview zoom mode, changes to the zoom level (e.g. via the zoom level control 352) only impact the preview(s) 342 displayed in the overview GUI 340. An example of this is depicted in FIG. 5. As can be seen, in FIG. 5 the zoom level control 352 is set to a zoom level of 100% (as indicated by the zoom level indicator 360). In the overview zoom mode, application 200 has applied this zoom level to the previews 342 displayed in the overview GUI 340. Zoom operations with respect to previews 342 are described further below. In the example of FIG. 5, previews 342B and 342C have been zoomed by changing (in this case increasing) their widths to provide a visual indication of the durations of the components those previews correspond to.

In the present examples, the zoom mode control 350 has alternating appearances that correspond to the different modes of operation: i.e. a first appearance that corresponds to the editor zoom mode (and provides a visual indication that the editor zoom mode is active, an example of which can be seen in FIG. 4) and a second appearance that corresponds to the overview zoom mode (and provides a visual indication that the overview zoom mode is active an example of which can be seen in FIG. 5).

Furthermore, in the present implementation, the application 200 is configured to only display the zoom mode control 350 when the asset currently being edited is a playable asset (and, conversely, to not display the zoom mode control 350 when the asset currently being edited is not a playable asset). In such implementations, application 200 will only operate in the editor zoom mode for non-playable assets.

In certain embodiments, the application 200 is also configured to automatically switch zoom modes based on other user interactions—i.e. based on user interactions other than interaction with a manual zoom mode switching control such as control 350.

In particular, application 200 may be configured to automatically set the zoom mode to the overview zoom mode on detecting a user interaction associated with the overview GUI 340 (excluding user interaction with the switch zoom mode control 350 or zoom level control 352). This may, for example, be user interaction with a component preview 342, an audio element preview 3002 (as described below), the play control 244, the play head 346, or another user input that is associated with the overview GUI 340 (e.g. a mouse click or touchscreen contact within the overview GUI 340).

Similarly, application 200 may be configured to automatically set the zoom mode to the editor zoom mode on detecting user interaction with a user interface element in the editing GUI 302. This may, for example, be user interaction with the component 304 in the editing GUI 302, a design element 306 of that component, or other user input that is associated with the editing GUI 302 (e.g. a mouse click or touchscreen contact within the editing GUI 302).

In certain implementations the application 200 saves zoom levels that have been defined by a user when switching between zoom modes. Consider, for example, a sequence of user interactions that: select a first zoom level while in the overview zoom mode; switch to the editor zoom mode; set a second zoom level for a first component displayed in the editing GUI 302; and switch back to the overview zoom mode. In this case, the previews 342 will be displayed at the first zoom level while operation switches to the editor zoom mode and back to the overview zoom mode. Further, when operation switches back to the overview zoom mode, the application 200 continues to display the first component at the second zoom level.

FIG. 5, therefore, depicts a scenario in which only the preview zoom level has been altered by the user—and therefore component 304A is displayed in the editing GUI 302 at a default/original zoom level (rather than the enlarged zoom level depicted in FIG. 4).

The application 200 may provide additional and/or alternative mechanisms for switching between the design and overview zoom modes.

Figure 6:
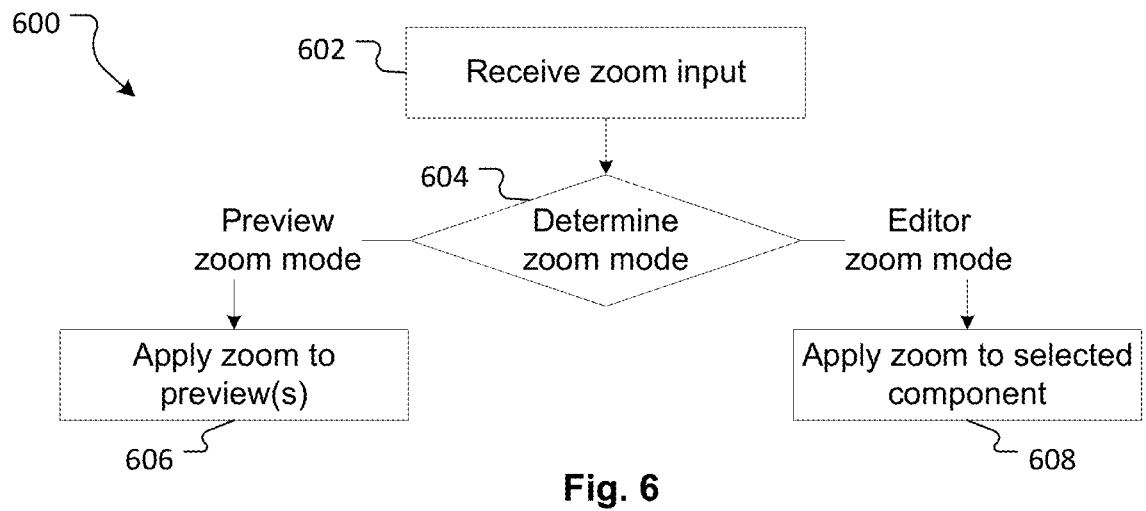
FIG. 6 is a flowchart depicting operations involved in a zoom process.

Turning to FIG. 6, an example zoom process 600 will be described.

At 602, the application 200 receives a zoom input. This may be via user interaction with a zoom level control such as control 352.

At 604, the application 200 determines the current mode of operation (with respect to zooming): e.g. whether the editor zoom mode or overview zoom mode is active.

If, at 604, the current operational mode is a overview zoom mode, processing proceeds to 606. At 606, the application 200 applies the zoom defined by the zoom input to component previews (e.g. preview(s) 342 displayed in an overview GUI 340). Applying zoom levels to component previews is discussed further below.

If, at 604, the current operational mode is the editor zoom mode, processing proceeds to 608. At 608, the application 200 applies the zoom defined by the zoom input to a selected component of the asset being edited (e.g. component 304 displayed in editing GUI 302).

Figure 43:
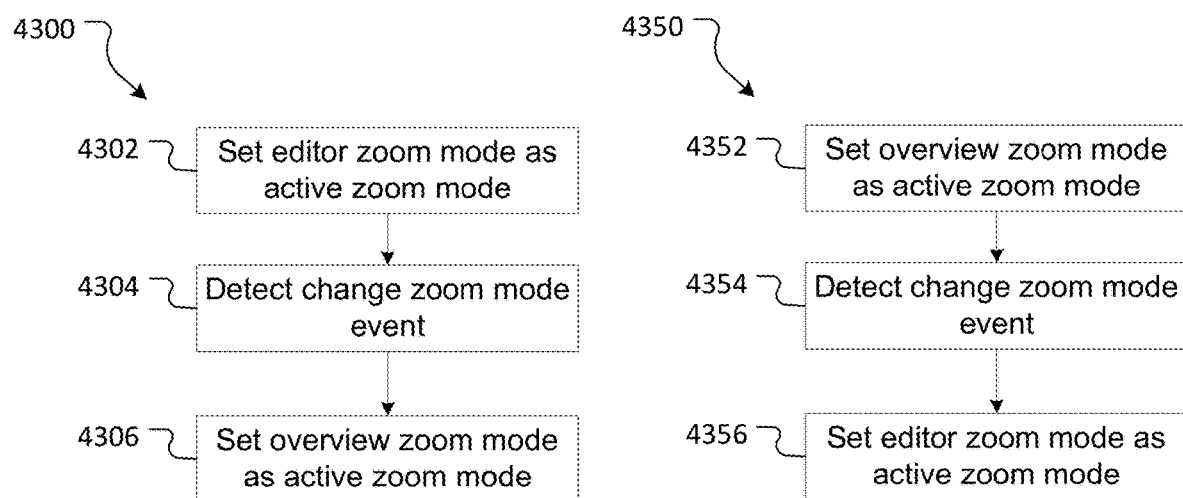
FIG. 43 provides flowcharts depicting operations involved in switching between editor and overview zoom modes.

Turning to FIG. 43, example processes 4300 and 4350 for switching between editor and overview zoom modes will be described.

Process 4300 describes switching from an editor zoom mode to an overview zoom mode.

Application 200 performs process 4300 while the editor zoom mode is currently active. Accordingly, at 4302 application 200 sets the editor zoom mode as the active zoom mode. In certain embodiments, application 200 may be configured such that the editor zoom mode is a default zoom mode.

At 4304, while the editor zoom mode is active, the application 200 detects occurrence of a change zoom mode event.

The change zoom mode event may be user input that manually causes the application 200 to change the zoom mode—for example user input activating a manual zoom mode toggle control (such as control 350).

Alternatively, the change zoom mode event may be user input that automatically causes the application 200 to change the zoom mode. Where the currently active zoom mode is the editor zoom mode, the change zoom mode event may be detecting user input in the overview GUI 340 (excluding user interaction with the switch zoom mode control 350 or zoom level control 352). This may, for example, be user input with respect to a component preview (such as 342), an audio element preview (such as 3002), a play control (such as 244), or a play head (such as 346), or other user input in the overview GUI 340 (e.g. a mouse click or touchscreen contact within the overview GUI 340).

At 4306, in response to detecting the change zoom mode event, the application 200 sets the overview zoom mode as the active zoom mode.

Process 4350 describes switching from an overview zoom mode to an editor zoom mode.

Application 200 performs process 4350 while the overview zoom mode is currently active. Accordingly, at 4352 application 200 sets the overview zoom mode as the active zoom mode. In certain embodiments, application 200 may be configured such that the overview zoom mode is a default zoom mode.

At 4354, while the overview zoom mode is active, the application 200 detects occurrence of a change zoom mode event.

The change zoom mode event may be user input that manually causes the application 200 to change the zoom mode—for example user input activating a manual zoom mode toggle control (such as control 350).

Alternatively, the change zoom mode event may be user input that automatically causes the application 200 to change the zoom mode. Where the currently active zoom mode is the overview zoom mode, the change zoom mode user event may be detecting user input in the editing GUI 302. This may, for example, be user input with respect to the component 304, a design element of that component 306, or other user input in the editing GUI 302 (e.g. a mouse click or touchscreen contact within the editing GUI 302).

At 4356, in response to detecting the change zoom mode event, the application 200 sets the editor zoom mode as the active zoom mode.

Display of Controls Based on Asset Type

In certain implementations, the application 200 is configured to selectively display or not display certain controls in the overview GUI 340 depending on whether the asset being edited is a playable asset or non-playable asset.

Controls that are selectively displayed for a playable asset will be referred to as playable asset controls. In the present embodiments, the playable asset controls include playback controls (e.g. playback control 344 and playhead 346), a zoom mode control (e.g. control 350), and zoom snap-point indicators (e.g. 356 and 358).

In particular, the application 200 is configured to only display playable asset controls when the asset being edited is a playable asset. As described above, a playable asset is an asset that includes at least one playable component. As also described above, playable components include: video scenes; document pages with one or more playable elements (e.g. video, audio, or other playable elements); document pages for which page timing has been defined while the presentation-enabled mode of operation is active (noting, as described above, that in certain implementations some document types will automatically have default page timing data and the presentation-enabled mode of operation will be active by default).

Figure 7:
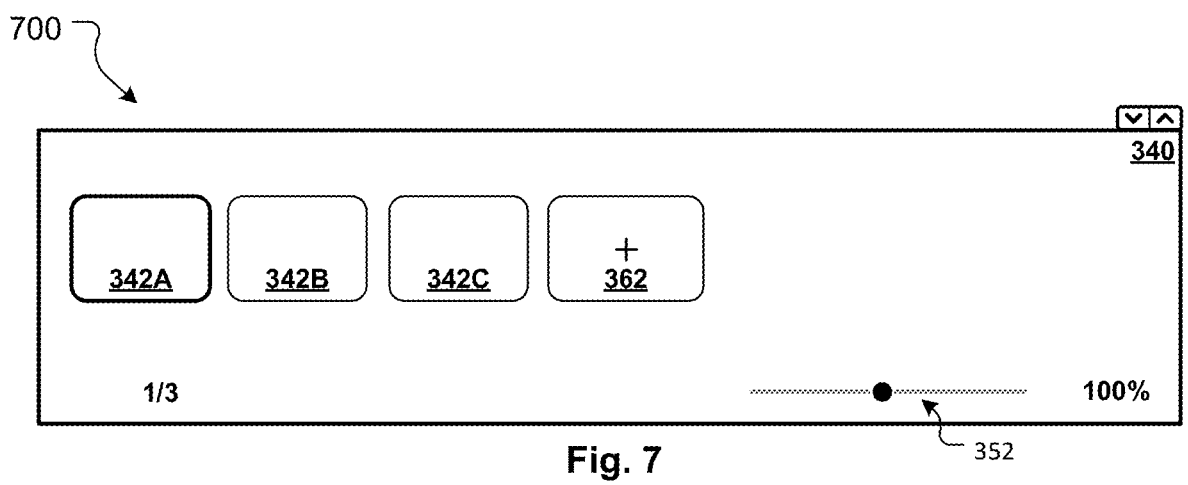
FIGS. 7 and 8 depict example graphical user interfaces.

FIG. 7 depicts an example 700 of the overview GUI 340 in which no playable asset controls are displayed in the overview GUI 340. The application 200 displays such an overview GUI 340 when the asset in question is a non-playable asset (in this case, when none of the components corresponding to previews 342A, 3426, or 342C are playable components)

Figure 8:
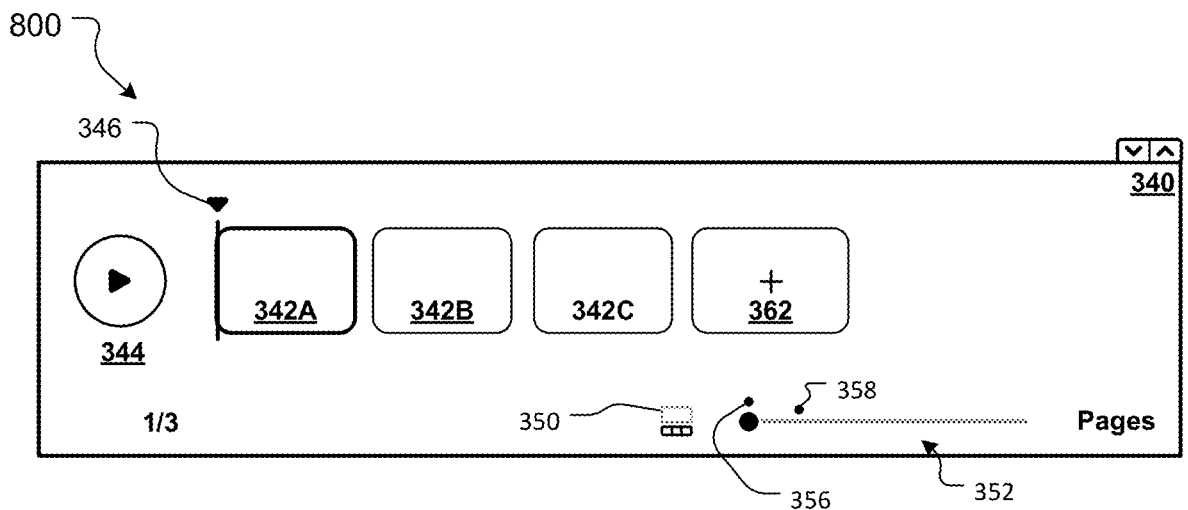

FIG. 8 depicts an example 800 of the overview GUI 340 in which playable asset controls are displayed—specifically playback controls (play control 344 and playhead 346), zoom mode control 350, and zoom snap-point indicators 356 and 358 (which are described further below). The application 200 displays such an overview GUI 340 when the asset in question is a playable asset (in this case, when one or more of the components corresponding to previews 342A, 342B, or 342C are playable components).

Figure 9:
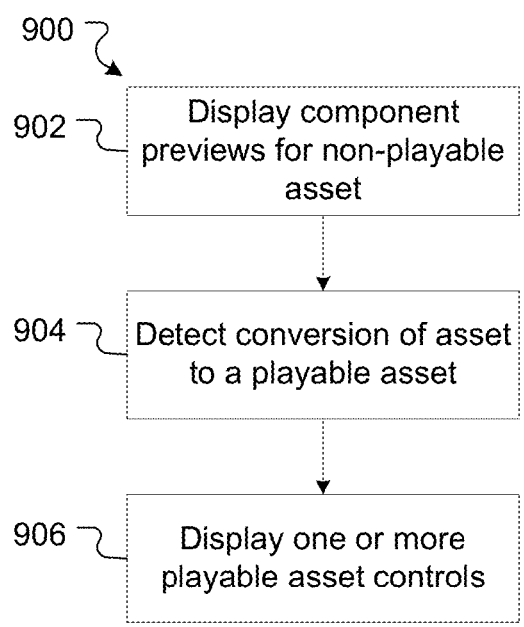
FIG. 9 is a flowchart depicting operations involved in a process for displaying playable asset controls.

In certain implementations, the application 200 is configured to detect when a non-playable asset is changed to a playable asset and, in response, automatically display one or more playable asset controls. This may be referred to as a display playable asset controls process, an example of which 900 will be described with reference to FIG. 9.

At 902, the application 200 displays component previews 342 for a non-playable asset. As the asset is a non-playable asset the application 200 does not display any playable asset controls.

At 904, the application 200 detects a conversion event that converts the non-playable asset to a playable asset. This event may, for example, be user input that adds a playable design element to the asset. This may, for example, be user input that converts one of the (non-playable) components of the asset to a playable component. This may, for example, be user input that adds a playable element (such as a video) to a component of the asset. As one specific example, this may be input that drags a search result 324 in respect of a playable element from the search GUI 330 and drops it onto the component 304 currently displayed in the editing GUI 302. As another example, the conversion event may be user input that adds an audio element to the asset (e.g. by input that drags a search result 324 in respect of an audio element from the search GUI 330 and drops it onto the component 304 or a preview 342). Alternatively, the conversion event may be user input that adds an entirely new (playable) component to the asset. Further alternatively, in implementations that provide presentation-enabled and presentation-disabled modes of operation (as discussed above) the conversion event may be user input to switch from a presentation-disabled mode of operation (in which any defined page timing data is ignored, and pages with associated page timing data are treated as non-playable components) to a presentation-enabled mode of operation (in which page timing data is not ignored, and pages with associated page timing data are treated as playable components)—e.g. by interaction with a change presentation mode control such as 332E described above.

At 906, in response to detecting the conversion event (converting the asset from a non-playable asset to a playable asset), the application 200 displays one or more playable asset controls. In the present example, the one or more playable asset controls include a play control 344, a playhead 346, a zoom mode control 350, and zoom snap-point indicators 356 and 358.

Figure 10:
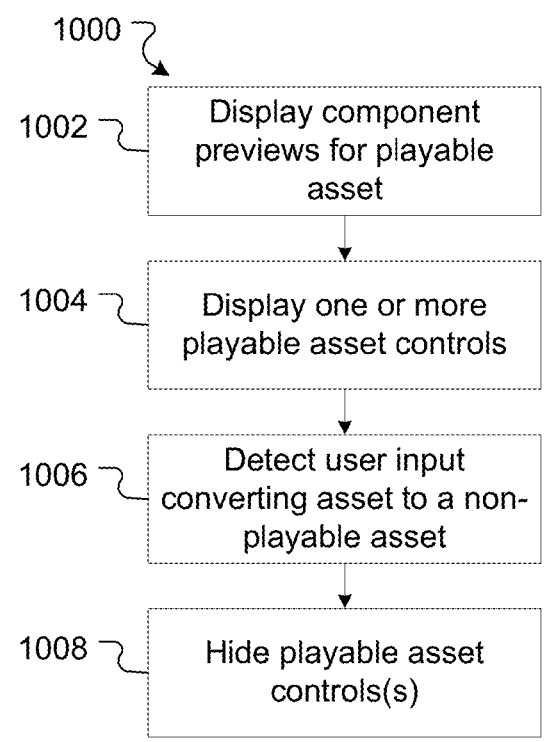
FIG. 10 is a flowchart depicting operations involved in a process for hiding playable asset controls.

In certain implementations, the application 200 is further configured to detect when a playable asset is changed to a non-playable asset and, in response, automatically hide any playable asset controls that were displayed prior to the conversion. This may be referred to as a hide playable asset controls process, an example 1000 of which will be described with reference to FIG. 10.

At 1002, the application 200 displays component previews 342 for a playable asset.

At 1004, the application 200 displays one or more playable asset controls. In the present example, the one or more playable asset controls include a play control 344, a playhead 346, a zoom mode control 350, and zoom snap-point indicators 356 and 358.

At 1006, the application 200 detects a conversion event that converts the playable asset to a non-playable asset. This event may, for example, be user input that removes a sole (or final) playable design element from the asset. This may, for example, be input that converts a sole playable component of the asset to a non-playable component—e.g. user input that removes a sole playable element (such as a video or audio element) from the sole playable component of the asset. This may, for example, be user input that selects the sole playable element on the component 304 on the editing GUI 302 and deletes that element. Alternatively, the event may be user input that deletes a sole playable component from the asset in its entirety. This may, for example, be user input that selects the preview 342 of the sole playable component in the overview GUI 340 and deletes that component. Further alternatively, the conversion event may be user input that deletes a final (sole) audio element from the asset (assuming there are no other playable design elements in the asset)—for example by selecting an audio element preview 3002 (discussed below) and deleting it. Still further alternatively, in implementations that provide presentation-enabled and presentation-disabled modes of operation (as discussed above), the event may be user input to switch from a presentation-enabled mode of operation (in which application 200 respects page timing data, and pages with associated page timing data are treated as playable components) to a presentation-disabled mode of operation (in which any defined page timing data is ignored, and pages with associated page timing data are treated as non-playable components)—e.g. by interaction with a change presentation mode control such as 332E described above.

At 1008, in response to detecting conversion of the asset from a playable asset to a non-playable asset, the application 200 hides the one or more playable asset controls that are displayed.

By automatically hiding playable asset controls (and only displaying them when relevant), the display area in the overview GUI 340 is more efficiently used. Further, by hiding playable asset controls when a non-playable asset is being displayed a user is not distracted by controls that have no relevance to the asset being viewed/edited.

Overview Zoom Mode

Operation of the overview zoom mode will now be described. As noted above, in the overview zoom mode of operation, any zoom adjustments that are made (e.g. by a user interacting with zoom control 350) are applied to the preview(s) 342 and not the component 304 displayed in the editing interface 302.

In the present embodiments, application 200 only makes the overview zoom mode available for playable assets—i.e. when one or more of the asset components is a playable component.

FIGS. 10 to 13 show examples of the overview GUI 340 for an asset that has four components (the previews of which are 342D, 342E, 342F, and 342G) with respective durations of 6 seconds, 1 second, 3 seconds, and 3 seconds.

In the present embodiments, when in the overview zoom mode of operation the application 200 displays the zoom level control 352 with two zoom snap-points: a fixed zoom snap point (indicated by a fixed zoom snap-point indicator 356) and a minimum zoom snap-point (indicated by a minimum zoom snap point indicator 358). In these embodiments, the application 200 does not permit variable adjustment of the slider handle 354 between positions corresponding to the two snap-point indicators 356 and 358. I.e., if a user is trying to position the slider handle 354 at a point on the slide path 355 between the two snap-points the application 200 will cause the slider handle 354 to snap to a position on the slide path 355 that corresponds to one or the other of those snap-point indicators (the closest indicator to the position at which the user releases/ceases interaction with the slider handle 354). Application 200 does, however, permit variable adjustment along the slide path 355 beyond (in this example to the right of) the minimum zoom snap-point indicator 358. This portion of the slide path 355 may be referred to the variable portion 355V of the slide path 355.

It will be appreciated that snap point indicators 356 and 358 need not be displayed as per the examples. Generally, however, the zoom level control 352 will include a fixed zoom portion (or position) (in this instance the portion including/proximate the leftmost position of the slide path 355) and a scaled zoom portion (in this instance the variable portion of the slide path). Furthermore, the scaled zoom portion includes a minimum zoom position (in this example the position corresponding to snap point indicator 358) and a maximum zoom position (in this instance the rightmost position on the slide path 355).

In the present embodiments, application 200 provides two different overview zoom modes: a fixed zoom mode (in the present examples enabled by application 200 in response to the zoom handle 354 being set at a position corresponding to the fixed zoom snap-point indicator 356); and a scaled zoom mode (in the present examples enabled by application 200 in response to the zoom handle 354 being set at a position corresponding to the minimum zoom snap-point indicator 358 or a position along the variable portion 355V of the slide path 355).

In the fixed zoom mode, the preview provide by the sequence of previews 342 may be referred to (and considered as) as a thumbnail view. In the scaled zoom mode, the preview provide by the sequence of previews 342 may be referred to (and considered as) as a timeline view.

The fixed and scaled zoom modes of operation will now be described.

Fixed Zoom Mode

Figure 11:
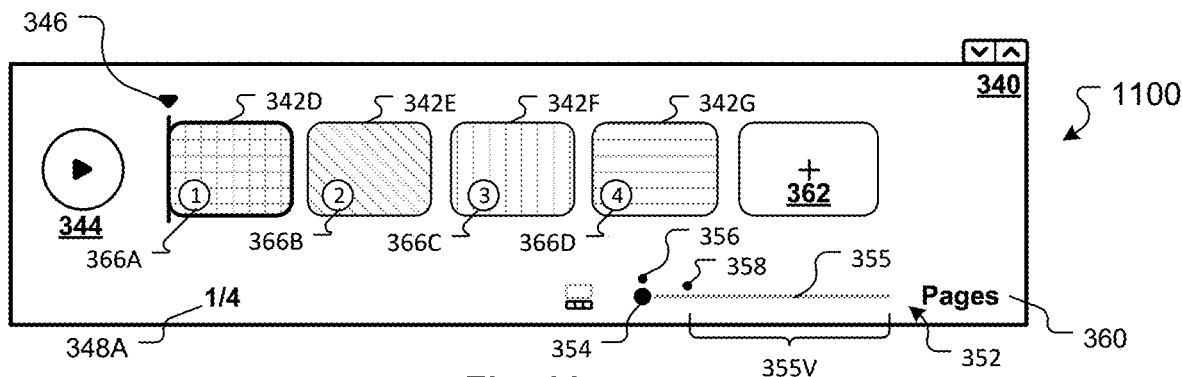
FIGS. 11 to 14 depict example graphical user interfaces.

FIG. 11 depicts an example 1100 of the overview GUI 340 as displayed by the application 200 when in the fixed zoom mode.

In the fixed zoom mode, application 200 displays all previews 342 at a common display width regardless of the play durations of the components those previews correspond to. This can be seen in FIG. 11 where previews 342D, 342E, 342F, and 342G all have the same display width (despite, as mentioned above, these components having play durations of 6 s, 1 s, 3 s, and 3 s respectively).

In the present embodiments, the application 200 is configured to determine the common display width for previews 342 based on the type of the asset being edited.

In alternative implementations, the application 200 may be configured to enforce a same common display width regardless of asset type. As one example, the common display width for previews may be 68 pixels.

In the present embodiments, and while in the fixed zoom mode, the current position indicator 348 displayed by the application 200 is a current component indicator 348A. In this example, the current component indicator 348A indicates the currently selected component by displaying a component number. In this example, the current component indicator 348A also indicates the total number of components the asset currently includes. In FIG. 11, the current component indicator 348A indicates that component 1 of the asset is currently selected (e.g. page 1 if the asset is a document or scene 1 if the asset is a video) and that the current asset has 4 components in total (e.g. 3 pages or 3 scenes). As component 1 is selected, component 1 will be displayed in the editing GUI 302 (not shown in FIG. 11) and, in this example, the preview 342A corresponding to component 1 is visually distinguished over the other previews 342 (in this case by a heavier weight bounding line).

In the present embodiments, and while in the fixed zoom mode, the zoom level indicator 360 displayed by the application 200 indicates that fixed size asset component previews (or thumbnails) are being displayed (in this particular example by displaying the word "pages").

In the present embodiments, and while in the fixed zoom mode, the application 200 displays a component position badge 366 on each preview 342. The component position badge indicates the position of the component in the asset—e.g. 1, 2, 3, and 4 for the components corresponding to previews 342D, 342E, 342F, and 342G respectively.

If the playable asset is played while in the fixed zoom mode (e.g. by activation of play control 344), the fixed widths of the previews 342 may result in the speed of the playhead 346 varying as it progress. To illustrate this, consider the present example where previews 342D and 342E correspond to components with play durations of 6 seconds and 1 second respectively. If a user plays this asset from the start, the playhead 346 will traverse the width of preview 342D in 6 seconds and traverse the width of preview 342D in 1 second. As previews 342D and 342E have the same width, this requires the application 200 to move the playhead at a much faster speed while the component corresponding to preview 342E is playing than when the component corresponding to preview 342D is playing (specifically, here, 6 times faster for the component of preview 342E).

Scaled Zoom Mode

Figure 12:
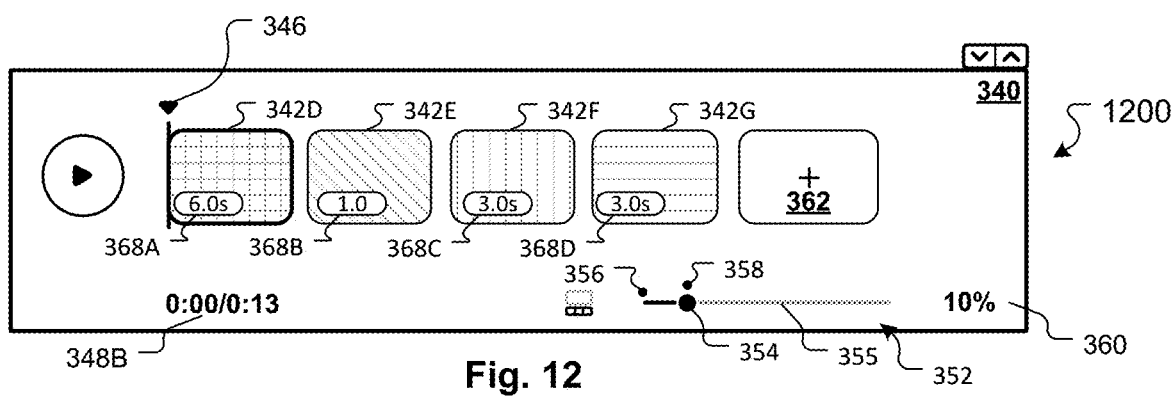
Figure 13:
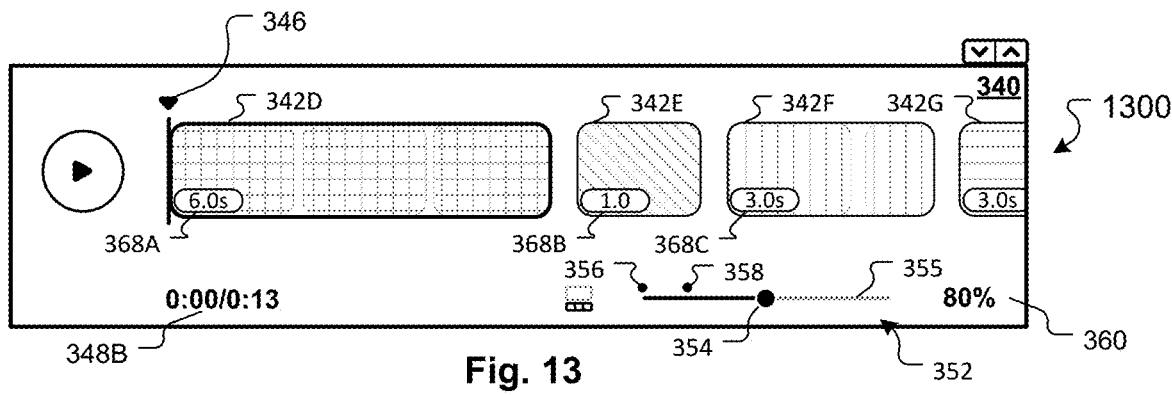
Figure 14:
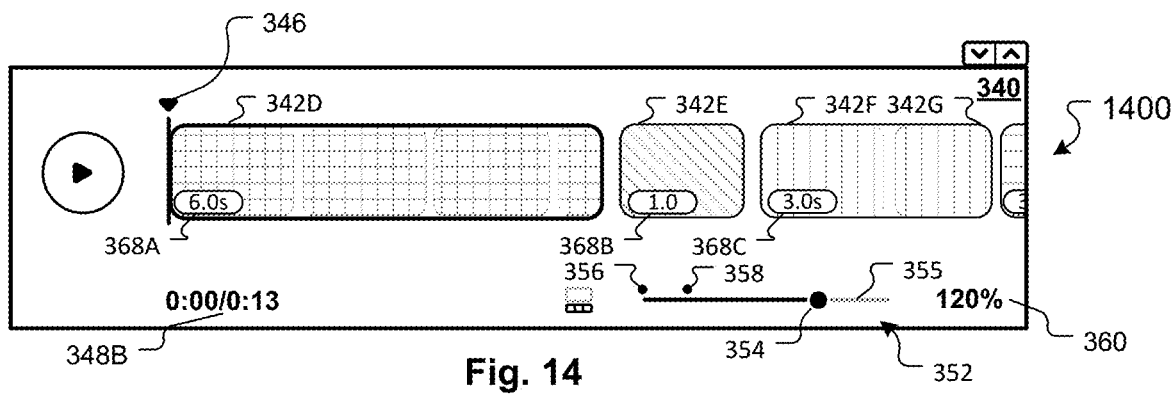

FIGS. 12, 13, and 14 depicts examples 1200, 1300, and 1400 of the overview GUI 340 as displayed by the application 200 when in the scaled zoom mode. In FIG. 12, a minimum zoom level is set (as indicated by handle 354 being aligned with the minimum zoom snap-point indicator 358). In FIG. 13, a zoom level of "80%" is set. In FIG. 14, a zoom level of "120%" is set.

In the present embodiments, and while in the scaled zoom mode, the current position indicator 348 displayed by the application 200 is a current time indicator 348B. The current time indicator 348B indicates a current time within the asset (and, in this particular example, also indicates the total play duration of the asset—i.e. the sum of the play durations of the asset's components). The current time within the asset will correspond to the position of the playhead 346. In FIG. 12, the current time indicator 348B indicates that the current time is 0:00 seconds into (i.e. the very start of) the asset and that the play duration of the asset is 13 seconds. Once again, the specific component that is currently selected is indicated by its corresponding preview (in FIG. 12 preview 342D) being visually distinguished over the other previews 342.

In the present embodiments, and while in the scaled zoom mode, the zoom level indicator 360 displayed by the application 200 indicates a numeric zoom level. In this example, the zoom numeric zoom level is a percentage value. As shown in FIG. 12, therefore, the minimum zoom mode is set at a zoom level of 10%.

In the present embodiments, and while in the scaled zoom mode, the application 200 displays a component duration badge 368 on each preview 342. The component duration badge indicates the duration of the component—e.g. 6.0 seconds, 1.0 second, 3.0 seconds, and 3.0 seconds for the components corresponding to previews 342D, 342E, 342F, and 342G respectively. In the present examples, component duration badges 368 replaces the component position badges 366 that are displayed in the fixed zoom mode.

In the scaled zoom mode, application 200 adjusts the display widths of certain previews 342 to be proportional to the play durations of their corresponding components. This provides a visual representation of the component play durations relative to one another.

More specifically, in the scaled zoom mode of the present embodiments, the application determines the display width of a given preview (and displays that preview 342 at that width) based on: a minimum preview display width; a selected variable zoom level (in the present embodiments selected by positioning the slider handle 354 in the variable portion 355V of the zoom path 355); and the duration of the component corresponding to the preview in question.

Application 200 may be configured to calculate preview display widths in various ways. As one example, application may be configured to determine display widths based on: a calculated, duration-based display width (for example, the zoom level*24 pixels*the duration (in seconds) of the component in question); a minimum display width (e.g. 68 pixels); and a maximum display width (e.g. the width of the component itself). In this specific example, the display width for a preview that corresponds to a component with a duration of x seconds will be the maximum of: 68 pixels; the component width; x seconds*zoom level*24 pixels.

In this example, the application 200 enforces a minimum preview display width: if the duration-based display width calculated for a preview 342 at a given zoom level would be less than the minimum display width, the application 200 displays that preview 342 at the minimum display width.

The minimum display width may, though need not, be the same as the common display width used in the first and minimum zoom modes discussed above.

To illustrate the above, FIGS. 11, 12, and 13 provide examples of three different zoom levels for the same example asset.

In FIG. 12, a zoom level of 10% is set. In the present embodiments this is the minimum zoom level and corresponds to the handle being positioned at the left-hand end of the variable portion 355V of the slide path 355—i.e. the position on the slide path 355 that corresponds to/is aligned with the minimum zoom snap-point indicator 358. In this particular example, at a zoom level of 10% none of the preview widths calculated for the previews 342 exceed the minimum display width. Accordingly, all previews 342 are displayed at the minimum display width in this instance.

In FIGS. 12 and 13, the slider handle 354 has been positioned along the variable portion 355V of the slide path 355—at positions corresponding to zoom levels of 80% and 120% respectively.

At zoom levels of 80% and 120%, previews 342D and 342F have been displayed at a new display widths as calculated by the application 200. This has resulted in preview 342G being pushed partially off screen. As can be seen in FIGS. 12 and 13, at these zoom levels the display widths of previews 342D and 342F are proportional to the play durations of their corresponding components. Accordingly, and in this particular example, the display width of preview 342D (which corresponds to a component with a play duration of 6 s) is approximately twice as long as the display width of preview 342F (which corresponds to a component with a play duration of 3 s). If the entire sequence of previews was scrolled or dragged to the right, preview 342G would be dragged into view. As preview 342G corresponds to a component with a 3.0 s duration, its display width would be the same as preview 342F (which also has a 3.0 s duration).

At zoom levels of 80% and 120%, however, preview 342E is displayed at the same width. This is due to the duration of the component that preview 342E corresponds to (1.0 second), at the zoom levels in question (80% and 120%), resulting in a display width that would be less than the minimum display width. Accordingly, application 200 continues to display preview 342E at the minimum display width.

Figure 15:
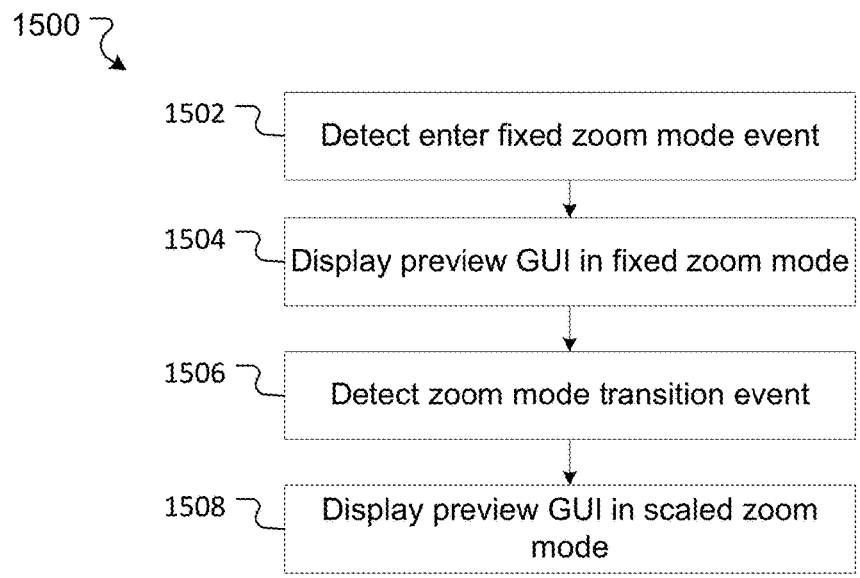
FIG. 15 is a flowchart depicting operations involved in displaying an overview GUI in accordance with a fixed zoom mode.

Turning to FIG. 15, a process 1500 for displaying the overview GUI 340 in accordance with the fixed zoom mode and transitioning from the fixed zoom mode to the scaled zoom mode will be described.

At 1502, the application 200 detects an enter fixed zoom mode event.

Various enter fixed zoom mode events are possible. For example, application 200 may be configured so that the fixed zoom mode is a default mode when overview zoom mode is initially activated (e.g. by operation of the zoom mode control 350 as described above). In this case, the first time the application 200 displays the overview GUI 340 while the overview zoom mode is active is an enter fixed zoom mode event.

Additionally, or alternatively, the enter fixed zoom mode event may be user input that positions the slider handle 354 at a position on path 355 that corresponds to the fixed zoom snap-point at a position corresponding to 356 (e.g. a position on path 355 that is directly below or proximate to the fixed zoom snap-point 356). User input to position the handle 354 at the fixed zoom snap-point at a position corresponding to 356 may, for example, be user input dragging the handle 354 along the path 355, user input directly selecting a position on the path 355, or user input selecting the fixed zoom snap-point at a position corresponding to 356 itself. As noted, in certain embodiments no fixed zoom snap point need actually be displayed and the relevant position on path 355 may be an end (the leftmost end in this particular example) of the path 355.

At 1504, in response to detecting the enter fixed zoom mode event, the application 200 displays the overview GUI 340 in accordance with the fixed zoom mode. An example fixed zoom mode is described above with reference to FIG. 11. In the present examples, displaying the overview GUI 340 in the fixed zoom mode includes: displaying a position indicator 348A indicating a current component and total number of components; displaying a zoom level indicator 360 to display a value indicating that a value indicating that fixed size previews (or thumbnails) are being displayed; and displaying component position badges 366 on previews 342.

At 1506, the application 200 detects a zoom mode transition event. In the present examples, this event is an enter scaled zoom mode event. Various enter scaled zoom mode events are possible. For example, the enter scaled zoom mode event may be user input that moves the slider handle 354 from the fixed zoom mode position to a variable zoom mode position (e.g. to a position on path 355 corresponding to the minimum zoom snap-point indicator 358 or a position within the variable portion 355V of the slide path 355).

The enter scaled zoom mode event is associated with a zoom level. This may be a default zoom level (e.g. 10% or another zoom level), or a zoom level defined by a user (e.g. determined according to where a user positions the slider handle 354 along slide path 355).

At 1508, in response to detecting the enter scaled zoom mode event, application 200 displays the overview GUI 340 in accordance with the scaled zoom mode. In the present embodiments, this involves: replacing the position indicator 348A with current time indicator 348B; updating the zoom level indicator 360 to display a numeric zoom level (e.g. 10%) rather than a value indicating that fixed size previews (or thumbnails) are being displayed; replacing the component position badges 366 with component duration badges 368.

In addition, in response to detecting the enter scaled zoom mode event, application 200 determines new preview display widths and displays previews 342 according to those widths. In the examples described above, application 200 determines the new display width for a given preview based on a duration-based display width (which, in turn, is based on the variable zoom level in question and the duration of the component the preview corresponds to), a minimum display width, and a maximum display width.

It will be appreciated that following the determination of new display widths not all previews that were originally displayed will necessarily remain displayed. For example, and referring to FIG. 14, if application 200 determined that the new display width of preview 342D was wider than (or equal to the width of) the available display area, displaying preview 342D would "push" previews 342E, 342F, and 342G off-screen. Accordingly, these previews would not immediately be displayed (though would be displayed in response to a user scrolling/swiping the preview timeline to cause later previews to be displayed).

Figure 16:
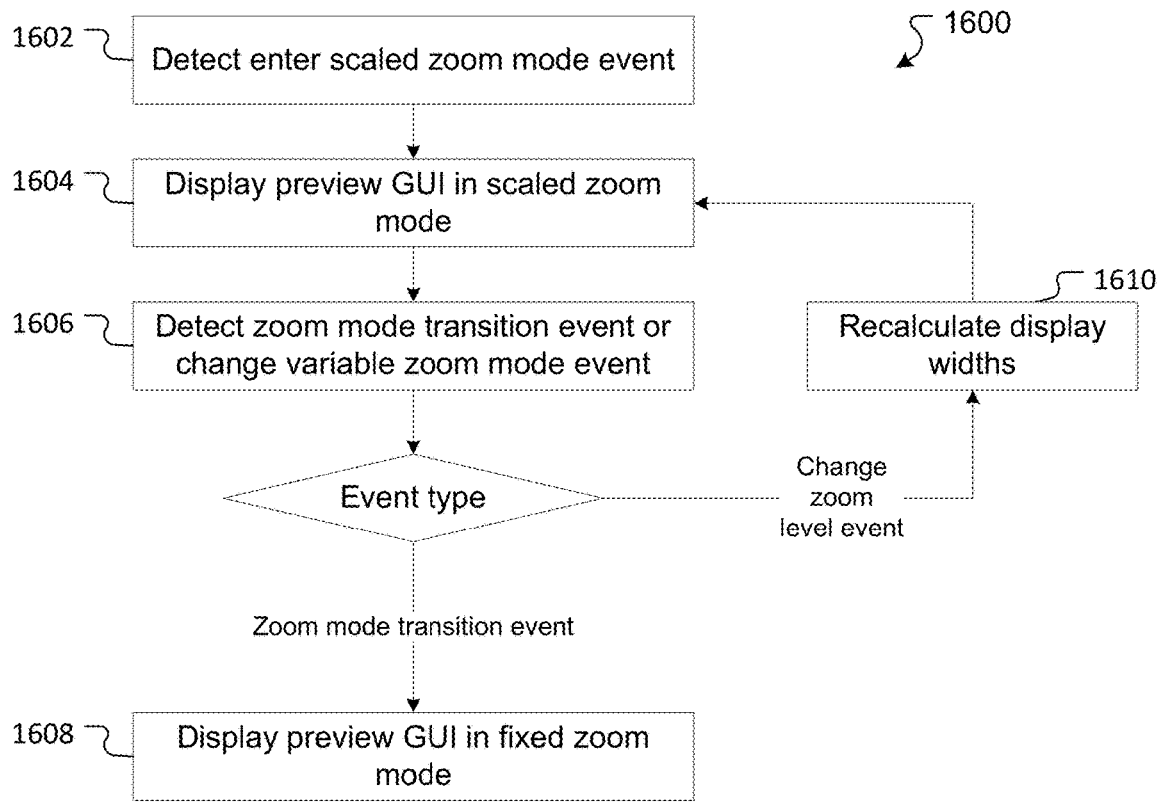
FIG. 16 is a flowchart depicting operations involved in displaying an overview GUI in accordance with a scaled zoom mode.

Turning to FIG. 16, a process 1600 for displaying the overview GUI 340 in accordance with the scaled zoom mode and transitioning from the scaled zoom mode to the fixed zoom mode (or changing the zoom level within the scaled zoom mode) will be described.

At 1602, the application 200 detects an enter scaled zoom mode event. Example enter scaled zoom mode events are described above with reference to 1506. In addition, application 200 may be configured so that instead of the fixed zoom mode being the default zoom mode, the scaled zoom mode (at a particular zoom level) is the default zoom mode when the overview zoom mode is initially activated (e.g. by operation of the zoom mode control 350 as described above). In this case, the first time the application 200 displays the overview GUI 340 while the overview zoom mode is active is an enter scaled zoom mode event.

At 1604, in response to detecting the enter scaled zoom mode event, the application 200 displays the overview GUI 340 in accordance with the scaled zoom mode. Examples of the scaled zoom mode are described above with reference to FIGS. 12 to 14. In the present examples, displaying the overview GUI 340 in the scaled zoom mode includes: displaying a current time indicator 348B; displaying the zoom level indicator 360 to display a numeric zoom level that corresponds to the current zoom level (e.g. as set by slider handle 354; displaying component duration badges 368; and displaying previews 342 at display widths that are proportional to the durations of their corresponding components.

At 1606, the application 200 detects either a zoom mode transition event or a change zoom level event.

In the present examples, the zoom mode transition event is an enter fixed zoom mode event, in response to which processing proceeds to 1608. The enter fixed zoom mode event may, for example, be user input that moves the slider handle 354 from an initial position in the variable portion 355V of the slide path 355 to a position on the slide path 355 that corresponds to the fixed zoom snap-point indicator 356.

At 1608, in response to detecting an enter fixed zoom mode event while in the scaled zoom mode, the application 200 displays the overview GUI 340 in accordance with the fixed zoom mode. In the present embodiments, this involves: replacing the current time indicator 348B with the position indicator 348A; updating the zoom level indicator 360 to display a value indicating that a value indicating that fixed size previews (or thumbnails) are being displayed (rather than a numeric zoom level); replacing the component duration badges 368 with component position badges 366; and displaying the previews 342 at the common display width.

In the present examples, the change zoom level event (detected at 1606) is an event that changes the zoom level (from a current zoom level to a new zoom level) without changing the zoom mode. This may, for example, be due to user input that moves the slider handle 354 from an initial position in the variable portion 355V of the slide path 355 to a new position in the variable portion 355V of the slide path 355. An example of this would be user input moving the slider handle 354 from the position in example 1300 of FIG. 13 to the position shown in example 1400 of FIG. 14.

At 1610, in response to detecting a change zoom level event, application calculates new display widths for the previews 342 based on (inter alia) the new zoom level. Processing then proceeds to 1604 where the application continues to display the overview GUI 340 in accordance with the scaled zoom mode, however adjusts (if needed) the previews 342 based on the newly calculated widths. In addition, the application 200 updates the zoom level indicator 360 to display a numeric value indicating the new variable zoom level.

In the present embodiments, fixed and scaled zoom modes are described. In alternative implementations, application 200 may be configured to provide the scaled zoom mode only.

Component Duration Adjustment

In certain embodiments the application 200 is configured to provide a component duration adjustment mode (referred to as the duration adjustment mode for short). While the duration adjustment mode is active a user can interact with a preview 342 to adjust the duration of the corresponding component (e.g. to decrease or increase the play duration of the component).

In the present embodiments, the application 200 is configured so that the duration adjustment mode is only active in the scaled zoom mode (and is not active in the fixed zoom mode). In alternative embodiments, the application 200 may be configured so that the duration adjustment mode is also active in the fixed zoom mode (or only active in the fixed zoom mode).

Component duration adjustment will be described with reference to FIGS. 17 to 22 which show examples of the overview GUI 340 for an asset that has four components (the previews of which are 342H, 342I, 342J, and 342K). In this example, each component initially has a duration of 3 seconds.

While the duration adjustment mode is active, the application 200 detects an initiate duration adjustment input. In the present embodiments, and in the context of a device with a cursor control device (such as a mouse), this input is hovering the cursor in a defined region of a preview 342. In the context of a touch screen display, this input may be selection of a preview 342 (e.g. by tapping/contacting the preview 342). Alternative initiate duration adjustment inputs are possible.

Figure 17:
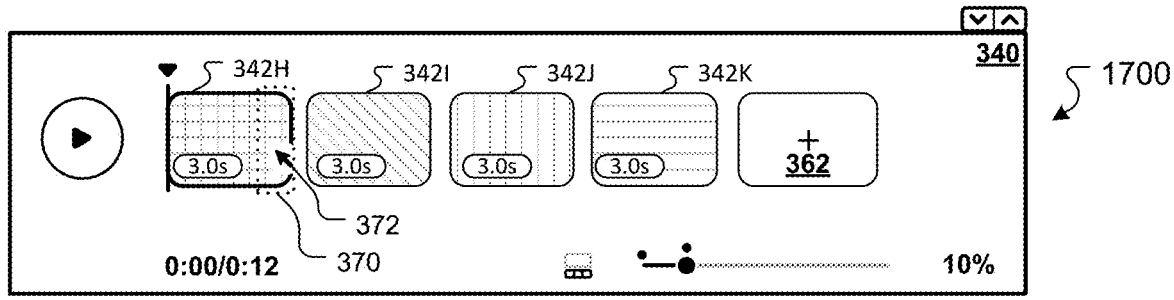
FIGS. 17 to 22 depict example graphical user interfaces.

The defined region referred to in the preceding paragraph may be a region that encompasses the trailing edge of a preview 342 (which in the current examples is the right hand edge). FIG. 17 provides an example 1700 of the GUI 340 in which an example defined region 370 is depicted. In FIG. 17 a cursor 372 is positioned in the defined region 370. It will be appreciated that region 370 need not (and in many cases will not) be a visible region that is indicated by any display elements.

Figure 18:
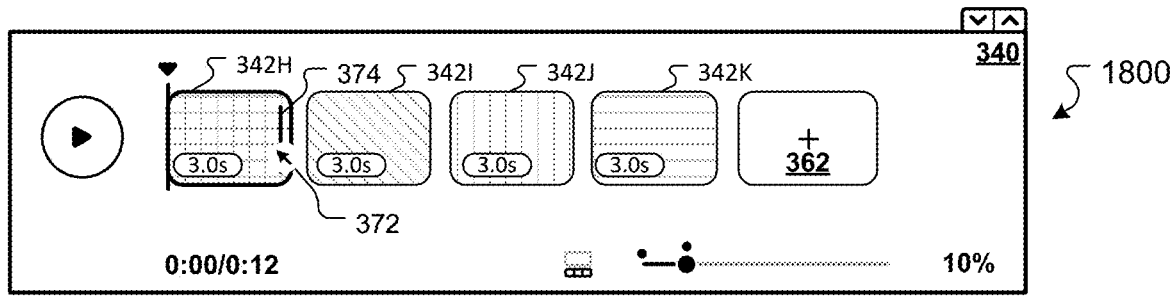

In certain embodiments, in response to detecting the initiate duration adjustment user input, the application 200 displays an adjustment indicator. This lets a user know that they can interact with the preview 342 in question to adjust its duration. FIG. 18 depicts an example 1800 of the overview GUI 340. Example 1800 follows example 1700 of FIG. 17 and is displayed by the application 200 in response to detecting the initiate duration adjustment input (in this example that input being to hover the cursor 372 in the defined region 370 of preview 342H). In FIG. 18, the adjustment indicator is a vertical line 374 that is displayed at the trailing edge of the preview 342 that can now be adjusted (displayed, in this example, in response to the cursor hovering in the defined region for a predetermined time). Alternative adjustment indicators are possible, for example an adjustment handle (e.g. a vertical bar parallel and proximate to the trailing edge of the preview) or other adjustment indicator. In alternative embodiments, no adjustment indicator is displayed.

Following the initiate duration adjustment, an adjust duration user input is received. The adjust duration user input is input that drags the trailing edge of the preview 342 in question to either increase its display length or decrease its display length. Where a cursor control device is used, the drag input may involve pressing a button (e.g. a mouse button) and moving the cursor control device while the button is pressed. Where a touch screen device is used, the drag input may involve dragging a contact (e.g. a finger or stylus) across the screen. In the present embodiments, dragging a preview's trailing edge to the left will decrease the preview's display length while drafting a preview's trailing edge to the right will increase the preview's display length.

Figure 19:
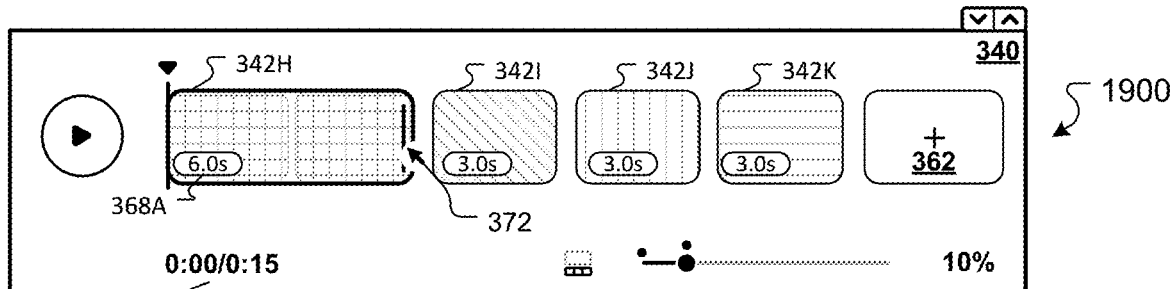

FIG. 19 depicts an example 1900 of the overview GUI 340. Example 1900 follows example 1800 of FIG. 18 and is displayed by the application 200 in response to a user dragging the trailing edge of preview 342H to the right (along the axis that the previews 342 are displayed). In response to this input, application 200 increases the display width of preview 342H so the preview's trailing edge follows the cursor 372. In addition, application 200 calculates a new duration for the component that is represented by preview 342H. The new duration for the component is calculated based on the original duration of the component and the distance (in this example the horizontal/x distance) that the trailing edge of the preview 342H is dragged. Once the new duration has been calculated, the application also: updates the duration badge 368A for the preview 342H to display an adjusted duration (in this case the newly calculated duration is 6 s); and updates the current time indicator 348B to reflect the new total duration of the asset (in this case to 15 s).

In the present embodiments, application 200 is configured to continually calculate a new duration (and update display of the duration badge 368A and current time indicator 348B) while the user continues the adjust duration input (e.g. by dragging left or right).

On detecting completion of the duration adjustment input (e.g. release of a pressed mouse button or breaking contact with a touch screen display), the duration adjustment is complete. In response, the application 200 causes the adjusted duration for the relevant component to be recorded. Generally speaking, this will involve editing asset data—e.g. by updating a duration attribute (and/or other relevant attributes) for the component that has been adjusted. Depending on the architecture in question, the application may directly edit the component data (e.g. on locally accessible storage) or, in a client server architecture, may communicate relevant data to a server for the server to handle updating the component's duration.

Figure 20:
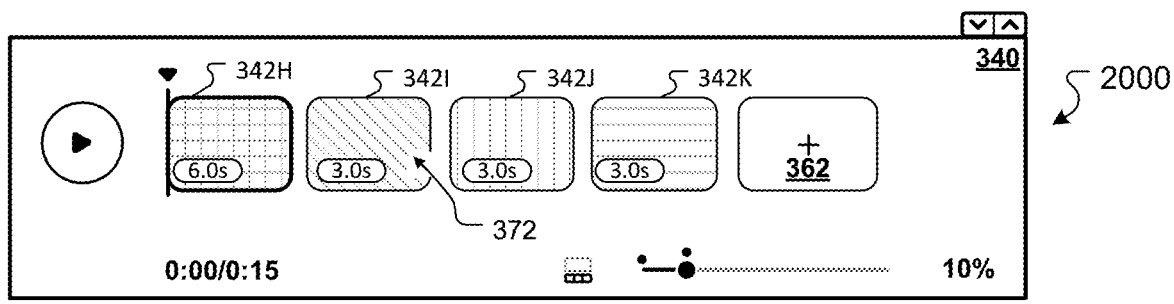

On detecting completion of the duration adjustment input, application 200 recalculates a display width for the relevant preview 342 in accordance with the zoom level that is currently set. As can be seen, in FIGS. 17, 18, and 19 the zoom level is 10% (the minimum zoom level in these examples). At this zoom level, and in the present example, the adjusted duration of the component corresponding to preview 243H results in a display width of less than the minimum display width being calculated. Accordingly, on completion of the duration adjustment input illustrated in FIG. 19, application 200 re-displays preview 342H at the minimum zoom level. This is depicted in FIG. 20. To do so, application 200 may animate preview 342H to give it the appearance of snapping or bouncing back to the minimum display width. The adjustment to the component's duration is still reflected, however, in the duration badge 368A (which indicates the adjusted duration of the corresponding component—6.0 s) and the current time indicator 348B (which indicates the adjusted total duration of the asset—15 s).

On detecting completion of the duration adjustment, application 200 also ceases to display the adjustment indicator 374.

As noted, the adjustment example described above with reference to FIGS. 18, 19, and 20 is performed while the overview GUI 340 is displayed in accordance with the minimum zoom mode. Accordingly, on completion of the adjustment, the application 200 re-displays the preview 342H at the common display width (per FIG. 20). If, however, the adjustment described with reference to FIGS. 18, 19, and 20 was performed while the overview GUI 340 was displayed in the scaled zoom mode, the application would not need to re-display the preview 342H at the common display width. In this case, the adjusted preview 342H would retain its adjusted display width (e.g. as shown in FIG. 19).

Figure 21:
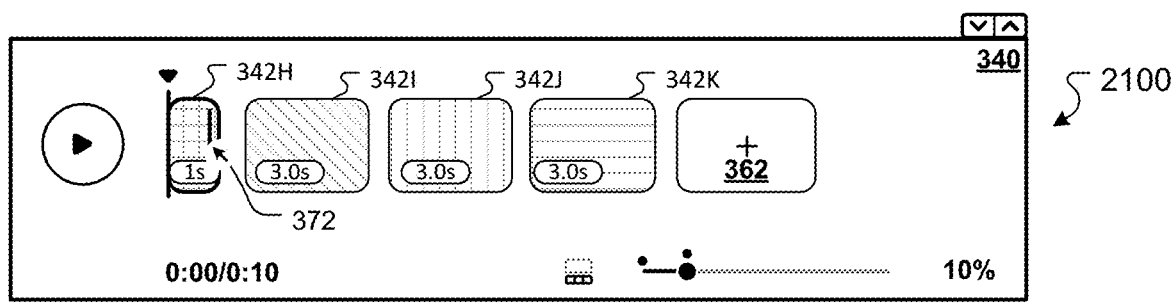

Turning to FIG. 21, a further example 2100 of the overview GUI 340 is depicted. Example 2100 follows example 1800 of FIG. 18, however depicts an alternative adjustment to that described above with reference to FIGS. 19 and 20. In example 2100, the duration adjustment made by a user is to reduce the duration of the component corresponding to preview 342H by dragging the trailing edge of preview 342H to the left. In response to this input, application 200 decreases the display width of preview 342H so the preview's trailing edge follows the cursor 372. As with the preceding example, the application 200 also: calculates a new duration for the component; updates the duration badge 368A (in this case to 1 s), and updates the current time indicator 348B (in this case to display a total duration of 10 s).

Figure 22:
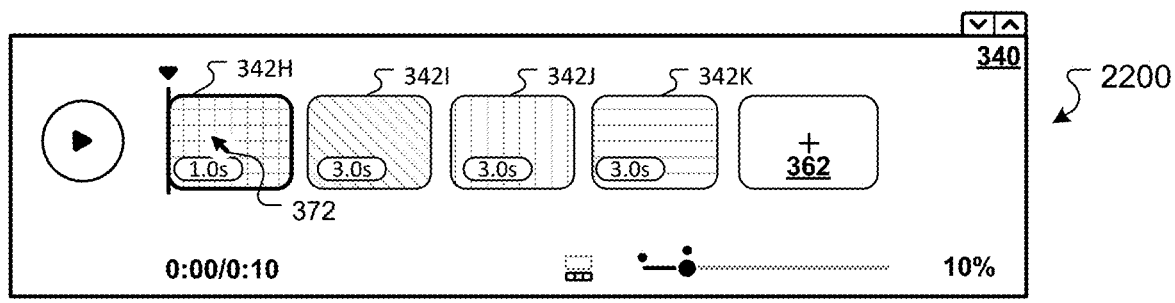

FIG. 22 depicts an example 2200 of the overview GUI 340 that is displayed following example 2100 of FIG. 21 and in response to detecting completion of the duration adjustment input. In FIG. 22, the calculated display width for preview 342H is again less than (or equal to) the minimum display width. Accordingly, application 200 re-displays preview 342H at the minimum display width (and ceases to display the adjustment indicator 374). Once again, application 200 may animate the preview to provide the appearance if it snapping or bouncing back to the minimum display width. The adjustment to the component's duration is still reflected, however, in the duration badge 368A (which indicates the adjusted duration of the corresponding component—1.0 s) and the current time indicator 348B (which indicates the adjusted total duration of the asset—10 s).

In the examples of FIGS. 20 and 22, the zoom level, adjusted component durations, and minimum display width are such that application 200 displays the adjusted preview 342H at the minimum zoom level on completion of the duration adjustment. It will be appreciated that with alternative zoom levels, alternative adjusted durations, and/or an alternative minimum display width, redisplaying the preview 342H on completion of the duration adjustment may not involve redisplaying the preview 342H at the minimum display width but, instead, displaying it an different display width. Further, in some situations the zoom level, adjusted duration, and minimum display width may be such that the display width calculated for the preview 342H following completion of the duration adjustment may be the same as the display width of the preview during the adjustment.

Figure 23:
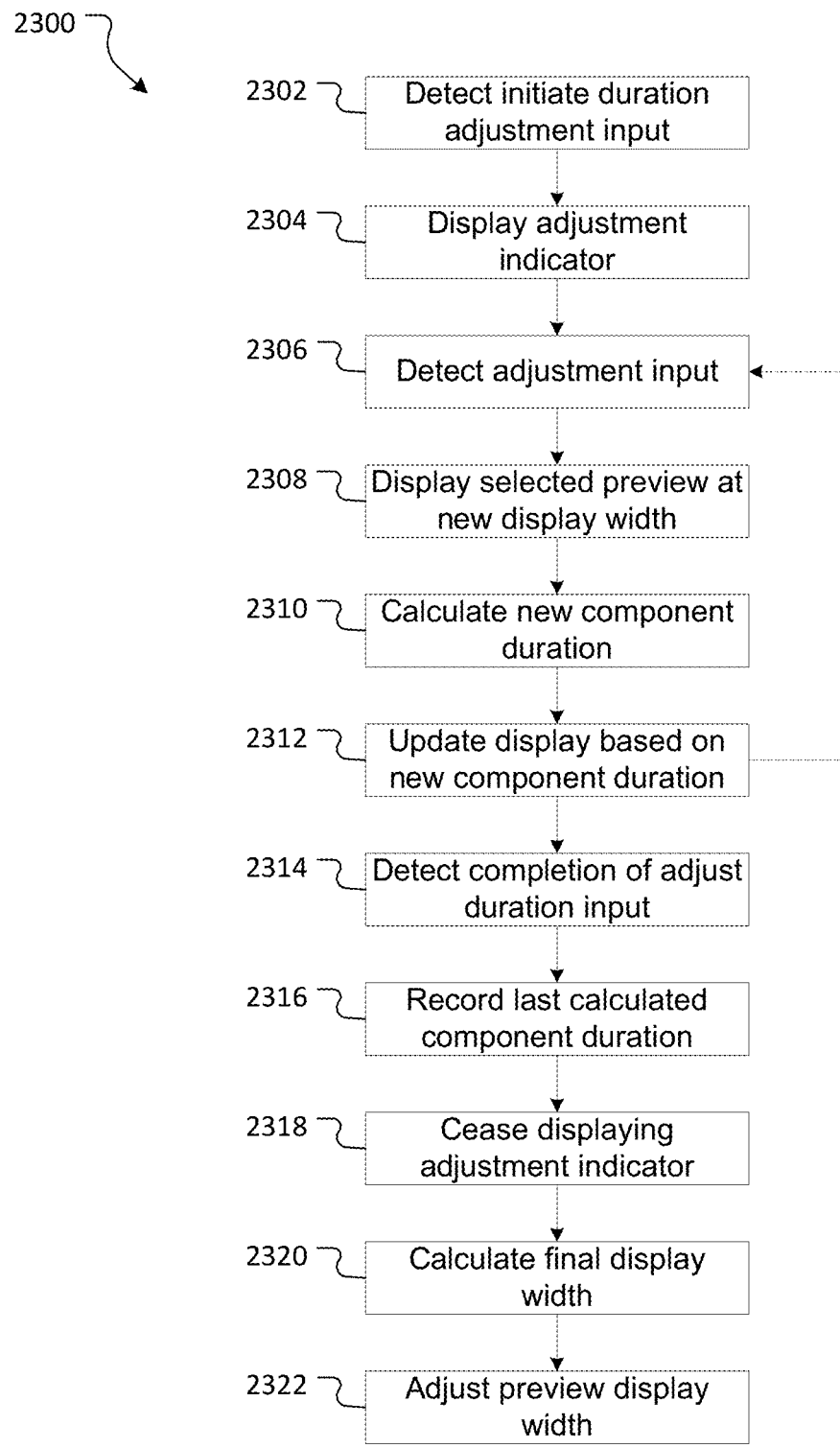
FIG. 23 is a flowchart depicting operations involved in a component duration adjustment process.

Turning to FIG. 23, an example component duration adjustment process 2300 will be described.

At 2302, the application 200 detects an initiate duration adjustment input. As described above, this may, for example, be a hover input in a defined region, selection of a preview, or an alternative input. The initiate duration adjustment input is in respect of a selected preview 342 (and, accordingly, the component corresponding to that selected preview).

In the present example, at 2304, in response to detecting the initiate duration adjustment input, the application 200 displays an adjustment indicator (an example of which is described above with reference to FIG. 18).

At 2306, the application 200 detects an adjust duration input with respect to the selected preview. This may be an increase duration input (e.g. input moving the trailing edge of the selected preview to the right) or a decrease duration input (e.g. input moving the trailing edge of the selected preview to the left).

At 2308, in response to detecting the adjust duration user input, the application 200 displays the selected preview 342 at a new display width corresponding to the adjust duration user input. In the present examples, this involves moving the trailing edge of the preview in question in accordance with the adjustment duration input—e.g. in accordance with the current position of the drag input or gesture that is moving the trailing edge of the preview 242.

At 2310, the application 200 calculates a new component duration for the component corresponding to the selected preview 342. The new component duration is based on the current position of the preview's trailing edge (or, specifically, the distance between the preview's leading edge and its newly positioned trailing edge) and the current zoom level.

As will be appreciated, there is symmetry between the way in which the new duration for a component is calculated and the way a new display width of a preview is calculated (as described above). In the above example, the duration-based width for a preview was calculated as (current zoom lever*24 pixels*component duration (in seconds)). In this case, the new duration for a component whose duration has been adjusted by resizing its preview can be calculated as (new component preview width/24 pixels/current zoom level). Here, the new component width is the horizontal distance between the corresponding preview's leading edge and its newly positioned trailing edge—e.g. trailing edge x-coordinate minus leading edge x-coordinate.

At 2312, the application 200 updates the overview GUI 340 in accordance with the calculated component duration. As described above, this update may include, for example, updating display of a duration badge 368 to display the component duration calculated at 2310 and/or updating a total asset duration to account for the calculated component duration.

In the present embodiments, the application 200 is configured to continuously perform operations 2308, 2310, and 2312 while the adjust duration user input is detected.

At 2314, the application 200 detects completion of the adjust duration user input. This may, for example, be releasing a mouse/cursor control device button or a user breaking contact with a touch screen.

At 2316, in response to detecting completion of the adjust duration user input, the application 200 causes the adjusted duration of the component (i.e. as last calculated at 2308) to be written to the asset data.

In the present example, at 2318, in response to detecting completion of the adjust duration user input, the application 200 ceases to display the adjustment indicator.

At 2320, the application 200 calculates a final display width for the preview that was being adjusted. This calculation is based on the adjusted duration (as last calculated at 2310), the current zoom level, and the minimum display width.

At 2322, the application 200 displays the selected preview at the final display width calculated at 2320. As noted, the display width calculated at 2320 may be the same display width that the preview 342 has at the end of the adjustment input (in which case the width of the preview 342 need not change). Displaying the selected preview at the final display width may involve changing the position of other previews 342 (e.g. to account for the selected preview shrinking).

Inter-Preview Controls

In certain embodiments, application 200 is configured to detect a display inter-preview control input and, in response, display one or more inter-preview controls. This will be described with reference to FIGS. 24 to 29.

Figure 24:
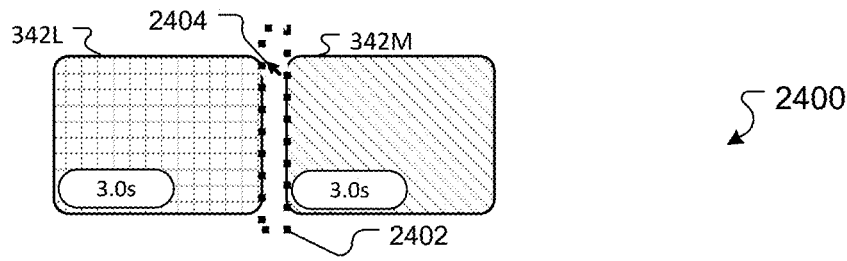
FIGS. 24 to 28 depict example graphical user interfaces.

FIG. 24 is an example 2400 of a portion of the overview GUI 340 in which only two adjacent previews 342L and 342M are displayed. Previews 342L and 342M are intended to be representative of any adjacent previews 342 that are displayed in the overview GUI 340.

In the present example, the display inter-preview control input is input in a defined region 2402 between two adjacent previews 342. In the context of a device with a cursor control device (such as a mouse), this input is hovering the cursor in the defined region between two previews 342. In the context of a touch screen display, this input may be a dwell gesture in the defined region 2402. Alternative display inter-preview control inputs are possible.

In response to detecting the display inter-preview control input, application 200 displays one or more inter-preview controls. In the present embodiments, the inter preview controls that are displayed vary depending on the previews 342 in question and any transition already defined between those previews.

Figure 25:
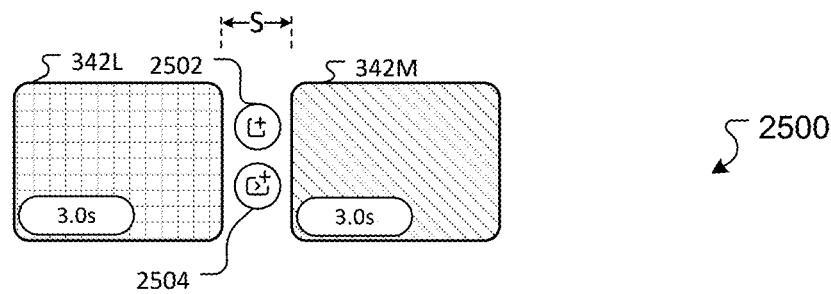

Example 2500 of FIG. 25 is displayed by the application 200 in response to detecting the display inter-preview control input (e.g. following display of example 2400 of FIG. 24) and where no transition is defined between the components corresponding to the two adjacent previews 342. In this case, the inter-preview controls displayed include an add component control 2502 and an add transition 2504 control.

Figure 26:
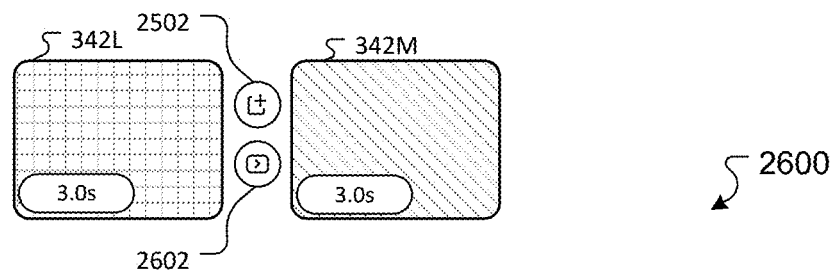

Example 2600 of FIG. 26 is displayed by the application 200 in response to detecting the display inter-preview control input (e.g. following display of example 2400 of FIG. 24) and where a transition is defined between the components corresponding to the two adjacent previews 342. In this case, the inter-preview controls displayed include the add component control 2502 and a change transition 2602 control.

As can be seen in both FIGS. 25 and 26, in order to display the inter-preview controls the application has increased the separation S between the adjacent previews 342L and 342M.

Once an inter-preview control is displayed, a user can interact with or select that control—e.g. by clicking on a control (where a cursor control device is used).

Figure 27:
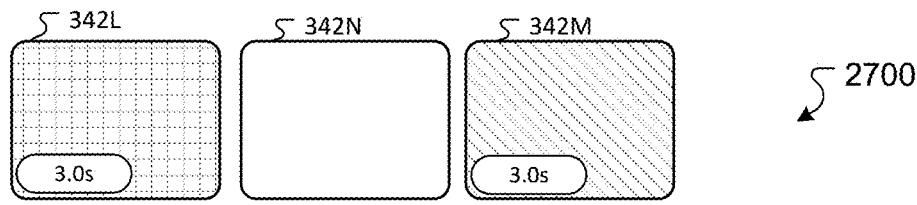

In response to a user interacting with the add component control 2502, the application 200 adds a new component to the asset between the adjacent previews in question. FIG. 27 provides an example 2700 of a portion of the overview GUI 340 in which the add component control shown in FIG. 25 has been activated. In FIG. 27, a new component has been added between the components corresponding to previews 342L and 342M and, accordingly a new preview 342N is displayed.

In response to a user interacting with the add transition control 2504, the application 200 displays a select transition interface (not shown). The select transition allows a user to select a transition between the components corresponding to the adjacent previews 342L and 342M. Application 200 may make various transitions available. The transitions may depend on the types of the components in question: for example some transitions may only be available for playable components while others may only be available for non-playable components. By way of example, available transitions may include transitions such as fade, blend, dissolve, slide, and/or other transitions. The select transition interface may, for example, be a list or other UI component which displays and allows selection of available transitions.

In response to a user interacting with the change transition control 2602, the application 200 displays a change transition interface (not shown). The change transition interface may be similar to the select transition interface, excepting it also includes an option to remove or delete the current transition defined between the components corresponding to the adjacent previews 342L and 342M.

Figure 28:
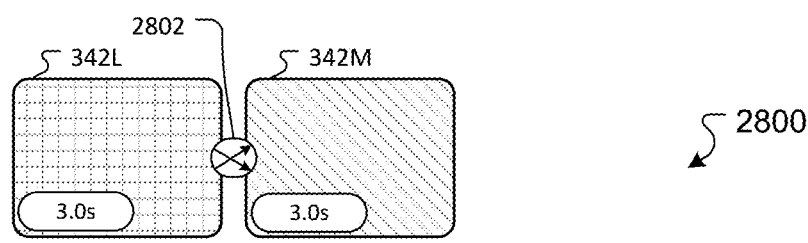

In the present embodiments, if a user inserts a transition between components (e.g. by operation of the select transition control 2502 or change transition control 2602), the application 200 displays a transition indicator between the two previews 342 corresponding to those components. FIG. 28 provides an example 2800 in which a transition has been inserted between the components corresponding to previews 342L and 342M. Accordingly, the application 200 displays a transition indicator 2802. The application 200 may be configured to vary the appearance of the transition indicator 2802 based on the particular transition that has been inserted.

In the present embodiments, if a user does not interact with an inter-preview control and instead (for example) moves the cursor 2404 out of the region between the two adjacent previews 342, the application 200 ceases displaying the inter-preview controls and reduces the separation between the adjacent previews 342 to the original separation (e.g. as depicted in FIG. 24).

Figure 29:
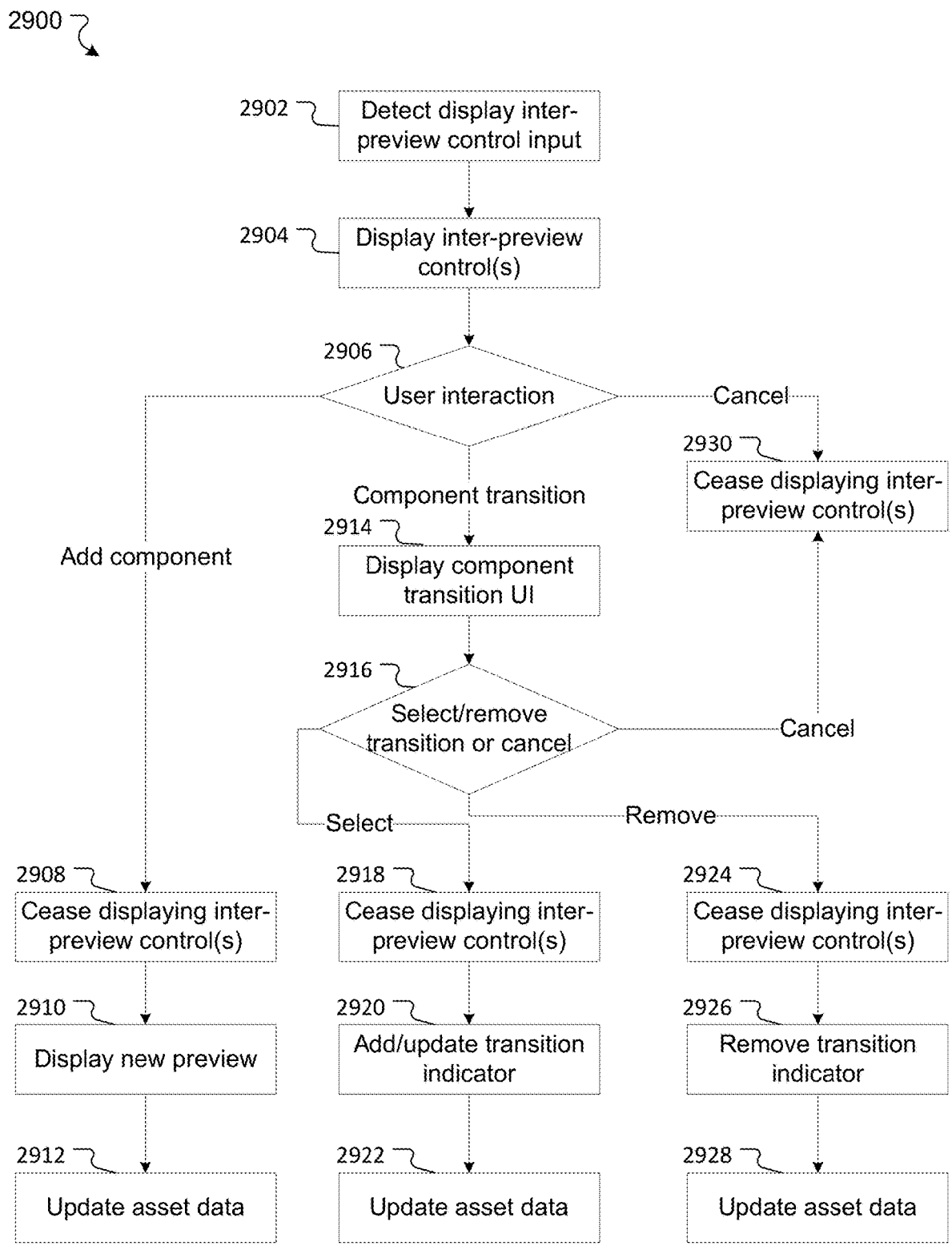
FIG. 29 is a flowchart depicting operations involved in a process for displaying inter-preview controls.

Turning to FIG. 29, an example process 2900 for displaying and performing operations in accordance with inter-preview controls will be described.

At 2902, the application 200 detects a display inter-preview control input. In the present example, and as described above with reference to FIG. 24, the display inter-preview control input is a hover (where a cursor control device is used) or a dwell (where a touch screen is used) input in a region between two adjacent previews (e.g. 342L and 342M).

At 2904, in response to detecting the display inter-preview control input, the application 200 displays one or more inter-preview controls. In the present embodiments the inter-preview controls include an add component control (such as 2502) and a component transition control. If no transition is currently defined between the components the adjacent previews correspond to, the component transition control is an add transition control (such as 2504). If a transition is currently defined between the adjacent previews, the component transition control is a change transition control (such as 2602).

At 2906, the application 200 determines relevant user interaction with respect to the inter-preview control(s) displayed at 2904. In the present example, three relevant user interactions are possible: input that selects the add component control (in which case processing proceeds to 2908); input that selects a component transition control (in which case processing proceeds to 2914); input that cancels display of the inter-preview controls (without selecting an inter-preview control) (in which case processing proceeds to 2930). In the present example, input that cancels display of the inter-preview controls may be: input that moves the cursor (or dwell gesture) out of the region between the two adjacent previews; or input (or lack thereof) that fails to select an inter-preview control within a defined time-out period.

At 2908 the add component control has been selected. In this case, the application 200: ceases displaying the inter-preview controls (at 2908); displays a new preview (e.g. 342N) between the adjacent previews (e.g. 342L and 342M) (at 2910); and updates the asset data to record the new component (i.e. a component corresponding to the new preview 342N) that has been added to the asset (between the components the adjacent previews correspond to) (at 2912). In the example data structures described above, adding a new component involves inserting a new component record into the component array between the component records for the components corresponding to the adjacent previews in question.

At 2914, the component transition control has been selected. In this case the application 200 displays a component transition user interface. The component transition user interface may, for example, be a pop-up menu, list, (or other UI) that displays options and allows a user to select a particular option. If the selected component transition control was the add transition control 2504, the options provided in the component transition are different transition effects that can be selected to transition between the components corresponding to the adjacent previews 342L and 342M. If the selected component transition control was the remove transition control 2602, the options provided in the component transition UI further include a remove transition option to remove the existing transition between the components corresponding to the adjacent previews 342L and 342M.

At 2916, the application receives further input via the component transition UI. The further input may, in this example, be input selecting a particular transition (in which case processing proceeds to 2918) or input selecting to remove an existing transition (in which case processing proceeds to 2924). Input to cancel display of the component transition UI without selecting any options therefrom is also possible (in which case processing proceeds to 2930).

At 2918, a particular transition has been selected from the component transition UI. In this case, the application 200: ceases displaying the inter-preview controls (at 2918); displays a transition indicator (e.g. 2802) between the adjacent previews 342L and 342M (at 2920); and updates the asset data to record the selected transition that has been added between the components the adjacent previews correspond to (at 2922).

At 2924, the remove existing transition option has been selected from the component transition UI. In this case, the application 200: ceases displaying the inter-preview controls (at 2924); removes display of the existing transition indicator that was displayed between the adjacent previews 342L and 342M (at 2926); and updates the asset data to record that the transition between the components the adjacent previews correspond to has been removed/deleted (at 2928).

In the example data structures described above, adding, changing, or deleting a transition between components involves updating the component record (e.g. the outro_transition attribute) for the earlier of the two components in question.

At 2930, display of the inter-preview controls has been cancelled without selecting an inter-preview control. In this case, the application 200 ceases displaying the inter-preview controls.

As described above, in the present examples displaying the inter-preview controls at 2904 involves moving the adjacent previews away from one another to provide a larger separation. Given this, when ceasing to display the inter-preview controls (at 2918, 2924, or 2930) the application 200 moves the adjacent previews 342 to display them at their original separation distance.

Audio Elements

In certain implementations, the application 200 also provides (or can be controlled to provide) previews of audio elements that have been added to an asset. Audio element previews can also be displayed in the overview GUI 340. As noted above, in the present embodiments audio elements are added to an asset as a whole rather than being added to a particular component of the asset. Furthermore, as audio elements are playable elements any asset to which an audio element has been added is a playable asset.

Audio elements may be added to an asset in various ways. By way of example, a user may add an audio element to an asset by dragging a search result thumbnail 324 representing an audio element from the search GUI 330 and dropping it onto the component 304 currently displayed in the editing GUI 302. In this case, the application 200 may be configured to automatically calculate a start offset for the audio element so that it starts at the same time as the component 304 onto which it is dropped. Alternatively, a user may drag an audio element search result onto a particular preview 342 (in which case application 200 may, again, be configured to automatically calculate a start offset for the audio element so that it starts at the same time as the component that corresponds to the preview 342 onto which the audio element is dropped). Other methods may be used to add an audio design element to the asset.

In some embodiments, where an asset has one or more associated audio elements, the application 200 always displays audio element previews in the overview GUI 340. In other embodiments, the application 200 may provide a show/hide audio preview control (e.g. in additional control GUI 230) that allows users to cause the application 200 to show or hide audio element previews.

In the present examples, audio element previews are displayed as bars (e.g. 3002A below). For a given audio element preview, the preview's leading edge is vertically aligned with a position within the relevant component preview that indicates the time that the corresponding audio element starts playing. The audio element preview's trailing edge is vertically aligned with a position within the relevant component preview that indicates the time that the corresponding audio element stops playing. In this way, a given audio element preview is aligned with the sequence of component previews in order to indicate the start and end times (and play duration) of the audio element that the preview corresponds to.

Turning to FIGS. 30-34, zoom level adjustment while one or more audio element previews are displayed will be described.

Figure 30:
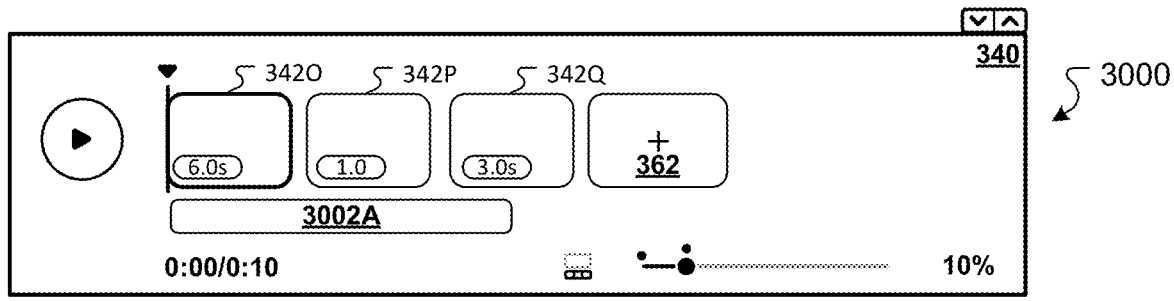
FIGS. 30 to 33 depict example graphical user interfaces.

FIG. 30 depicts an example 3000 of the overview GUI 340 which is being displayed in accordance with the scaled zoom mode (as described above). The asset being previewed in example 3000 includes three components (with corresponding component previews 342O, 342P, and 342Q) and an audio element (with corresponding audio element preview 3002A). In this example, the audio element corresponding to preview 3002A plays for 8.5 seconds: from the start of the asset (as indicated by the leading edge of the audio element preview 3002A aligning with the leading edge of the first component preview 342O) until half way through the component corresponding to component preview 342Q (as indicated by the trailing edge of the audio element preview 3002A being positioned half way along component preview 342Q's width).

Given the durations of the respective components (as indicated by their component duration badges), the play duration of the audio element corresponding to audio element preview 3002A can be visually determined (or approximated) with reference to the duration badges of the component previews. E.g. in FIG. 30 it can be seen that the audio element corresponding to preview 3002A runs for approximately 8.5 seconds: 6 s (the entirety of preview 342O)+1 s (the entirety of preview 342P)+1.5 s (½ of preview 342Q).

Figure 31:
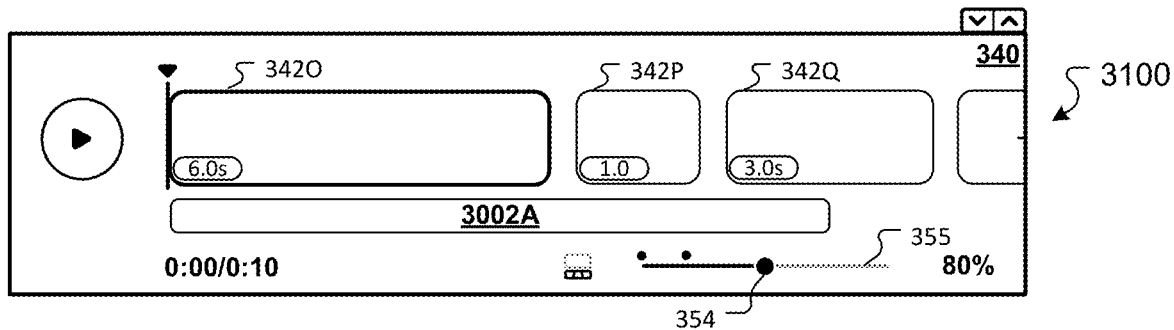

FIG. 31 provides an example 3100 of the overview GUI 340 of example 3000 following user input moving the slider handle 352 from the minimum zoom snap-point to a position within the variable portion 355V of the slide path 355 (in this a position corresponding to a zoom level of 80%). In response, and as described above, the application 200 has adjusted the display widths of the component previews 342 in order to display them at widths that are proportional to the durations of their corresponding components (excepting preview 342P which is displayed at the minimum display width). In addition, the application 200 has calculated new start and end positions for the audio element preview 3002A so that its leading and trailing edges still accurately reflect its play start and play end points within the asset. In this case, the new start position of the audio element preview 3002A is the same (due to the fact that the audio element corresponding to the preview 3002A starts playing at the start of the first component of the asset). A new end position is, however, calculated. Specifically, the new end position of the audio element preview 3002A is calculated so it vertically aligns with the horizontal position in the component previews 342 that corresponds to the audio element's end time. In this example, the audio element's end time is 8.5 seconds into the asset. Accordingly, the new end point for the audio element preview 3002D is a position approximately ½ way through component preview 342Q.

Figure 32:
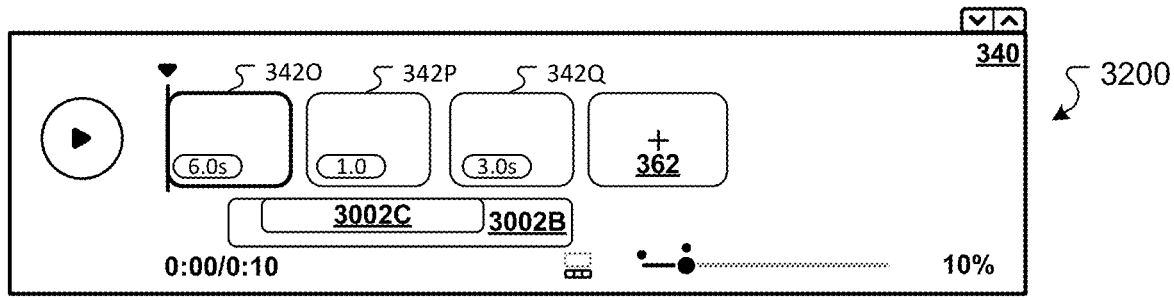

To provide a further illustration of the adjustments made to audio element previews in the scaled zoom mode, FIG. 32 depicts another example 3200 of the overview GUI 340. In example 3200, the asset includes two audio elements, the corresponding previews for which are 3002B and 3002C. In this example, the audio element corresponding to preview 30028 has a start offset of 3 seconds (i.e. so it starts playing 3 seconds into the asset) and has a total play duration of 7 seconds. This is indicated by the leading edge of preview 3002B aligning with the middle the first component preview 342O and the trailing edge of the audio item preview 3002B aligning with the trailing edge of component preview 342Q).

The audio element corresponding to preview 3002C has a start offset of approximately 4.5 seconds and has a total play duration of 3.25 seconds. This is indicated by the leading edge of preview 3205 aligning with the point % of the way through the first component preview 342O and the trailing edge of the audio item preview 3002B aligning with the point ¼ of the way through preview 342Q. In this example, the audio elements corresponding to audio element previews 30028 and 3002C play at the same time and, accordingly, have been displayed one atop the other (in a z-index/depth sense). In alternative embodiments, audio element previews such as 30028 and 3002C that play at the same time could be displayed on separate display ranks (e.g. one audio element preview displayed at a vertically higher (e.g. y-coordinate) position than the other).

Figure 33:
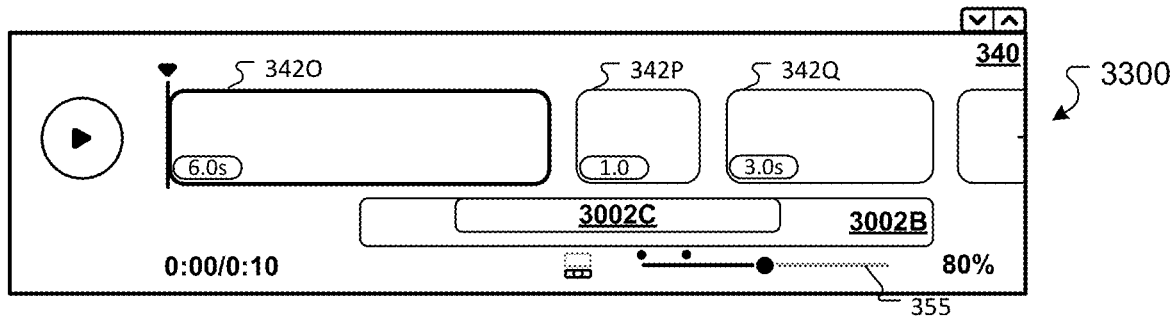

FIG. 33, then, provides an example 3300 of the overview GUI 340 that follows user input in example 3200 that adjusts the zoom level (in this case to 80%). In response, the application 200 has adjusted the display widths of the component previews 342. In addition, the application 200 has calculated new start and end positions for the audio element previews 3002B and 3002C so that their leading and trailing edges still accurately reflect their play start and play end points within the asset.

In this particular example, the application 200 has calculated: a new start position for audio element preview 3002B that vertically aligns with the new midpoint of component preview 342O; a new end position for audio element preview 3002B that vertically aligns with the new end point of component preview 342Q; a new start position for audio element preview 3002C that vertically aligns with the new point that is approximately ¾ of the way through component preview 342O; a new end position for audio element preview 3002C that vertically aligns with the new point that is approximately ¼ of the way through component preview 342Q.

The positions of an audio element preview's leading and trailing edges can be calculated in various ways.

By way of example, positions of an audio element preview's leading and trailing edges may be determined with reference to the positions within the component preview(s) 342 that the leading and trailing edges need to align with. For example: if an audio element starts at the same time that a particular component starts, then the leading edge of the audio element's preview 3002 is aligned with the leading edge of that component's preview 342; if an audio element ends at the same time that a particular component ends, then the trailing edge of the audio element's preview 3002 is aligned with the trailing edge of that component's preview 342; if an audio element starts or ends a time that is x % of the way through a particular component, then the leading or trailing edge of the audio element's preview 3002 is aligned with a position that is x % of the way through that component's preview 342.

Alternatively, positions of an audio element preview's leading and trailing edges may be calculated using a similar approach as that used to calculate the display width of component previews 342. For example, and continuing with the example above: the x-coordinate of a preview's leading edge may be calculated based on (zoom level*24 pixels*the corresponding audio element's start time (e.g. offset) (in seconds)); the x-coordinate of a preview's trailing edge may be calculated based on (zoom level*24 pixels*the corresponding audio element's end time (in seconds)). If need be, the audio element's end time may be calculated as the sum of its start time and duration. In the present examples, where a separation gap/region is provided between component previews, this gap will need to be taken into account if an audio element's start and/or end times cross one or more components (e.g. by adding x*the default pixel width of the component preview separation gap, where x is the number of separation gaps crossed by the start/end times of the audio element). For example, in FIG. 31 the end time of audio element preview 3002A crosses two separation gaps (between component previews 342O and 342P and between component previews 342P and 342Q) and, therefore when calculating the position of preview 3002A's trailing edge 2*the separation gap width must be added.

Figure 34:
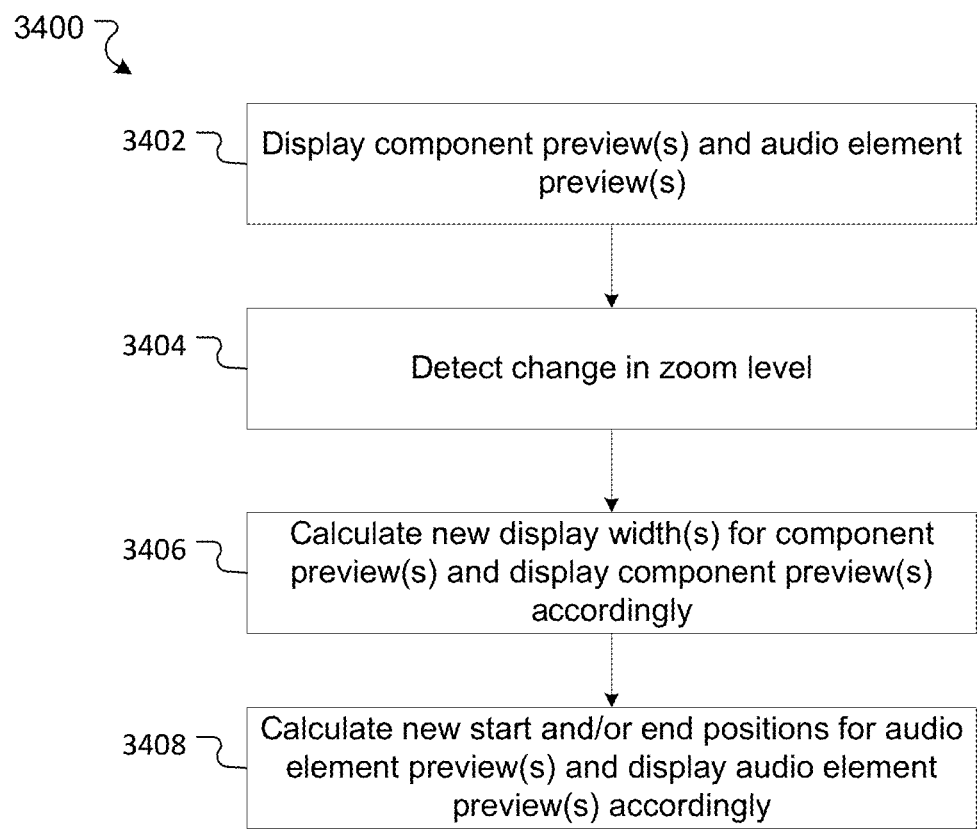
FIG. 34 is a flowchart depicting operations involved in adjusting a zoom level while displaying one or more audio element previews.

Turning to FIG. 34 a process 3400 for adjusting the variable zoom level while displaying one or more audio element previews will be described.

At 3402, the application 200 displays the overview GUI 340. In this example, this involves displaying one or more component previews 342 and one or more audio element previews 3002B (e.g. as described above with reference to FIGS. 355V 0-33).

At 3404, the application 200 detects a change in the zoom level—for example due to a user positioning the slider handle 354 within the variable portion of the slide path 355.

At 3406, in response to detecting a change in the zoom level, the application 200 calculates new display widths for the one or more component previews 342 that are displayed and displays the component preview(s) 342 according to those widths. Calculating display widths of component previews 342 is described above.

At 3408, also in response to detecting a change in the zoom level, the application 200 calculates a new start position (e.g. a leading edge position) and a new end position (e.g. a trailing edge position) for each audio element preview 3002A and displays each audio element preview 3002A according to its new start and end positions.

As described above: the new start position of a given audio element preview 3002A is calculated so that start position vertically aligns with the horizontal position in the component previews 342 that corresponds to the audio element's start time in the asset; the new end position of a given audio element preview 3002A is calculated so that the end position vertically aligns with the horizontal position in the component previews 342 that corresponds to the audio element's end time in the asset.

Turning to FIGS. 35 to 38, component duration adjustment while one or more audio element previews are displayed will be described.

Figure 35:
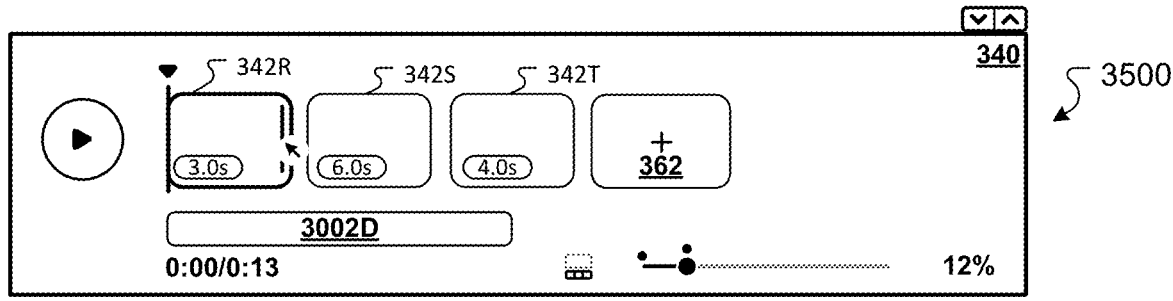
FIGS. 35 to 37 depict example graphical user interfaces.

FIG. 35 depicts an example 3500 of the overview GUI 340 which is being displayed in accordance with the minimum zoom mode (as described above). The asset being previewed in example 3500 includes three components (with corresponding component previews 342R, 342S, and 342T and corresponding play times of 3, 6, and 4 seconds respectively) and an audio element (with corresponding audio element preview 3002D). In this example, the audio element corresponding to preview 3002D has a start offset of 0 and a duration of 11 seconds. Given the durations of the components, this results in the audio element corresponding to preview 3002D ceasing to play half way through the component corresponding to component preview 342T.

Figure 36:
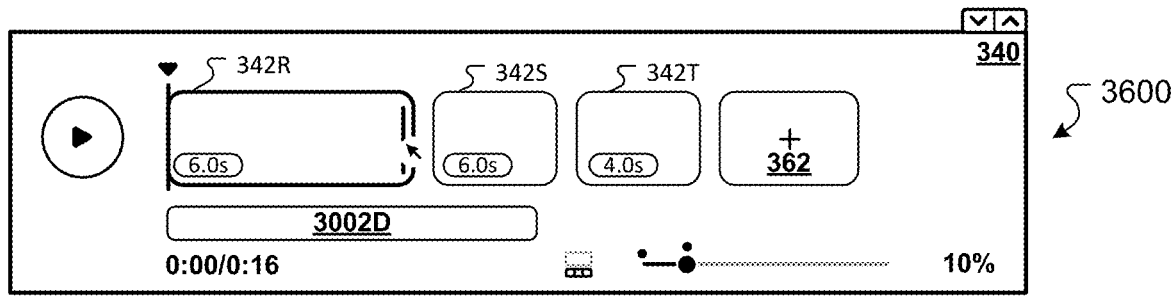

FIG. 36 provides an example 3600 of the overview GUI 340 of example 3500 following user input that adjusts the duration of the component corresponding to component preview 342R. In this example here the component's duration is adjusted from 3 s to 6 s. Component duration adjustments are described above.

As can be seen, in order to account for the adjusted display width of component preview 342R (during the adjustment process), the application 200 calculates new start and end positions for the audio element preview 3002D. In this case, the new start position of the audio element preview is the same (due to the fact that the audio element corresponding to the preview 3002D starts playing at the start of the first component of the asset). A new end position is, however, calculated and the audio element preview 3002D is adjusted accordingly. Specifically, the end position of the audio element preview 3002D is adjusted to vertically align with the horizontal position in the component previews 342 that corresponds to the audio element's end time. In this example, the audio element's end time is 11 seconds into the asset and, therefore, the new end point for the audio element preview 3002D is a position approximately $5/6^{ths}$ through component preview 342S. This indicates the audio element's total play time of 11 seconds: 6 s (per component preview 342R)+5 s (per $5/6$ths of component preview 342S).

As described above (e.g. at 2320 and 2322), once the component duration adjustment is complete, the application 200 calculates a new display width for the adjusted component's preview 342 (based on the current zoom level, new duration, and minimum display width) and displays that preview in accordance with the new width. Where one or more audio element previews are displayed, application 200 also calculates new display widths for those audio element previews (and displays the audio element preview(s) accordingly). This is depicted in example 3700 of FIG. 37 (which is displayed after example 3600 once the duration adjustment with respect to preview 342R is complete).

Figure 37:
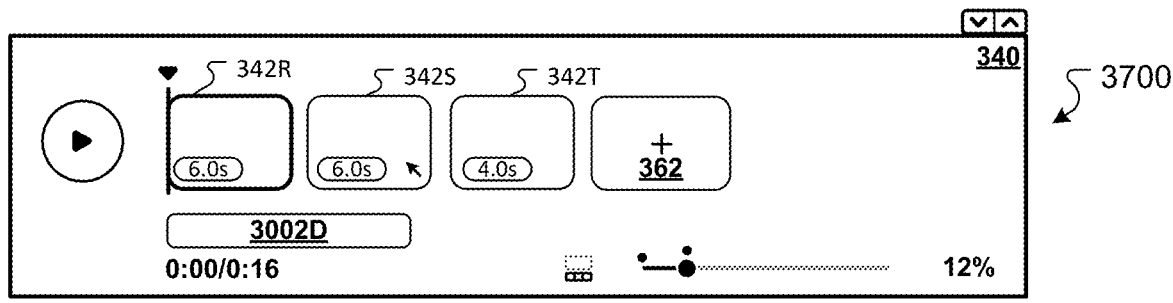

In FIG. 37 the new start position of audio element preview 3002D is the same. The new end position (which is still 11 seconds into the asset) is calculated to vertically align with the position approximately $5/6^{ths}$ through component preview 342S (noting that this position has changed as a result of re-displaying component preview 342R according to the current zoom level).

Figure 38:
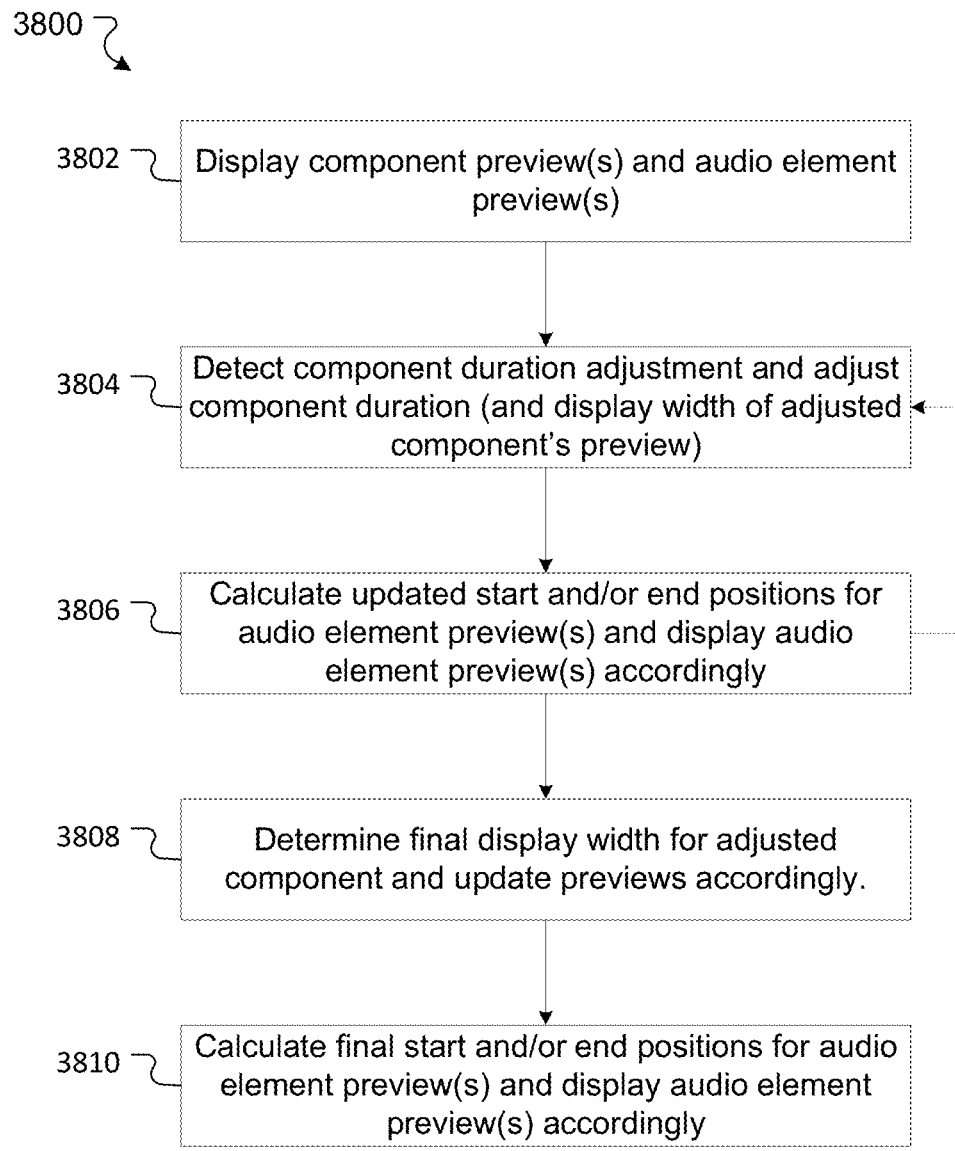
FIG. 38 is a flowchart depicting operations involved in a adjusting the duration of a component while displaying one or more audio element previews.

Turning to FIG. 38 a process 3800 for adjusting the duration of a component while displaying one or more audio element previews will be described.

At 3802, the application 200 displays the overview GUI 340. In this example, this involves displaying one or more component previews 342 and one or more audio element previews (e.g. element preview 3002D).

At 3804 and 3806 the application 200 detects a component duration adjustment input (as described, for example, with reference to FIG. 23 above).

At 3804, in accordance with the duration adjustment input, application 200 calculates the new component duration and updates the component's preview accordingly (e.g. per 2308 and 2310 of FIG. 23).

At 3806, while the component adjustment input is detected (and prior to the completion of the adjust component input), the application 200 calculates updated start and end positions for each audio element preview 3002D and displays the audio element preview(s) 3002D according to their new start and end positions. The updated start and end positions for the audio element preview(s) account for/are calculated based on the adjusted display width of the component preview 342 that the adjustment input is in respect of.

As described above, the updated start position of a given audio element preview 3002D is calculated so that start position vertically aligns with the horizontal position in the component previews 342 that corresponds to the audio element's start time in the asset; the updated end position of a given audio element preview 3002D is calculated so that end position vertically aligns with the horizontal position in the component previews 342 that corresponds to the audio element's end time in the asset.

At 3808, the adjust duration input is completed (e.g. as described at 2314). In response, the application 200 calculates a new display width (e.g. per 2320, based on the new duration, zoom level, and minimum display width) and displays the component previews 342 based on the new display width (e.g. per 2322 described above).

At 3810, the application 200 also calculates a final start and stop positions for each audio element preview. The final start and stop positions for each audio element preview are calculated based on the final display widths (and positions) of the component previews 342 (as determined at 3808). The final start position of a given audio element preview 3002D is calculated so that start position vertically aligns with the horizontal position in the component previews 342 that corresponds to the audio element's start time in the asset; the final end position of a given audio element preview 3002D is calculated so that end position vertically aligns with the horizontal position in the component previews 342 that corresponds to the audio element's end time in the asset.

While not illustrated, in certain cases adjustment of a component's duration may lead to adjustment of one or more audio elements.

As one example, consider adjustment of a component's duration such that the entire duration of the asset (calculated by summing the durations of the asset's components) is now shorter than the start offset defined for a particular audio element. E.g. an audio element has a start offset of 15 seconds, but following adjustment of a component's duration, the total duration of the asset is only 10 seconds. In this case, the application 200 may be configured to delete the audio element in question. Prior to deleting such an audio element, the application 200 may display a warning to the user providing an option to confirm deletion of the audio element (in which case the audio element is deleted from the asset data) or to undo the component duration adjustment (in which case the audio element is retained but the component reverts to its pre-adjustment duration). If an audio element is deleted, application 200 also ceases to display its corresponding preview.

As another example, consider adjustment of a component's duration such that an audio element can no longer play for its original duration—e.g. where the overall duration of the asset is less than the original end time of the audio element (the audio element's end time calculable based on its start offset and duration). E.g. an audio element is set to play until 30 seconds into an asset, but following adjustment of a component's duration, the total duration of the asset is only 25 seconds. In this case, and assuming the audio element's start offset is less than 25 seconds, the application 200 may be configured to adjust the audio element so that it ceases playing at the end of the asset. (In certain cases no adjustment to the audio element's record in the asset data may be needed, the audio element automatically ceasing to play at the end of the asset). If an audio element is shortened, application 200 also redisplays its corresponding preview accordingly (e.g. to position its trailing edge at the end of the asset).

As described above, in certain implementations application 200 provides a presentation-enabled and presentation-disabled mode of operation for certain document types (documents such as presentations which have page timing defined). When such a document has one or more audio elements and is viewed in the presentation-disabled mode of operation (which requires a user to manually transition between pages), application 200 may be configured to handle playback of the audio element(s) in various ways.

For example, in certain embodiments, when application 200 is displaying a document with associated audio elements in a presentation-disabled mode of operation it may be configured to respect any start-offset associated with an audio element but continue to play the audio element while any document page that is "associated" with the element is being viewed. In this sense, a document page will be "associated" with an audio element if the timing of the audio element is such that it plays for at least a portion of that page.

To illustrate this, consider example 3200 of FIG. 32 and, in particular, audio element preview 30028 which is "associated" with (i.e. plays during the cores of) the pages corresponding to previews 342O, 342P, and 342Q. If the asset depicted in FIG. 32 was being viewed in a presentation-disabled mode of operation, application 200 would ignore page timings and would only transition between pages in response to user input (e.g. activation of a next page or other page transition control). In this example, application 200 would start playing the audio element corresponding to preview 3002B approximately 3 seconds after causing the page corresponding to preview 342O to be displayed (i.e. application 200 respects the start offset of the audio element). Furthermore, application would continue to play the audio element corresponding to preview 3002B (automatically looping the element if necessary) while any of the pages associated with the audio element are displayed (i.e. any of the components corresponding to previews 342O, 342P, or 342Q).

Switching Between Overview GUI Display Modes

As described above, in the present embodiments a toggle overview GUI display mode control 364 is provided. Operation of this control, and a grid view (also referred to as the maximised asset overview display) will be described with reference to FIGS. 39 to 42.

Figure 39:
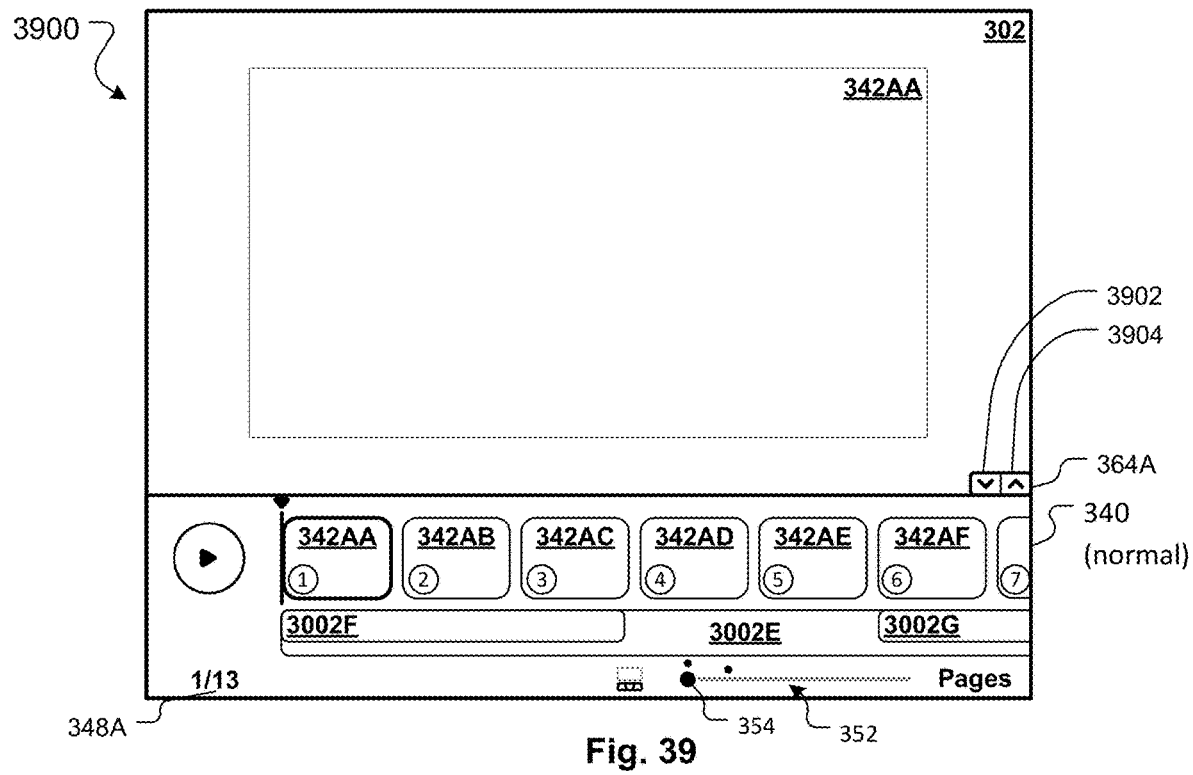
FIGS. 39 to 41 depict example graphical user interfaces.

FIG. 39 provides an example GUI 3900 that includes the editing GUI 302 and overview GUI 340 as previously described. The overview GUI 340 shows that the asset in question has at least seven components (noting 6 full component previews 342AA to 342AF are visible and on component preview is partially visible) and at least three audio elements (3002E to 3002G). The overview GUI 340 as displayed in FIG. 39 may be referred to as the normal asset overview display.

Figure 40:
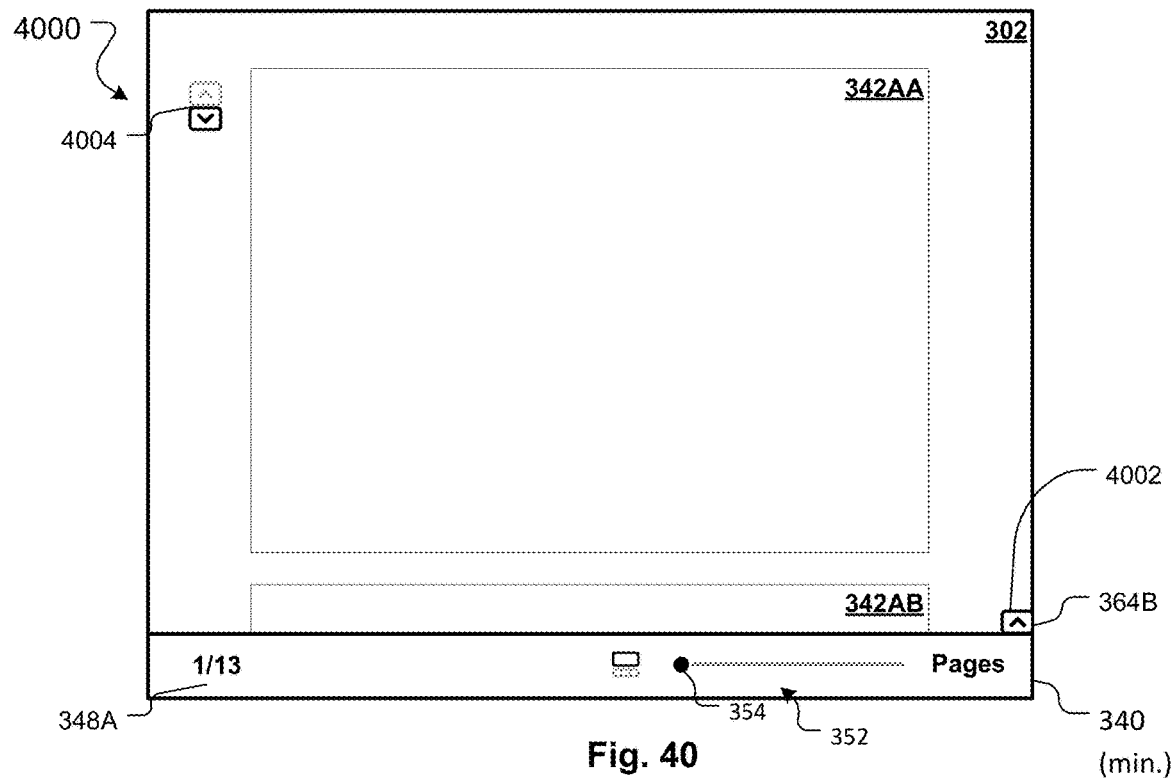
Figure 41:
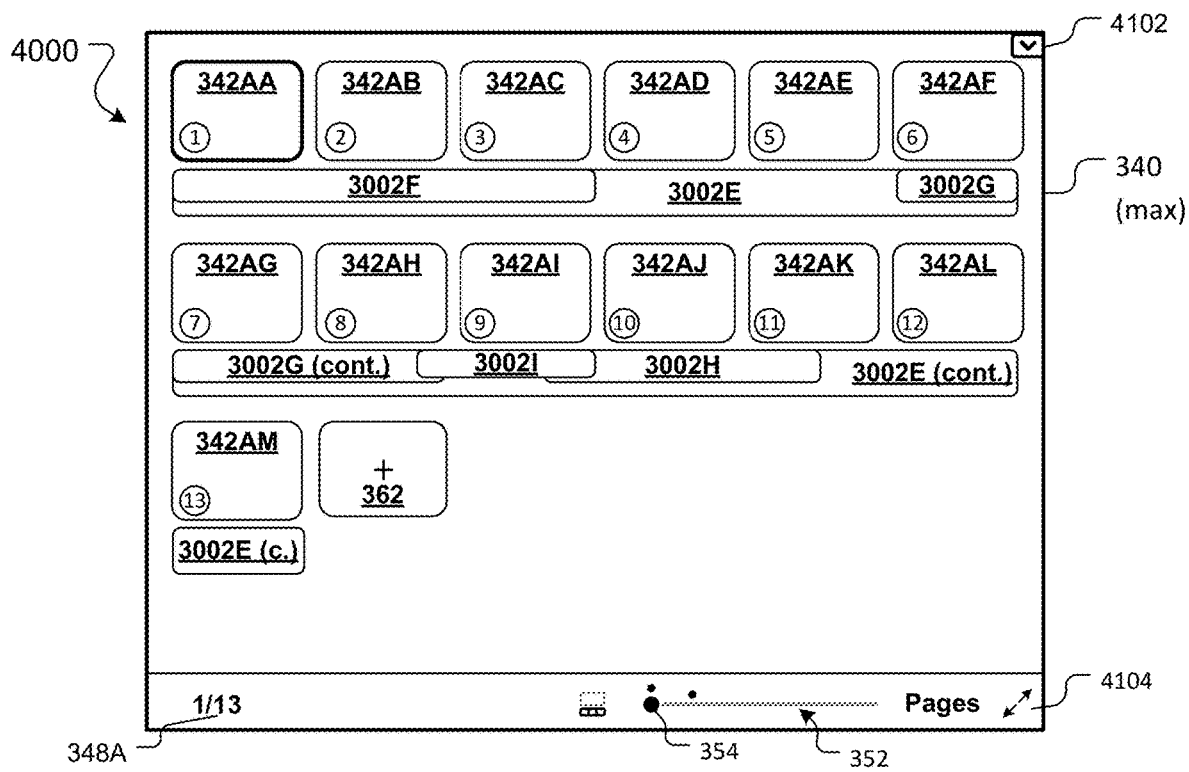

In FIG. 39, the toggle overview GUI display mode control 364 is displayed in a first state 364A which includes a minimise overview GUI control 3902 (the downward pointing echelon) and a maximise overview GUI control 3904 (the upward pointing echelon). In response to detecting activation of the minimise overview control 3902, the application 200 displays the overview GUI 340 in a minimised display mode (an example of which is shown in FIG. 40). In response to detecting activation of the maximise overview control 3904, the application 200 displays of the overview GUI 340 in a maximised display mode (an example of which is shown in FIG. 41).

FIG. 40 provides an example GUI 4000 in which the overview GUI 340 is displayed in a minimised display mode. In this example minimised display mode: component previews 342 and audio element previews 3002 are hidden; the play control 344 and playhead 346 are hidden; the current position indicator 348, zoom mode control 350, zoom level control 352, and zoom level indicator 360 are displayed; and the toggle overview GUI display mode control 364 is displayed in a second state 364B which includes normalise overview control 4002 (the upward pointing echelon). In response to detecting activation of the normalise overview control 4002, the application 200 displays the overview GUI 340 in a normal display mode (an example of which is shown in FIG. 39).

In the example minimised overview display mode of FIG. 40, the handle 354 of the zoom level control 352 is set to the fixed zoom position (corresponding to the fixed zoom snap-point indicator 356). This may, for example, be a default position. Accordingly, in the example minimised view: the current position indicator 348A indicates the current component and total number of components in the asset (⅟₁₃ in this example). If, instead, the handle 354 of the zoom level control 352 was set to a variable zoom position, the current time indicator 348B (as described above) would be displayed instead of the current position indicator 348A.

In the present embodiments, while the overview GUI 340 is displayed in the minimised mode, application 200 enters the editor zoom mode so that any zoom input via the zoom level control adjusts the display of the component (342AA in this example) in the editor interface 302.

As can be seen, when the overview GUI 340 is in the minimised mode additional display space is provided for other GUIs (specifically, here, for the editing GUI 302). Furthermore, in the present example, while the overview GUI 340 is in the minimised mode the components of the asset are displayed in the editor GUI 302 in a scrollable manner. In this case the components are displayed in a vertically scrollable manner, allowing a use to scroll up/down through the asset's components. This scrolling may be input such as a mouse-wheel scroll or swipe gesture, and/or via component navigation controls such as 4004.

FIG. 41 provides an example GUI 4100 in which the overview GUI 340 is displayed in a maximised display mode. In this example maximised display mode: the editing GUI 302 is hidden; the play control 344 and playhead 346 are hidden; the current position indicator 348, zoom mode control 350, zoom level control 352, and zoom level indicator 360 are displayed (though, in the present embodiments, are disabled as zooming is disabled while the overview GUI 340 is in the maximised display mode); and the toggle overview GUI display mode control 364 is displayed in a third state 364C which includes a normalise overview control 4102 (the downward pointing echelon). In response to detecting activation of the normalise overview control 4102, the application 200 displays the overview GUI 340 in a normal display mode (an example of which is shown in FIG. 39) and redisplays the editing GUI 302.

In this particular example, GUI 4100 also includes a full screen mode control 4104. In response to detecting activation of the full screen mode control 4102, the application 200 displays the currently selected component (342AA in the example of FIG. 41) in a full screen mode.

As can be seen in FIG. 41, when the overview GUI 340 is in the maximised display mode additional display space is provided for component previews 342 and audio element previews 3002. In this example, when the overview GUI is in the maximised display mode component previews 342 are presented in a grid arrangement including rows of component previews (the order in this example being left to right within rows and top to bottom between rows). Audio element previews 3002 are presented below component preview rows. This allows users to obtain a high level view of the asset in question so they can better understand the various components and audio elements of the asset.

In the particular example of FIG. 41, the maximised overview mode shows that the asset in question includes: 13 components in total (represented by component previews 342AA to 342AM; and five audio elements in total (represented by audio element previews 3002E to 3002I).

In the maximised overview display mode, different audio elements may be given different visual appearances in order to distinguish them (and to allow a user to visually identify when an audio element continues from the end of one row to the start of another row). For example, Audio element preview 3002E may have a first appearance (e.g. a first colour); audio element preview 3002F may have a second appearance different to the first appearance (e.g. a second colour); audio element preview 3002E may have a third appearance different to the first and second appearances (e.g. a third colour) and so forth. This allows a user to tell (for example) that audio element preview marked "3002G" and "3002G (cont.)" in FIG. 41 correspond to the same audio element rather than two different audio elements.

Further, in the maximised overview display mode it can be seen that: the audio element corresponding to preview 3002E plays from the start of the asset until the end of the asset; the audio element corresponding to preview 3002F plays from the start of the asset until the end of the component corresponding to preview 342AC (and plays concurrently with the audio element corresponding to preview 3002E); the audio element corresponding to preview 3002G plays from the start of the component corresponding to preview 342AF until the end of the component corresponding to preview 342AH (and, at various times, plays concurrently with the audio elements corresponding to previews 3002E and 3002I); the audio element corresponding to preview 3002H plays from the partway through the component corresponding to preview 342AI until partway through the component corresponding to preview 342AK (and, at various times, plays concurrently with the audio elements corresponding to previews 3002E and 3002I); and the audio element corresponding to preview 3002I plays from the partway through the component corresponding to preview 342AH until the end of the component corresponding to preview 342AI (and, at various times, plays concurrently with the audio elements corresponding to previews 3002E, 3002G, and 3002H).

In the example of FIG. 41, the handle 354 of the zoom level control 352 is set to the fixed zoom position (corresponding to the fixed zoom snap-point indicator 356). Accordingly, in the maximised overview display mode: the current position indicator 348A indicates the current component and total number of components in the asset (⅟₁₃ in this example); and position badges 366 are shown on each component preview 342. If, instead, the handle 354 of the zoom level control 352 had been set to a variable zoom position: the current time indicator 348B (as described above) would be displayed instead of the current position indicator 348A; and duration badges 368 (as described above) would be shown on each of the component previews 342 instead of position badges 366.

In the present embodiments, while the overview GUI 340 is displayed in the maximised display mode, application 200 prevents operation of the zoom level control 352—i.e. so it is 'locked' in the position it was in when the maximized overview GUI 340 was initially displayed. In alternative implementations, while the overview GUI 340 is displayed in the maximised mode, application 200 may be configured to permit manipulation of the zoom level control 352 to switch between the fixed zoom mode (so the handle 354 is aligned with the fixed zoom mode snap-point indicator 356) and the scaled zoom mode (e.g. so the handle 354 is aligned with the minimum zoom snap-point indicator 358). Toggling between the fixed mode and minimum zoom level causes application 200 to change: position badges 366 to duration badges 368 and vice versa; and current position indicator 348A to current time indicator 348B and vice versa.

Figure 42:
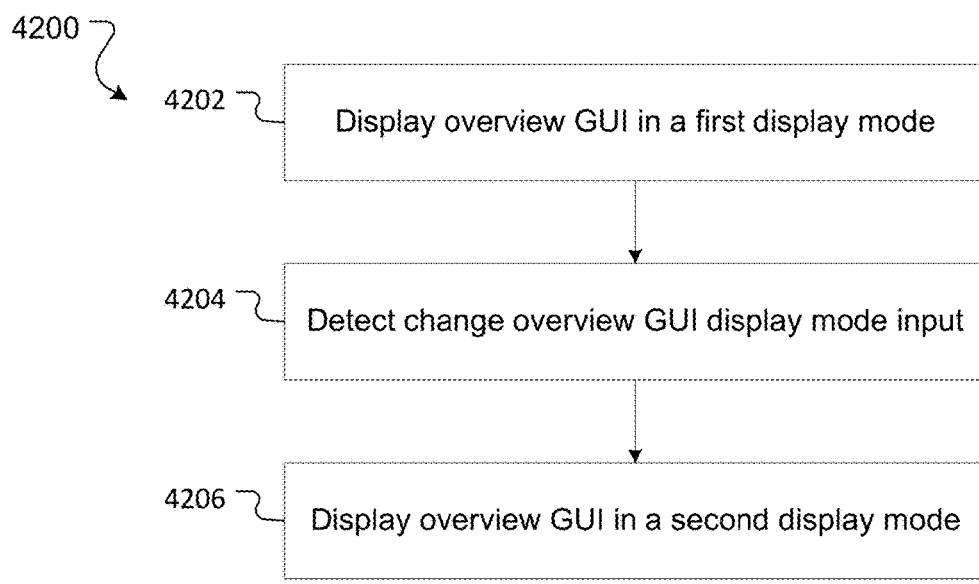
FIG. 42 is a flowchart depicting operations involved in a changing the display mode of an overview GUI.

Turning to FIG. 42, a process 4200 for changing the overview GUI display mode will be described.

At 4202, the application 200 displays the overview GUI 340 in a first display mode. The first display mode may be: a normal overview display mode (an example of which is provided with reference to FIG. 39 above); a minimised overview display mode (an example of which is provided with reference to FIG. 40 above); a maximised overview display mode (an example of which is provided with reference to FIG. 41 above).

At 4204, the application 200 detects a change overview GUI display mode input.

If the overview GUI is displayed in the normal display mode, the change overview GUI display mode input may be a minimise overview GUI input (for example activation of a minimise overview GUI display control such as 3902 above). If the overview GUI is displayed in the normal display mode, the change overview GUI display mode input may alternatively be a maximise overview GUI input (for example by activation of a maximise overview GUI display control such as 3904 above).

If the overview GUI is displayed in the minimised display mode, the change overview GUI display mode input may be a normalise overview GUI input (for example activation of a normalise overview GUI display control (such as 4002 above).

If the overview GUI is displayed in the maximised display mode, the change overview GUI display mode input may be a normalise overview GUI input (for example activation of a normalise overview GUI display control such as 4102 or 4104 described above).

At 4206, in response to the change overview GUI display mode input, application 200 displays the overview GUI in a second display mode.

If the change overview GUI display mode input is a normalise overview GUI input, the second display mode is a normal overview GUI display mode. An example of this display mode is provided with reference to FIG. 39 above.

If the change overview GUI display mode input is a minimise overview GUI input, the second display mode is a minimised overview GUI display mode. An example of this display mode is provided with reference to FIG. 40 above.

If the change overview GUI display mode input is a maximise overview GUI input, the second display mode is a maximised overview GUI display mode. An example of this display mode is provided with reference to FIG. 41 above.

While not described, additional controls may be provided which allow for the overview GUI to transition directly from the maximised display mode to the minimised display mode and/or directly from the minimised display mode to maximised display mode (i.e. without having to transition through the normal display mode).

The following sets of numbered clauses describe additional specific embodiments of the disclosure.

Clause Set 1:

Clause 1. A computer implemented method including:
accessing asset data in respect of a playable digital asset, the asset data defining one or more playable components;
displaying an overview graphical user interface (GUI), the overview GUI including one or more previews, each preview corresponding to a playable component;
while displaying the overview GUI, displaying an editing GUI, the editing GUI including an editable view of a particular playable component;
displaying a zoom level control;
detecting a first user interaction with the zoom level control to set a first zoom level; and
in response to detecting the first user interaction:
  determining whether a preview zoom mode or an editor zoom mode is active; and
  in response to determining that the preview zoom mode is active, applying the first zoom level to the one or more previews.

Clause 2: The computer implemented method of clause 1, wherein in response to determining that the editor zoom mode is active the method includes applying the first zoom level to the editable view of the particular playable component instead of the one or more previews.

Clause 3: The computer implemented method of clause 1 or clause 2, further including:
detecting a change zoom mode event; and
in response to detecting the change zoom mode event changing the active zoom mode.

Clause 4: The computer implemented method of clause 3, wherein:
if the editor zoom mode is active, changing the active zoom mode includes setting the overview zoom mode as the active zoom mode; and
if the overview zoom mode is active, changing the active zoom mode includes setting the editor zoom mode as the active zoom mode.

Clause 5: The computer implemented method of clause 3 or clause 4, wherein the editor zoom mode is active and the change zoom mode event is a second user interaction that is associated with the overview GUI.

Clause 6: The computer implemented method of clause 5, wherein the second user interaction is a user interaction with a preview.

Clause 7: The computer implemented method of clause 3 or clause 4, wherein the overview zoom mode is active and the change zoom mode event is a third user interaction that is associated with the editor GUI.

Clause 8: The computer implemented method of clause 7, wherein the third user interaction is a user interaction with the editable view of the particular playable component.

Clause 9: The computer implemented method clause 3 or clause 4, further including displaying a zoom mode control, and wherein the change zoom mode event is a fourth user interaction with the zoom mode control.

Clause 10: The computer implemented method of clause 9, wherein the zoom mode control is displayed with a first appearance if the editor zoom mode is active and the zoom mode control is displayed with a second appearance if the overview zoom mode is active, the first appearance being different to the second appearance.

Clause 11: The computer implemented method of any one of clauses 1 to 10, wherein the zoom level control is a slider control.

Clause 12: The computer implemented method of any one of clauses 1 to 11, wherein displaying the overview GUI includes displaying a plurality of previews corresponding to a plurality of playable components, and the plurality of previews are displayed adjacent one another along an axis in an order that is based on a playable component order as defined by the asset data.

Clause 13: A computer processing system comprising:
a processing unit;
a display; and
non-transitory computer-readable storage medium storing instructions, which when executed by the processing unit, cause the processing unit to implement a method according to any one of clauses 1 to 12.

Clause 14. Non-transitory computer-readable storage medium storing instructions, which when executed by the processing unit, cause the processing unit to implement a method according to any one of clauses 1 to 12.

Clause Set 2:

Clause 1. A computer implemented method including:
accessing asset data in respect of a digital asset, the asset data defining one or more components in a component order, the digital asset initially being a non-playable asset;
displaying an overview graphical user interface (GUI), the overview GUI including one or more previews, each preview corresponding to a component;
detecting a first conversion event, the first conversion event converting the non-playable asset into a playable asset; and
in response to detecting the first conversion event, displaying one or more playable asset controls in the overview GUI.

Clause 2: The computer implemented method of clause 1, wherein the one or more playable asset controls includes a play control which can be activated to cause playback of the digital asset.

Clause 3: The computer implemented method of clause 1 or clause 2, wherein the one or more playable asset controls includes a playhead, the playhead marking a current playback position within the digital asset.

Clause 4: The computer implemented method of any one of clauses 1 to 3, wherein displaying the overview GUI includes displaying a plurality of previews corresponding to a plurality of components, the plurality of previews being displayed adjacent one another along an axis in an order that is based on a component order as defined by the asset data.

Clause 5: The computer implemented method of any one of clauses 1 to 4, wherein in response to detecting the first conversion event the method further includes displaying a zoom mode control, the zoom mode control operable by a user to switch between an overview zoom mode and an editor zoom mode.

Clause 6. The computer implemented method of any one of clauses 1 to 5, wherein the first conversion event is a first user input that adds a playable design element to the digital asset.

Clause 7. The computer implemented method of clause 6, wherein the first user input is a drag and drop input.

Clause 8. The computer implemented method of clause 7, wherein the drag and drop input is input that drags the playable design element to an editable view of a component displayed in an editor GUI and drops the playable design element onto the editable view of the component.

Clause 9: The computer implemented method of any one of clauses 6 to 8, wherein the playable asset is selected from a group comprising: a video design element; and an audio design element.

Clause 10. The computer implemented method of any one of clauses 1 to 5, wherein the first conversion event is a second user input that changes a mode of operation from a presentation-disabled mode of operation to a presentation-enabled mode of operation.

Clause 11. The computer implemented method of any one of clauses 1 to 10, wherein following detection of the first conversion event and displaying the one or more playable asset controls, the method further includes:
detecting a second conversion event, the second conversion event converting the playable asset into a non-playable asset; and
in response to detecting the second conversion event, hiding the one or more playable asset controls.

Clause 12. The computer implemented method of clause 11, wherein the second conversion event is a third user input that removes a sole playable design element from the digital asset.

Clause 13: The computer implemented method of clause 11, wherein the second conversion event is a fourth user input that changes a mode of operation from a presentation-enabled mode of operation to a presentation-disabled mode of operation.

Clause 14: A computer processing system comprising:
a processing unit;
a display; and
non-transitory computer-readable storage medium storing instructions, which when executed by the processing unit, cause the processing unit to implement a method according to any one of clauses 1 to 13.

Clause 15. Non-transitory computer-readable storage medium storing instructions, which when executed by the processing unit, cause the processing unit to implement a method according to any one of clauses 1 to 13.

Clause Set 3:

Clause 1. A computer implemented method including:
accessing asset data in respect of a digital asset, the asset data defining a plurality of components in a component order, each component having a duration;
displaying an overview graphical user interface (GUI), the overview GUI including a plurality of component previews that correspond to the plurality of components, the plurality of component previews being displayed adjacent one another along an axis in an order that is based on the component order;
wherein the overview GUI is initially displayed in a fixed zoom mode in which each preview is displayed at a common display width and the method further includes:
  detecting an enter scaled zoom mode event, the enter scaled zoom mode event being associated with a first zoom level; and
  in response to detecting the enter scaled zoom mode event:
    determining a new display width for a first component preview that corresponds to a first component, the new display width being determined with reference to the duration of the first component and the first zoom level; and
    displaying the first component preview at the new display width.

Clause 2. The computer implemented method of clause 1, wherein determining the new display width for the first component preview includes:
calculating a duration-based display width for the first component preview based on the duration of the first component and the first zoom level; and
determining the new display width for the first component preview to be the duration-based display width.

Clause 3. The computer implemented method of clause 1, wherein determining the new display width for the first component preview includes:
calculating a duration-based display width based on the duration of the first component and the first zoom level;
determining that the duration-based display width is less than a minimum display width; and
in response to determining that the duration-based display width is less than the minimum display width, determining the new display width for the first component preview to be the minimum display width.

Clause 4. The computer implemented method of clause 1, wherein determining the new display width for the first component preview includes:
calculating a duration-based display width based on the duration of the first component and the first zoom level;
determining that the duration-based display width is greater than a maximum display width; and
in response to determining that the duration-based display width is greater than the maximum display width, determining the new display width for the first component preview to be the maximum display width.

Clause 5. The computer implemented method of any one of clauses 1 to 4, wherein in response to detecting the enter scaled zoom mode event the method further includes displaying a duration badge on the first component preview, the duration badge indicating the duration of the first component.

Clause 6. The computer implemented method of clauses 5, wherein:
in the fixed zoom mode a component position badge is displayed on the first component preview, the component position badge indicating a position of the first component in the component order; and
displaying the duration badge on the first component preview involves replacing the component position badge with the duration badge.

Clause 7. The computer implemented method of any one of clauses 1 to 6, further including displaying a zoom level control, and wherein the enter scaled zoom mode event is a first user input in respect of the zoom level control.

Clause 8. The computer implemented method of clause 7, wherein:
the zoom level control is a slider control that includes a handle and a slide path, the slide path having a first portion corresponding to the fixed zoom mode and a second portion corresponding to the scaled zoom mode; and
the first user input is user input that repositions the handle from the first portion of the slide path to the second portion of the slide path.

Clause 9. The computer implemented method of any one of clauses 1 to 8, further including:
detecting a change zoom level event, the change zoom level event associated with a second zoom level, the second zoom level different to the first zoom level; and
in response to detecting the change zoom level event:
determining a second new display width for the first component preview, the second new display width being determined with reference to the duration of the first component and the second zoom level; and
displaying the first component preview at the second new display width.

Clause 10. The computer implemented method of clause 9 when dependent on clause 8, wherein the change zoom level event is a second user input that repositions the handle within the second portion of the slide path.

Clause 11. The computer implemented method of any one of clauses 1 to 10, further including:
detecting an enter fixed zoom mode event; and; and
in response to detecting the enter fixed zoom mode event:
displaying the first component preview at the common display width.

Clause 12. The computer implemented method of clause 11 when dependent on clause 8, wherein the enter fixed zoom mode event is a third user input that repositions the handle within the first portion of the slide path.

Clause 13. The computer implemented method of clause 11 or clause 12, wherein in response to detecting the enter fixed zoom mode event the method further includes displaying a component position badge on the first component preview, the component position badge indicating a position of the first component in the component order.

Clause 14. The computer implemented method of clause 13 when dependent on clause 5 or clause 6, wherein displaying the component position badge on the first component preview involves replacing the duration badge with the component position badge.

Clause 15. The computer implemented method of any one of clauses 1 to 14, wherein:
the asset data defines an audio element;
displaying the overview GUI includes displaying an audio element preview corresponding to the audio element, the audio element preview being aligned with the plurality of component previews in order to indicate a start time of the audio element and an end time of the audio element; and
in response to detecting the enter scaled zoom mode event the method further includes:
determining a new audio element preview display width for the audio element preview; and
displaying the audio element preview at the new audio element preview display width.

Clause 16: A computer processing system comprising:
a processing unit;
a display; and
non-transitory computer-readable storage medium storing instructions, which when executed by the processing unit, cause the processing unit to implement a method according to any one of clauses 1 to 15.

Clause 17. Non-transitory computer-readable storage medium storing instructions, which when executed by the processing unit, cause the processing unit to implement a method according to any one of clauses 1 to 15.

Clause Set 4:

Clause 1. A computer implemented method including:
accessing asset data in respect of a digital asset, the asset data defining a plurality of components in a component order, each component having a duration;
displaying an overview graphical user interface (GUI), the overview GUI including a plurality of component previews that correspond to the plurality of components, the plurality of component previews being displayed adjacent one another along an axis in an order that is based on a component order, the plurality of component previews being displayed at a first zoom level, the plurality of component previews including a first component preview that corresponds to a first component, the first component preview having a first display width;

detecting a first user input with respect to the first component preview, the first user input being input to change the display width of the first component preview from the first display width to a second display width;

in response to the first user input:
  determining a new duration for the first component, the new duration of the first component based on the second display width and the first zoom level; and
  recording the new duration for the first component in the asset data.

Clause 2. The computer implemented method of clause 1, further including:
determining that the second display width is less than a minimum display width; and
in response to determining that the second display width is less than the minimum display width, displaying the first component preview at the minimum display width after displaying the first component preview at the second display width.

Clause 3. The computer implemented method of clause 1, further including:
determining that the second display width is greater than a maximum display width; and
in response to determining that the second display width is greater than the maximum display width, displaying the first component preview at the maximum display width.

Clause 4. The computer implemented method of any one of clauses 1 to 3, wherein the first user input is input that moves a trailing edge of the first component preview along the axis.

Clause 5. The computer implemented method of clause 4, wherein:
user input that moves a trailing edge of the first component preview in a first direction causes an original duration of the first component to be reduced; and
user input that moves a trailing edge of the first component preview in a second direction causes an original duration of the first component to be increased, the second direction being opposite the first direction.

Clause 6. The computer implemented method of clause any one of clauses 1 to 5, wherein:
the asset data defines an audio element;
displaying the overview GUI includes displaying an audio element preview corresponding to the audio element, the audio element preview being aligned with the plurality of component previews in order to indicate a start time of the audio element and an end time of the audio element; and
after determining the new duration of the first component, the method further includes:
  determining whether adjustment of the audio element is required; and
  in response to determining that adjustment of the audio element is required, adjusting the audio element by amending the asset data.

Clause 7. The computer implemented method of clause 6, wherein:
determining whether adjustment of the audio element is required includes determining whether an overall duration of the asset is less than a start offset of the audio element; and
on determining that the overall duration of the asset is less than the start offset of the audio element the method further includes:
  deleting the audio element from the asset data; and
  ceasing to display the audio element preview.

Clause 8. The computer implemented method of clause 6, wherein:
determining whether adjustment of the audio element is required includes determining whether an overall duration of the asset is less than an end time of the audio element; and
in response to determining that the overall duration of the asset is less than the an end time of the audio element, the method further includes:
  reducing a duration of the audio element so the audio element ends at the same time as the asset; and
  displaying the audio element preview at a new display width reflecting its reduced duration.

Clause 9: A computer processing system comprising:
a processing unit;
a display; and
non-transitory computer-readable storage medium storing instructions, which when executed by the processing unit, cause the processing unit to implement a method according to any one of clauses 1 to 8.

Clause 10. Non-transitory computer-readable storage medium storing instructions, which when executed by the processing unit, cause the processing unit to implement a method according to any one of clauses 1 to 8.

Clause Set 5:

Clause 1. A computer implemented method including:
accessing asset data in respect of a digital asset, the asset data defining at least a first component and a second component;
displaying an overview graphical user interface (GUI), the overview GUI including a first component preview corresponding to the first component and a second component preview corresponding to the second component, the first and second component previews displayed adjacent one another along an axis with a separation region between;
detecting a first user input, the first user input being a user input associated with the separation region;
in response to detecting the first user input, displaying an add component control;
detecting a second user input activating the add component control; and
in response to detecting the second user input:
  adding a third component to the digital asset by writing data in respect of the third component to the asset data;
  displaying a third component preview corresponding to the third component between the first component preview and the second component preview.

Clause 2. The computer implemented method according to clause 1, wherein the add component control is displayed in the separation region.

Clause 3. The computer implemented method according to clause 1 or clause 2, wherein displaying the add component control includes moving one or both of the first and second component previews away from one another to increase the size of the separation region.

Clause 4. The computer implemented method according to any one of clauses 1 to 3, where in response to the first user input the method further includes displaying a component transition control.

Clause 5. The computer implemented method according to any one of clauses 1 to 4, wherein displaying the component transition control includes:

determining whether the asset data defines an existing transition between the first and second components; and in response to determining that the asset data defines an existing transition between the first and second components, displaying a change transition control, the change transition control operable to change the existing transition.

Clause 6. The computer implemented method according to clause 5, further including:

detecting a third user input activating the change transition control;

in response to detecting the third user input, displaying an edit transition user interface permitting selection of a new transition;

detecting a fourth user input selecting the new transition; and in response to detecting the fourth user input, adding the new transition to the asset data.

Clause 7. The computer implemented method according to clause 6, further including displaying a transition indicator between the first and second component previews, the transition indicator corresponding to the new transition.

Clause 8. The computer implemented method according to clause 6, wherein the edit transition user interface permits deletion of the existing transition and the method further includes:

detecting a fifth user input deleting the existing transition; and in response to detecting the fifth user input, deleting the existing transition from the asset data.

Clause 9. The computer implemented method according to any one of clauses 1 to 4, wherein displaying the component transition control includes:

determining whether the asset data defines an existing transition between the first and second components; and in response to determining that the asset data does not define an existing transition between the first and second components, displaying an add transition control, the add transition control operable to add a transition between the first and second components.

Clause 10. The computer implemented method according to any one of clauses 1 to 9, wherein the first user input is selected from a group including: input that hovers a cursor in the separation region; input that selects the separation region; a touch input that dwells in the separation region.

Clause 11: A computer processing system comprising:
a processing unit;
a display; and
non-transitory computer-readable storage medium storing instructions, which when executed by the processing unit, cause the processing unit to implement a method according to any one of clauses 1 to 10.

Clause 12. Non-transitory computer-readable storage medium storing instructions, which when executed by the processing unit, cause the processing unit to implement a method according to any one of clauses 1 to 10.

While the present disclosure refers to preview display widths, this is in the context of an overview GUI 340 in which previews are displayed sequentially along a horizontal axis. If previews were displayed along a different axis, a different display dimension may be relevant—e.g. if previews were displayed along a vertical axis display height may be the relevant dimension.

The foregoing description describes various user interactions—for example the selection, activation, interaction, or other manipulation of various user interface controls or elements. Generally speaking, a given UI element can be interacted with in various ways, and the particular interaction will depend on the type of UI element and the input device(s) available to the computer processing system 100 on which the application 200 runs.

The foregoing description also describes various scenarios in which one or more UI elements are visually distinguished from one or more other UI elements. For example, in the overview GUI 340 a currently selected component preview 342 is visually distinguished over non-selected component previews. As another example, in audio element previews 3002 are also described as being visually distinguished from one another.

Various mechanism for visually distinguishing UI elements may be used. By way of example, one or more of the following techniques may be used: different line weights or types for UI element bounding boxes; use of colour vs greyscale display; use of contrasting colours (e.g. different colours, faded vs full colours); use of transparency/opacity; displaying additional text and/or images (e.g. icons or the like); and/or use of any other visual feature to distinguish one or more UI elements from one or more other UI elements.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required by context, the terms "first", "second", etc. are used to differentiate between various elements and features and not in an ordinal sense. For example, a first user input could be termed a second user input, and, similarly, a second user input could be termed a first user input, without departing from the scope of the various described examples. By way of further example, in certain cases a second user input could occur before a first user input and/or without a first user input ever occurring.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
   accessing asset data in respect of a digital asset, the asset data defining a plurality of components in a component order, each component having a duration, the asset data further defining an audio element having a start time and an end time;
   displaying an overview graphical user interface (GUI), the overview GUI including a plurality of component previews that correspond to the plurality of components, the plurality of component previews being displayed adjacent one another along an axis in an order that is based on the component order, the plurality of component previews being displayed at a first zoom level, the plurality of component previews including a first component preview that corresponds to a first component, the first component preview having a first display width, the overview GUI further including an audio element preview corresponding to the audio element, the audio element preview being aligned with the plurality of component previews in order to indicate the audio element's start time and end time;
   detecting a first user input with respect to the first component preview, the first user input being input to change the display width of the first component preview from the first display width to a second display width; and
   in response to the first user input:
      determining a new duration for the first component, the new duration of the first component based on the second display width and the first zoom level;
      recording the new duration for the first component in the asset data;
      determining that adjustment of the audio element is required; and
      in response to determining that adjustment of the audio element is required, adjusting the audio element by amending the asset data.

2. The computer implemented method of claim 1, further comprising:
   determining that the second display width is less than a minimum display width; and
   in response to determining that the second display width is less than the minimum display width, displaying the first component preview at the minimum display width after displaying the first component preview at the second display width.

3. The computer implemented method of claim 1, further comprising:
   determining that the second display width is greater than a maximum display width; and
   in response to determining that the second display width is greater than the maximum display width, displaying the first component preview at the maximum display width.

4. The computer implemented method of claim 1, wherein the first user input is input that moves a trailing edge of the first component preview along the axis.

5. The computer implemented method of claim 4, wherein:
   user input that moves a trailing edge of the first component preview in a first direction causes an original duration of the first component to be reduced; and
   user input that moves a trailing edge of the first component preview in a second direction causes an original duration of the first component to be increased, the second direction being opposite the first direction.

6. The computer implemented method of claim 1, wherein:
   determining that adjustment of the audio element is required includes determining that an end time of the asset is before the start time of the audio element; and
   in response to determining that the end time of the asset is before the start time of the audio element the method further includes:
      deleting the audio element from the asset data; and
      ceasing to display the audio element preview.

7. The computer implemented method of claim 1, wherein:
   determining that adjustment of the audio element is required includes determining that an end time of the asset is before the end time of the audio element; and
   in response to determining that the end time of the asset is before the end time of the audio element, the method further includes:
      reducing a duration of the audio element so the audio element ends at the same time as the asset; and
      displaying the audio element preview at a new display width reflecting its reduced duration.

8. A computer processing system comprising:
   a processing unit;
   a display; and
   non-transitory computer-readable storage medium storing instructions, which when executed by the processing unit, cause the processing unit to implement a method comprising:
      accessing asset data in respect of a digital asset, the asset data defining a plurality of components in a component order, each component having a duration, the asset data further defining an audio element having a start time and an end time;
      displaying an overview graphical user interface (GUI), the overview GUI including a plurality of component previews that correspond to the plurality of components, the plurality of component previews being displayed adjacent one another along an axis in an order that is based on the component order, the plurality of component previews being displayed at a first zoom level, the plurality of component previews including a first component preview that corresponds to a first component, the first component preview having a first display width, the overview GUI further including an audio element preview corresponding to the audio element, the audio element preview being aligned with the plurality of component previews in order to indicate the audio element's start time and end time;
      detecting a first user input with respect to the first component preview, the first user input being input to change the display width of the first component preview from the first display width to a second display width; and in response to the first user input:
  determining a new duration for the first component, the new duration of the first component based on the second display width and the first zoom level;
  recording the new duration for the first component in the asset data;
  determining that adjustment of the audio element is required; and
  in response to determining that adjustment of the audio element is required, adjusting the audio element by amending the asset data.

9. The computer processing system of claim 8, wherein the method further comprises:
  determining that the second display width is less than a minimum display width; and
  in response to determining that the second display width is less than the minimum display width, displaying the first component preview at the minimum display width after displaying the first component preview at the second display width.

10. The computer processing system of claim 8, wherein the method further comprises:
  determining that the second display width is greater than a maximum display width; and
  in response to determining that the second display width is greater than the maximum display width, displaying the first component preview at the maximum display width.

11. The computer processing system of claim 8, wherein the first user input is input that moves a trailing edge of the first component preview along the axis.

12. The computer processing system of claim 11, wherein:
  user input that moves a trailing edge of the first component preview in a first direction causes an original duration of the first component to be reduced; and
  user input that moves a trailing edge of the first component preview in a second direction causes an original duration of the first component to be increased, the second direction being opposite the first direction.

13. The computer processing system of claim 8, wherein:
  determining that adjustment of the audio element is required includes determining that an end time of the asset is before the start time of the audio element; and
  in response to determining that the end time of the asset is before the start time of the audio element the method further includes:
    deleting the audio element from the asset data; and
    ceasing to display the audio element preview.

14. The computer processing system of claim 8, wherein:
  determining that adjustment of the audio element is required includes determining that an end time of the asset is before the end time of the audio element; and
  in response to determining that the end time of the asset is before the end time of the audio element, the method further includes:
    reducing a duration of the audio element so the audio element ends at the same time as the asset; and
    displaying the audio element preview at a new display width reflecting its reduced duration.

15. Non-transitory computer-readable storage medium storing instructions, which when executed by the processing unit, cause the processing unit to implement a method comprising:
  accessing asset data in respect of a digital asset, the asset data defining a plurality of components in a component order, each component having a duration, the asset data further defining an audio element having a start time and an end time;
  displaying an overview graphical user interface (GUI), the overview GUI including a plurality of component previews that correspond to the plurality of components, the plurality of component previews being displayed adjacent one another along an axis in an order that is based on the component order, the plurality of component previews being displayed at a first zoom level, the plurality of component previews including a first component preview that corresponds to a first component, the first component preview having a first display width, the overview GUI further including an audio element preview corresponding to the audio element, the audio element preview being aligned with the plurality of component previews in order to indicate the audio element's start time and end time;
  detecting a first user input with respect to the first component preview, the first user input being input to change the display width of the first component preview from the first display width to a second display width; and
  in response to the first user input:
    determining a new duration for the first component, the new duration of the first component based on the second display width and the first zoom level;
    recording the new duration for the first component in the asset data;
    determining that adjustment of the audio element is required; and
    in response to determining that adjustment of the audio element is required, adjusting the audio element by amending the asset data.

16. The non-transitory computer-readable storage medium of claim 15, wherein the method further comprises:
  determining that the second display width is less than a minimum display width; and
  in response to determining that the second display width is less than the minimum display width, displaying the first component preview at the minimum display width after displaying the first component preview at the second display width.

17. The non-transitory computer-readable storage medium of claim 15, wherein the method further comprises:
  determining that the second display width is greater than a maximum display width; and
  in response to determining that the second display width is greater than the maximum display width, displaying the first component preview at the maximum display width.

18. The non-transitory computer-readable storage medium of claim 15, wherein the first user input is input that moves a trailing edge of the first component preview along the axis.

19. The non-transitory computer-readable storage medium of claim 18, wherein:
  user input that moves a trailing edge of the first component preview in a first direction causes an original duration of the first component to be reduced; and
  user input that moves a trailing edge of the first component preview in a second direction causes an original duration of the first component to be increased, the second direction being opposite the first direction.

20. The non-transitory computer-readable storage medium of claim 15, wherein:
    determining that adjustment of the audio element is required includes determining that an end time of the asset is before the start time of the audio element; and
    in response to determining that the end time of the asset is before the start time of the audio element the method further includes:
        deleting the audio element from the asset data; and
        ceasing to display the audio element preview.

\* \* \* \* \*